(12) United States Patent
Kim et al.

(10) Patent No.: US 11,870,133 B2
(45) Date of Patent: Jan. 9, 2024

(54) ELECTRONIC DEVICE COMPRISING ANTENNA

(71) Applicant: LG ELECTRONICS INC., Seoul (KR)

(72) Inventors: Duckyun Kim, Seoul (KR); Seokjun Lee, Seoul (KR); Youngbae Kwon, Seoul (KR); Byungwoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/023,329

(22) PCT Filed: Sep. 8, 2020

(86) PCT No.: PCT/KR2020/012099
§ 371 (c)(1),
(2) Date: Feb. 24, 2023

(87) PCT Pub. No.: WO2022/054971
PCT Pub. Date: Mar. 17, 2022

(65) Prior Publication Data
US 2023/0231297 A1    Jul. 20, 2023

(51) Int. Cl.
*H04B 1/40* (2015.01)
*H04B 7/04* (2017.01)
(Continued)

(52) U.S. Cl.
CPC ............... *H01Q 1/243* (2013.01); *H01Q 1/02* (2013.01); *H01Q 19/104* (2013.01);
(Continued)

(58) Field of Classification Search
None
See application file for complete search history.

(56) References Cited

U.S. PATENT DOCUMENTS 7,840,243 B2    11/2010   Hirai
10,107,952 B2 * 10/2018   Lim ..................... G02B 6/0083
(Continued)

FOREIGN PATENT DOCUMENTS

| CN | 109217882 | 1/2019 |
| KR | 101535655 | 7/2015 |

(Continued)

OTHER PUBLICATIONS

PCT International Application No. PCT/KR2020/012099, International Search Report dated Jun. 4, 2021, 4 pages.

*Primary Examiner* — Pablo N Tran
(74) *Attorney, Agent, or Firm* — LEE, HONG, DEGERMAN, KANG & WAIMEY

(57) ABSTRACT

A mobile terminal includes a housing having a front side, a rear side, and lateral sides, and including a metal rim formed of a metal material and at least one bending portion formed of a non-metal material. The mobile terminal includes a rear cover disposed on the rear side of the housing, a reflection sheet disposed on the cover and formed of a metal material, and an antenna module disposed between the rear cover and a front cover of the housing and configured to radiate a beamforming wireless signal, wherein a bending portion of the cover and a flat portion of the cover are configured to include a first region, a second region, and a third region, and a beamforming wireless signal of the first region may be reflected at the second region and the third region by the reflection sheet.

18 Claims, 43 Drawing Sheets

(51) Int. Cl.
*H01Q 1/24* (2006.01)
*H01Q 1/02* (2006.01)
*H01Q 19/10* (2006.01)
*H01Q 25/00* (2006.01)
*H04B 7/0413* (2017.01)

(52) U.S. Cl.
CPC .............. *H01Q 25/00* (2013.01); *H04B 1/40* (2013.01); *H04B 7/0413* (2013.01)

(56) References Cited

U.S. PATENT DOCUMENTS

| | | | |
|---|---|---|---|
| 11,336,015 B2 * | 5/2022 | Thai | H01Q 19/138 |
| 11,450,960 B2 * | 9/2022 | Hwang | H01Q 9/42 |
| 2020/0212569 A1 * | 7/2020 | Kumar | H01Q 21/065 |
| 2023/0101080 A1 * | 3/2023 | Lee | H01Q 21/065 |
| | | | 343/702 |
| 2023/0208958 A1 * | 6/2023 | Sung | H04M 1/0266 |
| | | | 455/566 |

FOREIGN PATENT DOCUMENTS

| | | |
|---|---|---|
| KR | 20190038264 | 4/2019 |
| KR | 20200008647 | 1/2020 |

* cited by examiner (a)

| SUBCARRIER SPACING: $f_o \times 2^\mu$, $f_o = 15kMz$ AND SCALING VALUE $2^\mu$, $\in \{-2, 0, 1, 2,..., 5\}$ ||||||||
|---|---|---|---|---|---|---|---|
| m | -2 | 0 | 1 | 2 | 3 | 4 | 5 |
| SUBCARRIER SPACING[kHz] | 3.75 | 15 | 30 | 60 | 120 | 240 | 480 |
| LENGTH OF ODFM SYMBOL[$\mu s$] | 266.67 | 66.67 | 33.33 | 16.67 | 8.333 | 4.17 | 2.08 |

15kHz 1 SLOT (14 SYMBOLS): 1ms SUBFRAME

| 0 | 1 | 2 | 3 | 4 | 5 | 6 | 7 | 8 | 9 | 10 | 11 | 12 | 13 |

| 0 | 1 | 2 | 3 | 4 | 5 | 6 | 7 | 8 | 9 | 10 | 11 | 12 | 13 | 30kHz 1 SLOT (14 SYMBOLS):0.5ms

| 0 | 1 | 15kHz 1 SLOT (2 SYMBOLS):0.2ms

| 0 | 1 | 2 | 3 | 30kHz MINI SLOT (4 SYMBOLS):0.2ms

| 0 | 1 | 2 | 3 | 4 | 5 | 6 | 60kHz MINI SLOT (7 SYMBOLS):0.125ms (a)

(b)

(a)

(b)

(a)

(b)

(a)

(b)

(c)

| Condition | N261 (Low. Freq.) | | N260 (Low. Freq.) | |
|---|---|---|---|---|
| | Peak Gain(dBi) | Gain(dBi) @ CDF 50% | Peak Gain(dBi) | Gain(dBi) @ CDF 50% |
| Spec. | 20.4 | 14.4 | 18.6 | 12.6 |
| Side 55° tilt | 20.99 | 14.44  0.04↑ | 21.02 | 14.65 |
| Side 18° tilt | 21.73 | 12.69  1.71↓ | 20.25 | 13.18 |

(a)

(b)

(a)

(b)

(a)

| Band | N261 | | |
|---|---|---|---|
| Offset | Peak EIRP | 50% EIRP | deviation |
| X = 1.0mm | 22.22 | 13.45 | -0.02 |
| X = 0.5mm | 22.22 | 13.47 | 0 |
| X = 0mm (Default) | 22.22 | 13.47 | 0 |
| X = -0.5mm | 22.22 | 13.38 | -0.09 |
| X = -1.0mm | 22.22 | 13.29 | -0.18 |
| X = -1.5mm | 22.22 | 13.05 | -0.42 |
| X = -2.0mm | 22.22 | 13.75 | -0.71 |

(b)

ELECTRONIC DEVICE COMPRISING ANTENNA

CROSS-REFERENCE TO RELATED APPLICATIONS

This application is the National Stage filing under 35 U.S.C. 371 of International Application No. PCT/KR2020/012099, filed on Sep. 8, 2020, the contents of which are all incorporated by reference herein in their entirety.

TECHNICAL FIELD

The present disclosure relates to an electronic device having an antenna. A specific implementation relates to an electronic device having antennas operating in different communication systems.

BACKGROUND ART

Electronic devices may be divided into mobile/portable terminals and stationary terminals according to mobility. Also, the electronic device may be classified into handheld types and vehicle mount types according to whether or not a user can directly carry.

Functions of electronic devices are diversified. Examples of such functions include data and voice communications, capturing images and video via a camera, recording audio, playing music files via a speaker system, and displaying images and video on a display. Some terminals include additional electronic game play functions or perform a multimedia player function. Specifically, in recent years, mobile terminals can receive broadcast and multicast signals to allow viewing of video or television programs.

As it becomes multifunctional, an electronic device can be allowed to capture still images or moving images, play music or video files, play games and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. Also, it is expected that in the future, wireless communication systems using 5G communication technology will be commercialized to provide a variety of services. Meanwhile, some of LTE frequency bands may be allocated to provide 5G communication services.

In this regard, the electronic device may be configured to provide 5G communication services in various frequency bands. Recently, attempts have been made to provide 5G communication services using a sub-6 band below a 6 GHz band. In the future, it is also expected to provide 5G communication services by using a millimeter wave (mmWave) band in addition to the sub-6 band for faster data rate.

Meanwhile, electronic devices that provide 4G and 5G communication services may be provided in various form factors. As an example of the form factors for the electronic device, a foldable device and a swivel device may be considered. The foldable device or the swivel device may cause deviation in wireless performance in open and closed states. Accordingly, a module such as a mmWave module, which operates in a high frequency band, may be disposed inside the electronic device.

Meanwhile, when the mmWave modules are disposed inside the electronic device, some of the mmWave modules may be disposed to face a side surface region of the electronic device. There is a problem that the antenna radiation performance of the mmWave module disposed to face such a side surface portion may be degraded by a metal rim.

DISCLOSURE OF INVENTION

Technical Problem

The present disclosure is directed to solving the aforementioned problems and other drawbacks. Another aspect of the implementation is to provide an antenna structure capable of minimizing changes in characteristics of antennas disposed on side surfaces of an electronic device when a form factor changes.

Still another aspect of the implementation is to provide an antenna structure capable of minimizing changes in antenna characteristics due to frame rotation in a swivel structure.

Yet still another aspect of the present disclosure is to provide an electronic device having various form factors capable of radiating electromagnetic waves through a side surface of the electronic device.

Still yet another aspect of the present disclosure is to provide a structure capable of radiating electromagnetic waves through a side surface of the electronic device while a mmWave antenna module is disposed at a low slant angle.

Solution to Problem

In order to achieve the foregoing or other objectives, a mobile terminal having an antenna according to an embodiment is provided. The mobile terminal may include a housing having a front side, a rear side and lateral sides, and including a metal rim formed of a metal material and at least one bending portion formed of a non-metal material. The mobile terminal may include a rear cover disposed on the rear side of the housing, a reflection sheet disposed on the cover and formed of a metal material; and an antenna module disposed between a rear side of the housing and a front cover, and configured to radiate a beamforming radio signal, wherein the bending portion of the cover and the planar portion of the cover include a first region, a second region, and a third region, and the beamforming radio signal of the first region is reflected from the second region and the third region by the reflection sheet.

For one embodiment, the lateral side of the housing may have two short sides and two long sides that are longer than the two short sides. The cover may have a planar portion and at least one bending portion bent from the planar portion.

For one embodiment, the antenna module may include an insulating member, an electronic element disposed on a surface of the insulating member, and antenna patterns disposed on the other surface of the insulating member, wherein the antenna module is tilted from a portion of the rear side of the housing.

For one embodiment, a side surface shape of the mobile terminal may be defined by the bending portion of the cover and a lateral side of the housing, wherein the bending portion of the cover and the planar portion of the cover include a first region, a second region, and a third region. The second region may be disposed to face the antenna patterns, the third region may be connected to a portion of the second region adjacent to a side surface portion of the housing, the first region may be connected another region of the second region opposite to the third region, and the reflection sheet may be disposed on the first region of the cover.

For one embodiment, as the antenna module is tilted, a first edge of a front surface of the antenna module adjacent to the side surface may be disposed closer to a rear case than a second edge thereof, and a third edge of a rear surface of the antenna module may be configured to be farther from an inside of a front housing than a fourth edge thereof.

For one embodiment, the antenna module may further include a module mounting portion disposed to surround a rear surface and a side surface of the antenna module, wherein the module mounting portion is formed of a metal material to transmit heat generated from the antenna module to the housing formed of a metal material.

For one embodiment, an end portion of each antenna element of the antenna module may be extended to form a first line and the other end portion of the antenna element may be extended to form a second line. The rear cover may include the first region disposed to correspond to the planar portion in a direction in which the planar portion is disposed from the first line; the second region disposed to correspond to a region overlapping the antenna element of the antenna module between the first line and the second line; and the third region corresponding to a side edge of the rear cover from the second line.

For one embodiment, the reflection sheet may be disposed to be spaced apart from the first line by a distance of 1.0 mm or less in the first region of the rear cover.

For one embodiment, the beamforming radio signal radiated from the antenna module may be radiated through a second region of the rear cover overlapping the antenna module, and blocked in a first region of the rear cover where the reflection sheet is disposed.

A mobile terminal having an antenna according to another aspect of the present disclosure is disclosed. The mobile terminal may include a housing having a front side, a rear side and lateral sides, and including a metal rim formed of a metal material and at least one bending portion formed of a non-metal material. The mobile terminal may include a rear cover disposed on the rear side of the housing; a reflection sheet disposed on the cover and formed of a metal material; an antenna module disposed between a rear side of the housing and a front cover, and configured to radiate a beamforming radio signal; and an antenna frame configured to support the antenna module and formed of a metal material, wherein the bending portion of the cover and the planar portion of the cover include a first region, a second region, and a third region, and the beamforming radio signal of the first region is reflected from the second region and the third region by the reflection sheet.

A mobile terminal having an antenna according to still another aspect of the present disclosure is disclosed. The mobile terminal may include a housing having a front side, a rear side and lateral sides, and including a metal rim formed of a metal material and at least one bending portion formed of a non-metal material. The mobile terminal may include a rear cover disposed on the rear side of the housing; first and second reflection sheets disposed on different side surfaces of the cover and formed of a metal material; first and second antenna modules disposed between a rear side of the housing and first and second side edge portions of the front cover; and first and second antenna frames configured to support the first and second antenna modules and formed of a metal material.

For one embodiment, the first antenna module and the second antenna module may be configured to radiate beamforming radio signals, wherein each of the first and second antenna modules includes an insulating member, an electronic element disposed on a surface of the insulating member, and antenna patterns disposed on the other surface of the insulating member.

For one embodiment, the first antenna frame may be configured to transmit heat from the first antenna module to the housing, and the second antenna frame may be configured to transmit heat from the second antenna module to the housing.

For one embodiment, the first antenna module may be tilted at a portion of the rear side of the housing, and the second antenna module may be tilted at another portion at the rear side of the housing, For one embodiment, the exterior of a first side of the mobile terminal may be defined by a first bending portion of the cover and a first side surface portion of the housing, and the exterior of a second side of the mobile terminal may be defined by a second bending portion of the cover and a second side surface portion of the housing.

For one embodiment, part of the first bending portion of the cover and part of the planar portion of the cover may include a first region, a second region, and a third region, wherein the second region faces a first antenna pattern, the third region is connected to a portion of the second region adjacent to the first side surface portion of the housing, and the first region is connected to another portion of the second region opposite to the third region. The first reflection sheet may be disposed on the first region of the cover, and a beamforming radio signal of the first region may be reflected to the second and third regions by the first reflection sheet.

For one embodiment, part of the second bending portion of the cover and part of the planar portion of the cover may include a fourth region, a fifth region, and a sixth region, wherein the fifth region faces the second antenna pattern, the sixth region is connected to a portion of the fifth region adjacent to the second side surface portion of the housing, and the fourth region is connected to another portion of the fifth region opposite to the sixth region. The second reflection sheet may be disposed on the fourth region of the cover, and a beamforming radio signal of the fourth region may be reflected to the fifth and sixth regions by the second reflection sheet, and For one embodiment, a tilting angle of the first antenna module may be different from that of the second antenna module. The tilting angle of the first antenna module may be set to an angle smaller than the tilting angle of the second antenna module. The tilting angle of the first antenna module may be 18 degrees, and the tilting angle of the second antenna module may be set to 55 degrees.

Advantageous Effects of Invention

According to the present disclosure, in an antenna structure disposed in a side surface (or side portion) of an electronic device, an antenna structure that minimizes changes in antenna characteristics even when the form factor of the electronic device is changed.

According to the present disclosure, by minimizing the changes in antenna characteristic due to frame rotation in a swivel structure, rotation wireless performance can be maintained at a predetermined level even when a display region is rotated.

According to the present disclosure, in an electronic device having various form factors, electromagnetic waves may be radiated through a side surface of the electronic device.

According to the present disclosure, a metal sheet may be attached to a cover to radiate electromagnetic waves through a side surface of an electronic device so as to radiate a signal to a side surface portion of the electronic device while disposing a mmWave antenna module at a low slant angle.

According to the present disclosure, a mmWave antenna module may be disposed at a low slant angle to avoid interference with a metal structure in a side surface portion of an electronic device while radiating electromagnetic waves through a side surface thereof.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

BRIEF DESCRIPTION OF DRAWINGS

FIG. 5B shows a change in a slot length in accordance with a change in a subcarrier spacing in the NR.

MODE FOR THE INVENTION

Figure 1A:
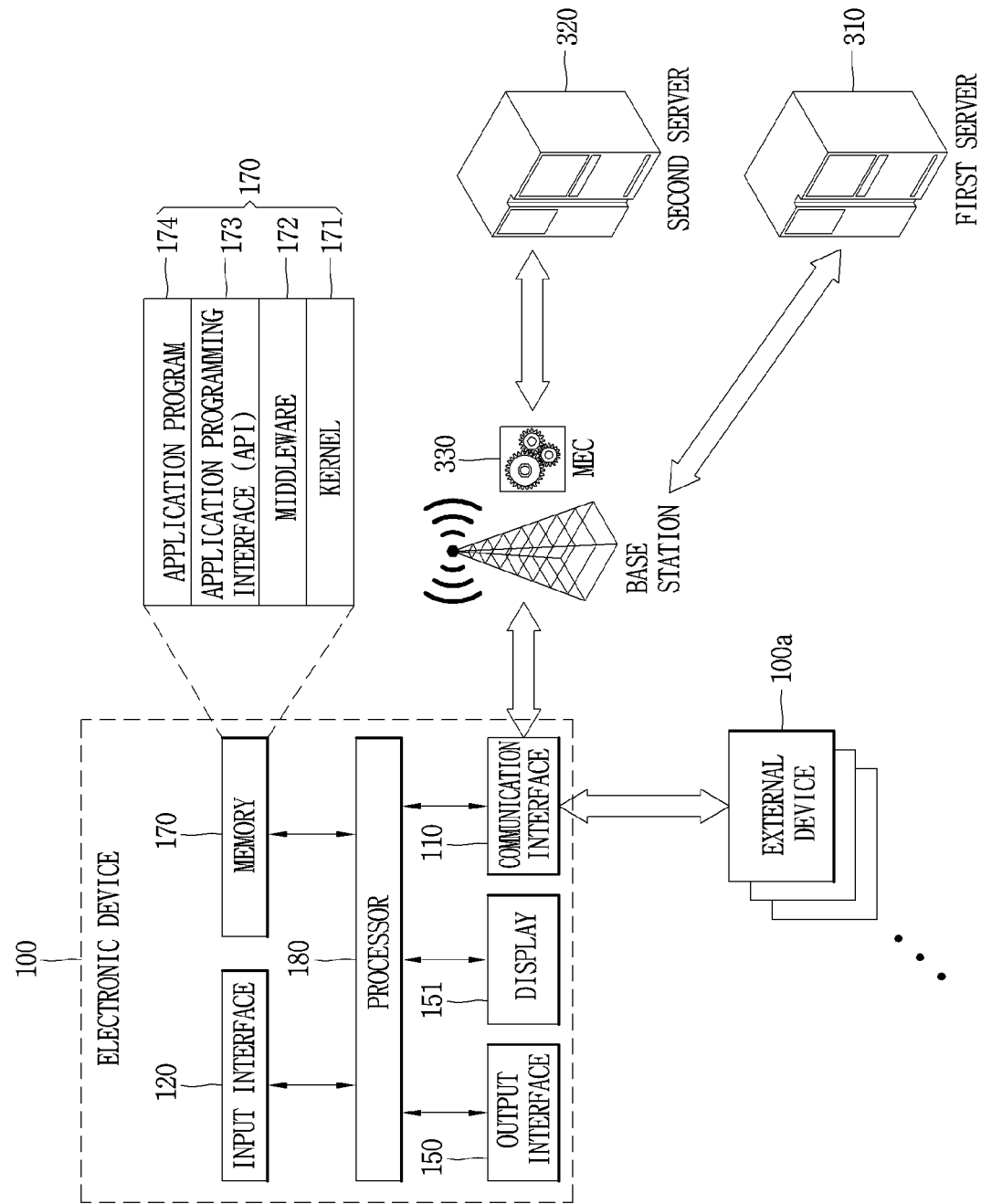
FIG. 1A is a view illustrating a configuration for describing an electronic device in accordance with one implementation, and an interface between the electronic device and an external device or server.

Hereinafter, preferred embodiments of the present disclosure will be described in detail with reference to the accompanying drawings, and the same or similar elements are designated with the same numeral references regardless of the numerals in the drawings and redundant description thereof will be omitted. In general, a suffix such as "module" and "unit" may be used to refer to elements or components. Use of such a suffix herein is merely intended to facilitate description of the specification, and the suffix itself is not intended to give any special meaning or function. In describing the present disclosure, moreover, the detailed description will be omitted when a specific description for publicly known technologies to which the invention pertains is judged to obscure the gist of the present disclosure. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer elements, functions, or steps may likewise be utilized.

Electronic devices presented herein may be implemented using a variety of different types of terminals. Examples of such devices include cellular phones, smart phones, user equipment, laptop computers, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

However, it may be easily understood by those skilled in the art that the configuration according to the embodiments of this specification can also be applied to stationary terminals such as digital TV, desktop computers, digital signages, and the like, excluding a case of being applicable only to the mobile terminals.

Figure 1B:
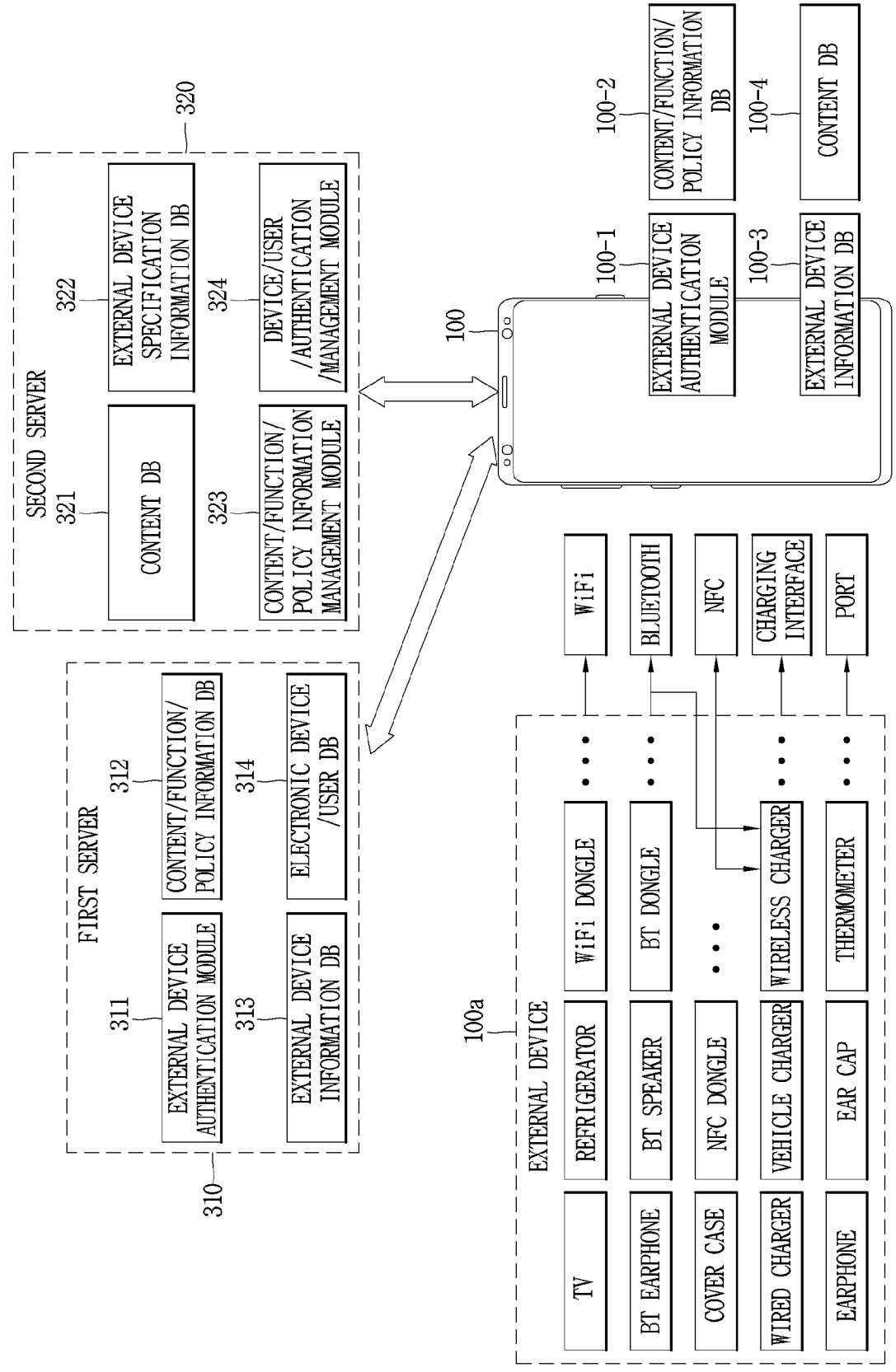
FIG. 1B is a view illustrating a detailed configuration in which the electronic device according to the one implementation is interfaced with an external device or a server.
Figure 1C:
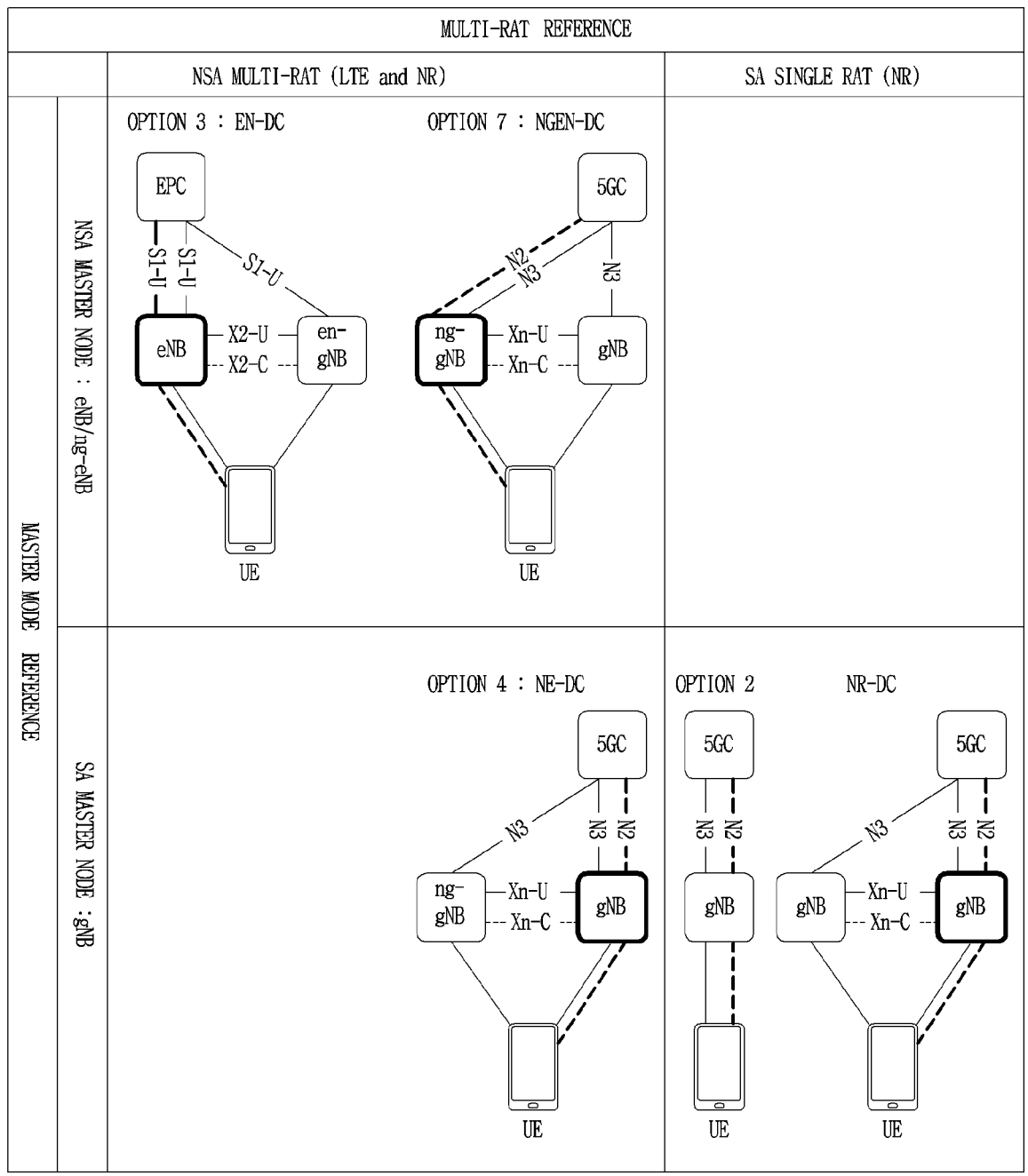
FIG. 1C is a view illustrating a configuration in which the electronic device according to the one implementation is interfaced with a plurality of base stations or network entities.

Referring to FIGS. 1A to 1C, FIG. 1A is a view illustrating a configuration for describing an electronic device in accordance with one implementation, and an interface between the electronic device and an external device or server. FIG. 1B is a view illustrating a detailed configuration in which the electronic device according to the one implementation is interfaced with an external device or a server. FIG. 1C is a view illustrating a configuration in which the electronic device according to the one implementation is interfaced with a plurality of base stations or network entities.

Figure 2A:
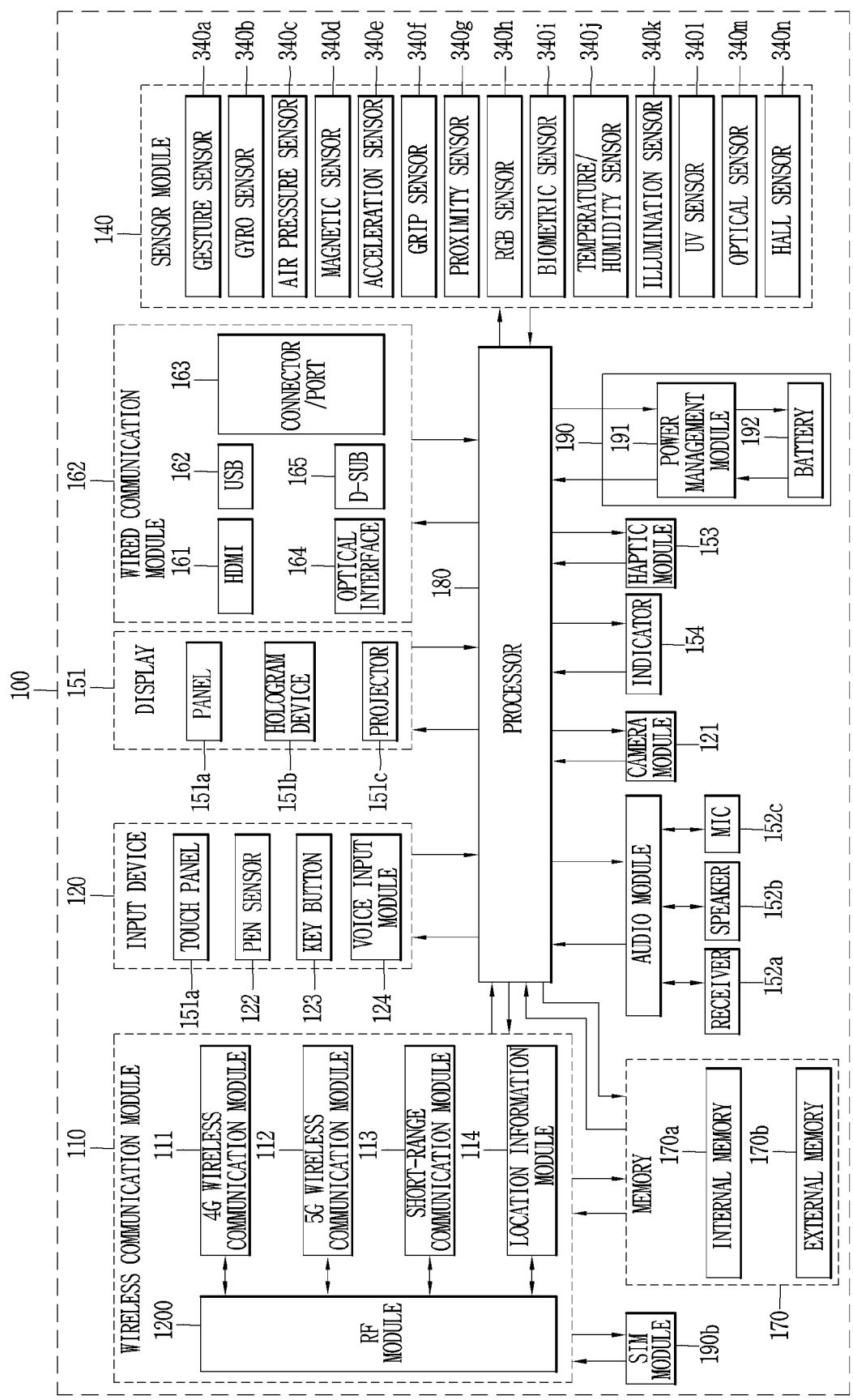
FIG. 2A is a view illustrating a detailed configuration of the electronic device of FIG. 1A.
Figure 2B:
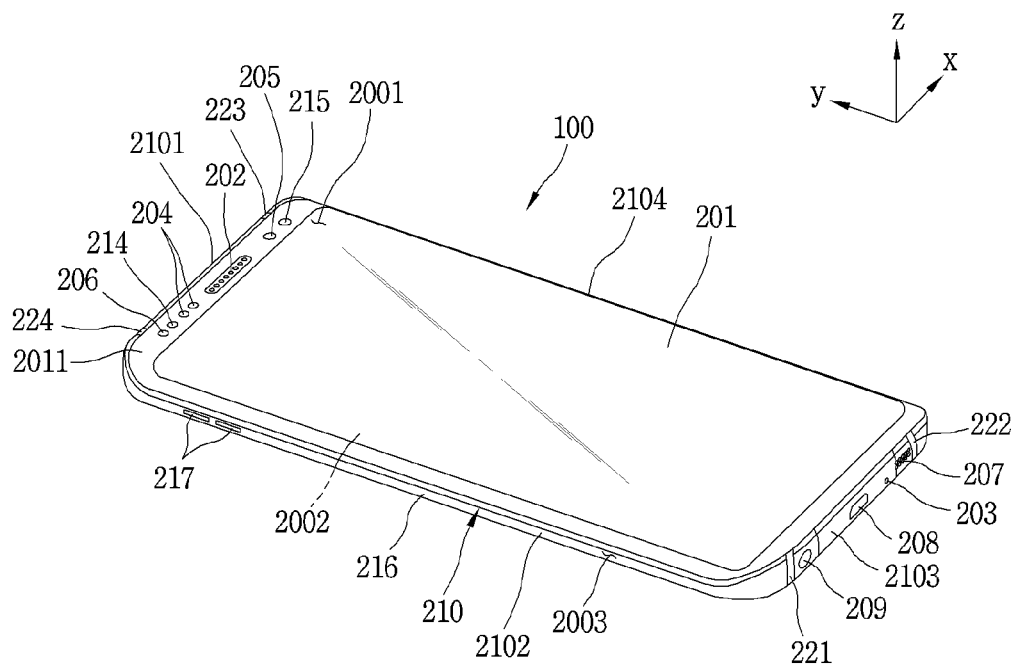
FIGS. 2B and 2C are conceptual views illustrating one example of an electronic device according to the present disclosure, viewed from different directions.
Figure 2B:
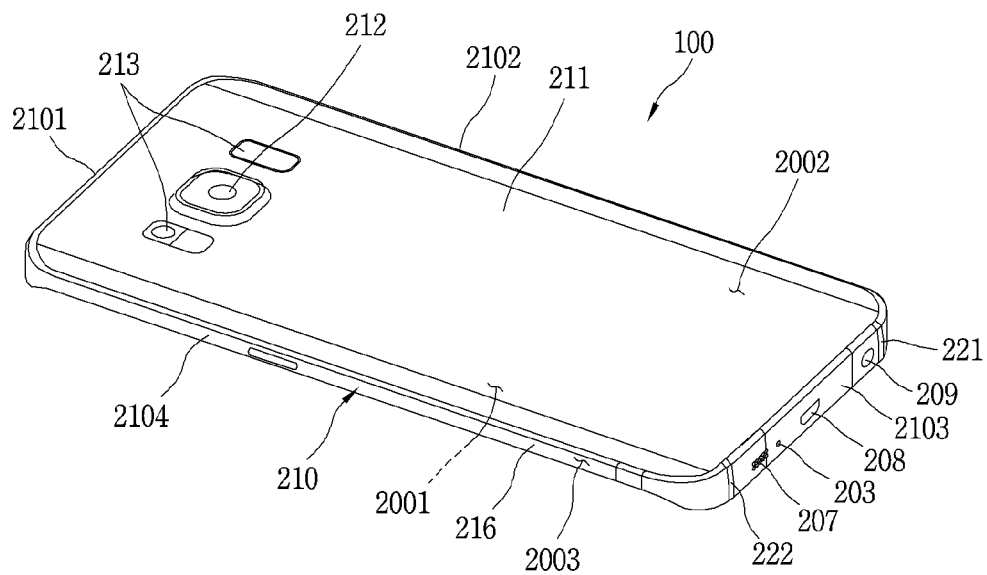
Figure 2C:
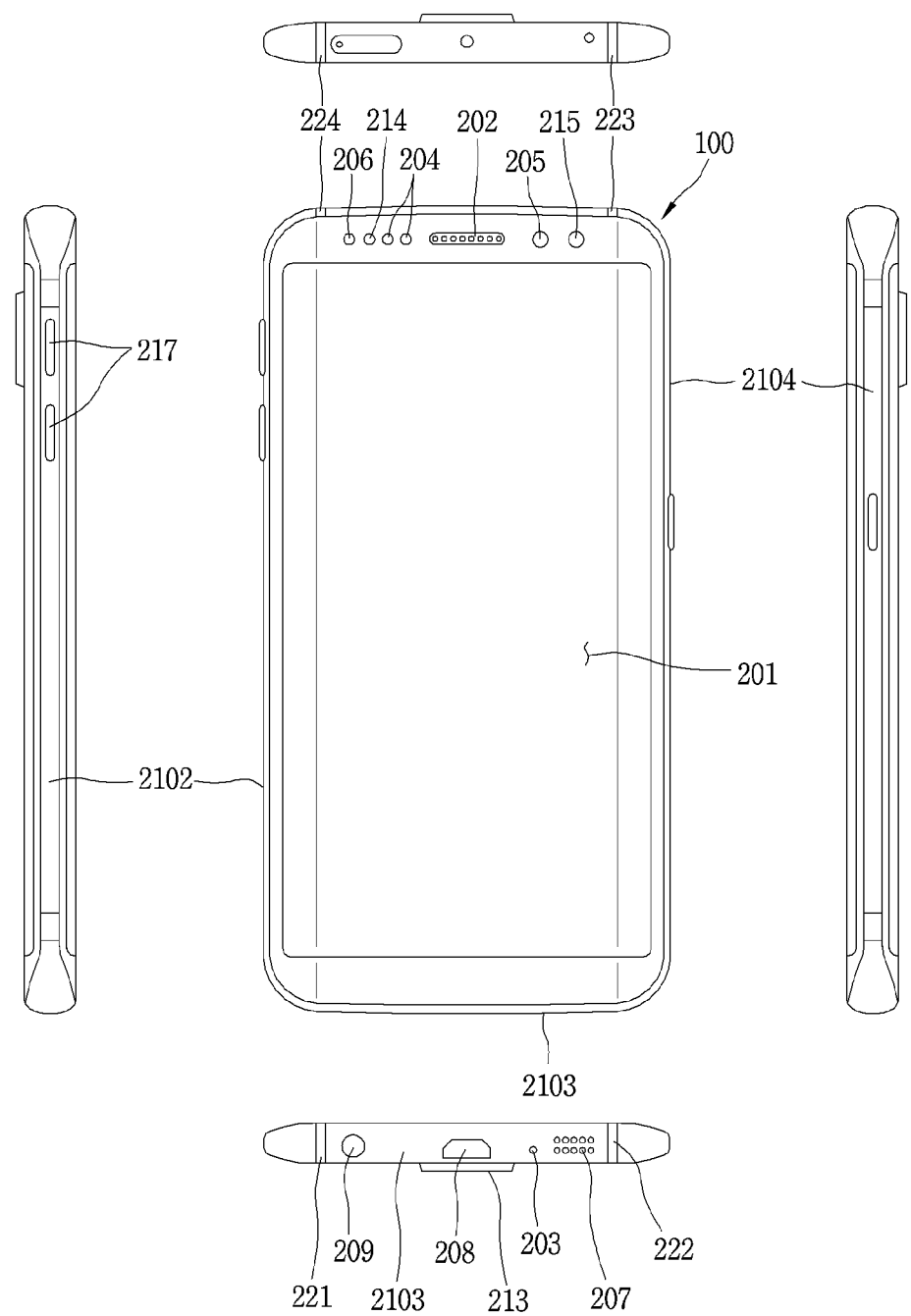

Meanwhile, referring to FIGS. 2A to 2B, FIG. 2A is a view illustrating a detailed configuration of the electronic device of FIG. 1A. FIGS. 2B and 2C are conceptual views illustrating one example of an electronic device according to the present disclosure, viewed from different directions.

Referring to FIG. 1A, the electronic device 100 may include a communication interface 110, an input interface (or an input device) 120, an output interface (or an output device) 150, and a processor 180. Here, the communication interface 110 may refer to a wireless communication module 110. Further, the electronic device 100 may further include a display 151 and a memory 170. It is understood that implementing all of the illustrated components of FIG. 1A is not a requirement. Greater or fewer components may alternatively be implemented.

In more detail, among others, the wireless communication module 110 may typically include one or more modules which permit communications such as wireless communications between the electronic device 100 and a wireless communication system, communications between the electronic device 100 and another electronic device, or communications between the electronic device 100 and an external server. Further, the wireless communication module 110 may typically include one or more modules which connect the electronic device 100 to one or more networks. Here, the one or more networks may be, for instance, a 4G communication network and a 5G communication network.

Referring to FIGS. 1A and 2A, the wireless communication module 110 may include at least one of a 4G wireless communication module 111, a 5G wireless communication module 112, a short-range communication module 113, and a location information module 114. In this regard, the 4G wireless communication module 111, the 5G wireless communication module 112, the short-range communication module 113, and the location information module 114 may be implemented with a baseband processor such as a modem. For an example, the 4G wireless communication module 111, the 5G wireless communication module 112, the short-range communication module 113 and the location information module 114 may be implemented as a transceiver circuit and a baseband processor operating in an IF band. Meanwhile, an RF module 1200 may be implemented as an RF transceiver circuit operating in an RF frequency band of each communication system. However, the present disclosure is not limited thereto, and the 4G wireless communication module 111, the 5G wireless communication module 112, the short-range communication module 113 and the location information module 114 may be interpreted to include each RF module.

The 4G wireless communication module 111 may transmit and receive 4G signals to and from 4G base stations through a 4G mobile communication network. At this time, the 4G wireless communication module 111 may transmit one or more 4G transmission signals to the 4G base station. Furthermore, the 4G wireless communication module 111 may receive one or more 4G reception signals from the 4G base station. In this regard, up-link (UL) multi-input multi-output (MIMO) may be performed by a plurality of 4G transmission signals transmitted to the 4G base station. Furthermore, downlink (DL) multi-input multi-output (MIMO) may be performed by a plurality of 4G reception signals received from the 4G base station.

The 5G wireless communication module 112 may transmit and receive 5G signals to and from 5G base stations through a 5G mobile communication network. Here, the 4G base station and the 5G base station may have a non-standalone (NSA) structure. For instance, the 4G base station and the 5G base station may have a co-located structure disposed at the same location within a cell. Alternatively, the 5G base station may be deployed in a stand-alone (SA) structure at a separate location from the 4G base station.

The 5G wireless communication module 112 may transmit and receive 5G signals to and from 5G base stations through a 5G mobile communication network. At this time, the 5G wireless communication module 112 may transmit one or more 5G transmission signals to the 5G base station. Furthermore, the 5G wireless communication module 112 may receive one or more 5G reception signals from the 5G base station.

In this case, a 5G frequency band may use the same band as a 4G frequency band, and it may be referred to as LTE re-farming. Meanwhile, a sub-6 frequency band, which is a range of 6 GHz or less, may be used as the 5G frequency band.

On the contrary, a millimeter wave (mmWave) band may be used as a 5G frequency band to perform wide band high-speed communication. When the mmWave band is used, the electronic device 100 may perform beamforming for communication coverage expansion with a base station.

Meanwhile, regardless of the 5G frequency band, in a 5G communication system, a larger number of multi-input multi-output (MIMO) may be supported to improve transmission speed. In this regard, Up-Link (UL) MIMO may be performed by a plurality of 5G transmission signals transmitted to a 5G base station. In addition, DL MIMO may be performed by a plurality of 5G reception signals received from the 5G base station.

Meanwhile, the wireless communication module 110 may be in a dual connectivity (DC) state with a 4G base station and a 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, when the 4G base station and the 5G base station have a co-located structure, it is possible to improve throughput through inter-CA (Carrier Aggregation). Therefore, in an EN-DC state with the 4G base station and the 5G base station, 4G reception signals and 5G reception signals may be simultaneously received through the 4G wireless communication module 111 and the 5G wireless communication module 112.

The short-range communication module 113 is configured to facilitate short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 113 in general supports wireless communications between the electronic device 100 and a wireless communication system, communications between the electronic device 100 and another electronic device, or communications between the electronic device and a network where another electronic device (or an external server) is located, via wireless area networks. The short-range communication module denotes a module for short-range communications.

Meanwhile, short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission speed improvement and communication system convergence, carrier aggregation (CA) using at least one of the 4G wireless communication module 111 and 5G wireless communication module 112 and the Wi-Fi communication module 113. In this regard, 4G+WiFi carrier aggregation (CA) may be performed using the 4G wireless communication module 111 and the Wi-Fi communication module 113. Alternatively, 5G+WiFi carrier aggregation (CA) may be performed using the 5G wireless communication module 112 and the Wi-Fi communication module 113.

The location information module 114 is a module for acquiring a location (or current location) of an electronic device, and a representative example thereof includes a Global Positioning System (GPS) module or a Wireless Fidelity (WiFi) module. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a radio signal to or from the Wi-Fi module. As the need arises, the location information module 114 may perform any function of the other modules of the wireless communication unit 110 to obtain data on the location of the electronic device. The location information module 114 is a module used for acquiring the position (or the current position) of the electronic device and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input device 120 may include a pen sensor 1200, a key button 123, a voice input module 124, a touch panel 151*a*, and the like. On the other hand, the input device 120 may include a camera module 121 for inputting an image signal, a microphone 152*c* or an audio input module for inputting an audio signal, or a user input unit 123 (e.g., a touch key, a push key (or a mechanical key), etc.) for allowing a user to input information. Audio data or image data collected by the input device 120 may be analyzed and processed by a user's control command.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 may include at least one of a gesture sensor 340*a*, a gyro sensor 340*b*, a barometric pressure sensor 340*c*, a magnetic sensor 340*d*, an acceleration sensor 340*e*, a grip sensor 340*f*, a proximity sensor 340*g*, a color sensor 340*h* (e.g., RGB (red, green, blue) sensor), a biometric sensor 340i, a temperature/humidity sensor 340j, an illuminance sensor 340k, or a UV (ultra violet) sensor 340l, an optical sensor 340m, and a hall sensor 340n. In addition, the sensor module 140 may include at least one of a finger scan sensor, an ultrasonic sensor, an optical sensor (e.g., a camera (refer to 121)), a microphone (refer to 152c), a battery gauge, an environmental sensor (e.g., a barometer, a hygrometer, a thermometer, a radiation detection sensor, a thermal detection sensor, a gas detection sensor, etc.), and a chemical sensor (e.g., an electronic nose, a healthcare sensor, a biometric sensor, etc.). The electronic device disclosed herein may be configured to utilize information obtained from one or more sensors, and combinations thereof.

The output interface 150 is configured to generate an output related to visual, auditory or tactile sense, and may include at least one of a display 151, an audio module 152, a haptic module 153, and an indicator 154.

In this regard, the display 151 may have an inter-layered structure or integrally formed with a touch sensor to implement a touch screen. The touch screen may function as the user input unit 123 which provides an input interface between the electronic device 100 and the user and simultaneously provide an output interface between the electronic device 100 and a user. For example, the display 151 may include a liquid crystal display (LCD), a light emitting diode (LED) display, an organic light emitting diode (OLED) display, or a micro electro mechanical system (MEMS) display, or an electronic paper display. For example, the display 151 may display various types of content (e.g., text, an image, a video, an icon, and/or a symbol) to the user. The display 151 may include a touch screen, and may receive, for example, a touch, gesture, proximity, or hovering input using an electronic pen or a part of the user's body.

Meanwhile, the display 151 may include a touch panel 151a, a hologram device 151b, a projector 151c, and/or a control circuit for controlling them. In this regard, the panel may be implemented to be flexible, transparent, or wearable. The panel may include the touch panel 151a and one or more modules. The hologram device 151b may display a stereoscopic image in the air by using the interference of light. The projector 151c may project light onto a screen to display an image. The screen may be located inside or outside the electronic device 100, for example.

The audio module 152 may be configured to interwork with a receiver 152a, a speaker 152b, and a microphone 152c. Meanwhile, the haptic module 153 may convert an electrical signal into a mechanical vibration, and generate a vibration or a haptic effect (e.g., pressure, texture). The electronic device may include, for example, a mobile TV support device (e.g., GPU) capable of processing media data according to standards such as digital multimedia broadcasting (DMB), digital video broadcasting (DVB), MediaFlow or the like. Furthermore, the indicator 154 may display a specific state of the electronic device 100 or a part thereof (e.g., the processor 180), for example, a booting state, a message state, a charging state, or the like.

A wired communication module 160, which may be implemented as an interface unit, functions as a path to various types of external devices connected to the electronic device 100. The wired communication module 160 may include an HDMI 162, a USB 162, a connector/port 163, an optical interface 164, a D-sub (D-subminiature) 165, or the like. Furthermore, the wired communication module 160 may include at least one of wired or wireless headset ports, external power supply ports, wired or wireless data ports, memory card ports, ports for connecting a device having an identification module, audio input/output (I/O) ports, video input/output (I/O) ports, earphone ports, or the like. The electronic device 100 may perform appropriate control related to an external device connected thereto in response to the external device being connected to the wired communication module 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the processor 180 to perform an operation (or function) for the electronic device 100.

In this regard, the first server 310 may be referred to as an authentication server, and the second server 320 may be referred to as a content server. The first server 310 and/or the second server 320 may interface with an electronic device through a base station. Meanwhile, a portion of the second server 320 corresponding to the content server may be implemented as a mobile edge cloud (MEC) 330 in units of base stations. Accordingly, a distributed network may be implemented through the second server 320 implemented as the mobile edge cloud (MEC) 330 to shorten a content transmission delay.

The memory 170 may include a volatile and/or a non-volatile memory. Furthermore, the memory 170 may include an internal memory 170a and an external memory 170b. The memory 170 may store, for example, commands or data related to at least one other component of the electronic device 100. According to one embodiment, the memory 170 may store software and/or a program 240. For example, the program 240 may include a kernel 171, middleware 172, an application programming interface (API) 173, an application program (or "application") 174, or the like. At least a part of the kernel 171, the middleware 172, or the API 174 may be referred to as an operating system (OS).

The kernel 171 may control or mange system resources (e.g., a bus, the memory 170, the processor 180, etc.) used to execute operations or functions implemented in other programs (e.g., the middleware 172, the application programming interface (API) 173, or the application program 174). In addition, the kernel 171 may provide an interface capable of controlling or managing system resources by accessing individual components of the electronic device 100 from the middleware 172, the API 173, or the application program 174.

The middleware 172 may play an intermediary role such that the API 173 or the application program 174 communicates with the kernel 171 to send and receive data. Furthermore, the middleware 172 may process one or more work requests received from the application program 247 according to priority. In one embodiment, the middleware 172 may give a priority capable of using the system resource (e.g., the bus, the memory 170, the processor 180, etc.) of the electronic device 100 to at least one of the application programs 174 to process one or more work requests. The API 173, which is an interface for the application program 174 to control a function provided by the kernel 171 or the middleware 1723, may include, for instance, at least one interface or function (e.g., command) for file control, window control, image processing, text control, or the like.

The processor 180 typically functions to control an overall operation of the electronic device 100, in addition to the operations associated with the application programs. The processor 180 may provide or process information or functions appropriate for a user by processing signals, data, information and the like, which are input or output by the foregoing components, or executing application programs stored in the memory 170. Furthermore, the processor 180 may control at least part of the components illustrated in FIGS. 1A and 2A, in order to execute the application programs stored in the memory 170. In addition, the processor 180 may control a combination of at least two of those components included in the electronic device 100 to activate the application program.

The processor 180 may include one or more of a central processing unit (CPU), an application processor (AP), an image signal processor (ISP), a communication processor (CP), and a low-power processor (e.g., a sensor hub). For example, the processor 180 may execute an operation or data processing related to control and/or communication of at least one other component of the electronic device 100.

The power supply unit 190 may be configured to receive external power or provide internal power in order to supply appropriate power required for operating elements and components included in the electronic device 100, under the control of the processor 180. The power supply unit 190 includes a power management module 191 and a battery 192, and the battery 192 may be a built-in battery or a replaceable battery. The power management module 191 may include a power management integrated circuit (PMIC), a charger IC, or a battery or fuel gauge. The PMIC may have a wired and/or wireless charging method. The wireless charging method includes, for example, a magnetic resonance method, a magnetic induction method or an electromagnetic wave method, and may further include an additional circuit for wireless charging, for example, a coil loop, a resonance circuit, a rectifier, or the like. The battery gauge may measure, for example, the remaining amount, voltage, current, or temperature during charging of a battery 396. For example, battery 192 may include a rechargeable cell and/or a solar cell.

Each of an external device 100a, the first server 310, and the second server 320 may be the same or a different type of device (e.g., an external device or a server) as the electronic device 100. According to one embodiment, all or a part of operations executed in the electronic device 100 may be executed by one or more other electronic devices (e.g., the external device 100a, the first server 310, and the second server 320). According to one embodiment, when the electronic device 100 needs to perform a function or service automatically or upon request, the electronic device 100 may request at least some functions related thereto to other devices (e.g., the external device 100a, the first server 310, and the second server 320) instead of performing the function or service by itself. The other electronic device (e.g., the external device 100a, the first server 310, and the second server 320) may execute the requested function or additional function and transfer a result of the execution to the electronic device 100. The electronic device 100 may provide the requested function or service by processing the received result as it is or additionally. For this purpose, for example, cloud computing, distributed computing, client-server computing, or mobile edge cloud (MEC) technology may be used.

At least part of the components may cooperatively operate to implement an operation, a control or a control method of an electronic device according to various implementations disclosed herein. Also, the operation, the control or the control method of the electronic device may be implemented on the electronic device by an activation of at least one application program stored in the memory 170.

1a Referring to FIGS. 1A and 1B, a wireless communication system may include an electronic device 100, at least one external device 100a, a first server 310, and a second server 320. The electronic device 100 may be functionally connected to at least one external device 100a, and may control contents or functions of the electronic device 100 based on information received from the at least one external device 100a. According to one embodiment of the present disclosure, the electronic device 100 may perform authentication to determine whether the at least one external device 100 includes or generates information following a predetermined rule using the servers 310, 320. Furthermore, the electronic device 100 may display content or control functions differently by controlling the electronic device 100 based on the authentication result. According to an implementation, the electronic device 100 may be connected to at least one external device 100a through a wired or wireless communication interface to receive or transmit information. For example, the electronic device 100 and the at least one external device 100a may receive and transmit information in a manner such as near field communication (NFC), a charger (e.g., universal serial bus (USB)-C)), an ear jack, BT (Bluetooth) or WiFi (wireless fidelity).

The electronic device 100 may include at least one of an external device authentication module 100-1, a content/function/policy information DB 100-2, an external device information DB 100-3, or a content DB 104. The at least one external device 100a, as an assistant apparatus associated with the electronic device 100, may be a device designed for various purposes, such as ease of use, increased appearance aesthetics, and enhanced usability of the electronic device 100. The at least one external device 100a may or may not be in physical contact with the electronic device 100. According to one embodiment, the at least one external device 100a may be functionally connected to the electronic device 100 using a wired/wireless communication module to control information for controlling content or a function in the electronic device 100.

According to one embodiment, the at least one external device 100a may include an authentication module for encrypting/decrypting at least one of various pieces of information included in the external device information, or storing or managing it in a physical/virtual memory area that is not directly accessible from the outside. According to one implementation, the at least one external device 100a may perform communication with the electronic device 100 or may provide information through communication between the external devices. According to one embodiment, the at least one external device 100a may be functionally connected to the server 410 or 320. In various embodiments, the at least one external device 100a may be various types of products such as a cover case, an NFC dongle, a car charger, an earphone, an ear cap (e.g., an accessory device mounted on a mobile phone audio connector), a thermometer, an electronic pen, a BT earphone, a BT speaker, a BT dongle, a TV, a refrigerator, and a WiFi dongle.

In this regard, for example, the external device 100a such as a wireless charger may supply power to the electronic device 100 using a charging interface such as a coil. In this case, control information may be exchanged between the external device 100a and the electronic device 100 through in-band communication through a charging interface such as a coil. Meanwhile, control information may be exchanged between the external device 100a and the electronic device 100 through out-of-band communication such as Bluetooth or NFC.

On the other hand, the first server 310 may include a server or a cloud device for a service associated with the at least one external device 100a, or a hub device for controlling a service in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication related server. The second server 320 may include a server or cloud device for providing a service or content, or a hub device for providing a service in a smart home environment. The second server 320 may include at least one of a content DB 321, an external device specification information DB 322, a content/function/policy information management module 323, and a device/user authentication/management module 324. The second server 320 may be referred to as a content management server, a content server, or a content related server.

On the other hand, the electronic device 100 described herein may maintain a connection state between a 4G base station (eNB) and a 5G base station (eNB) through the 4G wireless communication module 111 and/or the 5G wireless communication module 112. In this regard, as described above, FIG. 1C illustrates a configuration in which the electronic device 100 is interfaced with a plurality of base stations or network entities.

Referring to FIG. 1C, 4G/5G deployment options are shown. With regard to 4G/5G deployment, when multi-RAT of 4G LTE and 5G NR is supported in a non-standalone (NSA) mode, it may be implemented as EN-DC in option 3 or NGEN-DC in option 5. On the other hand, when multi-RAT is supported in a standalone (SA) mode, it may be implemented as NE-DC in option 4. In addition, when single RAT is supported in a standalone (SA) mode, it may be implemented as NR-DC in option 2.

The NR frequency band is defined as a frequency range of two types (FR1, FR2). The FR1 is a sub-6 GHz range, and the FR2 is a range of above 6 GHz, which may denote millimeter waves (mmWs).

Operating bands for dual connectivity may be specified to operate in EN-DC, NGEN-DC, or NR-DC configuration. EN-DC or NGEN-DC band combinations may include at least one E-UTRA operating band. Specifically, operating bands for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

A UE channel bandwidth for EN-DC may be defined. In this regard, a UE channel bandwidth for intra-band EN-DC in FR1 may be defined. Channel arrangements for DC may be defined. In this regard, channel spacing for intra-band EN-DC carriers may be defined.

The configuration for EN-DC may be defined. Specifically, configurations for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

As an example, UL EN-DC configuration may be defined for 2, 3, 4, 5, or 6 bands in FR1. In this regard, the UL EN-DC configuration for 2, 3, 4, 5, or 6 bands in FR1 may be made of a combination of EUTRA and NR configurations. This EN-DC, NGEN-DC, or NR-DC configuration may also be defined for downlink (DL) as well as uplink (UL).

Transmitter power may be defined in relation to EN-DC. UE maximum output power and UE maximum output power reduction may be defined for each configuration of the above-described EN-DCs. UE additional maximum output power reduction may be defined in relation to EN-DC. Configured output power for EN-DC and configured output power for NR-DC may be defined.

With regard to the base station type, the eNB is a 4G base station, which is also called an LTE eNB, and is based on the Rel-8-Rel-14 standard. On the other hand, ng-eNB is an eNB capable of interworking with a 5GC and gNB, which is also called an eLTE eNB, and is based on the Rel-15 standard. Furthermore, the gNB is a 5G base station interworking with a 5G NR and 5GC, which is also called an NR gNB, and is based on the Rel-15 standard. In addition, the en-gNB is a gNB capable of interworking with an EPC and an eNB, also called an NR gNB, and is based on the Rel-15 standard. With regard to the Dual Connectivity (DC) type, option 3 represents E-UTRA-NR Dual Connectivity (EN-DC). Option 7 represents NG-RAN E-UTRA-NR Dual Connectivity (NGEN-DC). Furthermore, option 4 represents NR-E-UTRA Dual Connectivity (NE-DC). Furthermore, option 2 represents NR-NR Dual Connectivity (NR-DC). In this regard, the technical features of double connection according to option 2 through option 7 are as follows.

Option 2: Independent 5G services may be provided with only a 5G system (5GC, gNB). In addition to enhanced Mobile Broadband (eMBB), Ultra-Reliable Low-Latency Communication (URLLC) and Massive Machine Type Communication (mMTC) may be possible, and 5GC features such as network slicing, MEC support, mobility on demand, and access-agnostic may be available to provide a full 5G service. Initially, due to coverage limitations, it may be used as a hot spot, an enterprise or overlay network, and when it is out of a 5G NR coverage, EPC-5GC interworking is required. A 5G NR full coverage may be provided, and dual connectivity (NR-DC) may be supported between gNBs using a plurality of 5G frequencies.

Option 3: This is a case where only a gNB is introduced into the existing LTE infrastructure. The core is an EPC and the gNB is an en-gNB that can interwork with the EPC and the eNB. The dual connectivity (EN-DC) is supported between the eNB and the en-gNB, and the master node is an eNB. An eNB, which is a control anchor of an en-gNB, processes control signaling for network access, connection configuration, handover, etc. of a UE, and user traffic may be transmitted through the eNB and/or the en-gNB. It is an option that is mainly applied to a first stage of 5G migration, as an operator operating an LTE nationwide network is able to quickly build a 5G network with the introduction of the en-gNB and minimal LTE upgrade without 5GC.

There are three types of option 3, which are options 3/3a/3x, depending on the user traffic split schemes. Bearer split is applied to options 3/3x, but is not applied to option 3a. The main scheme is option 3x.

Option 3: Only an eNB is connected to an EPC and an en-gNB is connected only to the eNB. User traffic may be split at a master node (eNB) and transmitted simultaneously to LTE and NR.

Option 3a: Both the eNB and the gNB are connected to the EPC, and thus user traffic is directly transferred from the EPC to the gNB. User traffic is transmitted to LTE or NR.

Option 3x: It is a combination of option 3 and option 3a, which differs from Option 3 in that user traffic is split at the secondary node (gNB).

The advantages of option 3 are i) that LTE can be used as a capacity booster for eMBB services, and ii) the terminal is always connected to LTE to provide service continuity through LTE even if it is out of 5G coverage or NR quality deteriorates so as to provide stable communication.

Option 4: 5GC is introduced, and still interworking with LTE, but independent 5G communication is possible. Core is 5GC, and the eNB is an ng-eNB capable of interworking with 5GC and a gNB. Dual connectivity (NE-DC) is supported between an ng-eNB and a gNB, and the master node is the gNB. LTE may be used as a capacity booster when 5G NR coverage is fully extended. There are two types of option 4, which are option 4/4a. The main scheme is option 4a.

Option 7: 5GC is introduced, and still interworking with LTE, and 5G communication relies on LTE. Core is 5GC, and the eNB is an ng-eNB capable of interworking with 5GC and a gNB. Dual connectivity (NGEN-DC) is supported between an ng-eNB and a gNB, and the master node is a gNB. 5GC features may be used, and when 5G coverage is insufficient yet, service continuity may be provided using an eNB as the master node similar to option 3. There are three types of option 7, which are options 7/7a/7x, depending on the user traffic split schemes. Bearer split is applied to options 7/7x, but is not applied to option 7a. The main scheme is option 7x.

Referring to FIGS. 2B and 2C, the electronic device 100 disclosed herein has a bar-type terminal body. However, the electronic device 100 may alternatively be implemented in any of a variety of different configurations. Examples of such configurations include watch type, clip-type, glasses-type, or folder-type, flip-type, slide-type, swing-type, and swivel-type in which two and more bodies are combined with each other in a relatively movable manner, and combinations thereof. Discussion herein will often relate to a particular type of electronic device. However, such teachings with regard to a particular type of electronic device will generally be applied to other types of electronic devices as well. Here, considering the electronic device 100 as at least one assembly, the terminal body may be understood as a conception referring to the assembly.

Meanwhile, FIG. 2B shows a front view and a rear view of the electronic device 100 in which a display 201 is defined in an edge shape. Furthermore, FIG. 2C illustrates a front view and a side view of the electronic device 100 in which the display 201 is defined in an edge shape.

Referring to FIGS. 2B and 2C, the electronic device 100 may include a housing 210. According to one embodiment, the housing 210 may be formed of a conductive member and/or a non-conductive member. According to one embodiment, the housing 210 may include a first surface 2001 (e.g., front or upper surface) facing in a first direction (e.g., Z-axis direction), a second surface 2002 (e.g., rear or bottom surface) disposed in a direction opposite to the first surface 2001, and a side surface 2003 disposed in a manner of surrounding at least part of the first surface 2001 and the second surface 2002. According to one embodiment, the side surface 2003 may be formed by a side member 216 coupled to a front plate 2011 (e.g., glass plate or polymer plate including various coating layers), and a rear plate 211, the side member 216 including metal and/or polymer. According to one embodiment, the rear plate 211 may be formed, for example, of coated or tinted glass, ceramic, polymer, metal (e.g., aluminum, stainless steel (STS), or magnesium), or by a combination of at least two of the foregoing materials.

According to various embodiments, the side surface 2003 may be coupled to the front plate 2011 and the rear plate 211, and may be formed by the side member 216 (or "side bezel structure) including metal and/or polymer. In some embodiments, the rear plate 211 and the side member 216 may be integrally formed and may include the same material (e.g., a metal material such as aluminum or magnesium). According to one embodiment, the housing 210 may include a first portion 2101 having a first length, a second portion 2102 extending in a direction perpendicular to the first portion 2101 to have a second length, a third portion 2103 extending from the second portion 2102 to have the first length in parallel to the first portion 2101, and a fourth portion 2104 extending from the third portion 2103 to have the second length in parallel to the second portion 2102. According to one embodiment, the first portion 2101 may be disposed with a unit conductive portion 2101 electrically separated by a pair of non-conductive portions 223, 224, which are spaced apart by a predetermined distance. In addition, the third portion 2103 may also be disposed with a unit conductive portion 2103 electrically separated by a pair of non-conductive portions 221, 222, which are spaced apart by a predetermined distance. However, the present disclosure may not be limited thereto, and the first portion 2101 and the third portion 2103 disposed with unit conductive portions may also be disposed with one or a plurality of non-conductive portions. The conductive portions 2101, 2103, which are electrically separated from each other, may be connected to a communication circuit disposed inside the electronic device 100 so as to be used as an antenna operating in at least one resonant frequency band.

According to various embodiments, the electronic device 100 may include the front plate 2011 (e.g., window or glass plate) disposed on the first surface 2001 and a display 201 (e.g., a touch screen display) disposed to be exposed through at least a partial region of the front plate 2011. According to one embodiment, the display 201 may be disposed to be coupled to or adjacent to a touch sensing circuit, a pressure sensor capable of measuring a strength (pressure) of a touch, and/or a pen detection sensor (e.g., a digitizer) detecting a magnetic stylus pen.

According to various embodiments, the electronic device 100 may include a call receiver hole 202. According to one embodiment, the electronic device 100 may be controlled to make a call with the other party through the call receiver hole 202 using a speaker disposed therein. According to one embodiment, the electronic device 100 may include a microphone hole 203. According to one embodiment, the electronic device 200 may use at least one microphone disposed therein to sense a direction of sound, and receive external sound through the microphone hole 203 or transmit a user voice to the other party.

According to various embodiments, the electronic device 100 may include at least one key input device 217. According to one embodiment, the key input device 217 may include at least one side key button 217 disposed on the side surface 2003 of the housing 210. According to one embodiment, the at least one side key button 217 may include a volume control button, a wake-up button, or a specific function (e.g., an artificial intelligence execution function or a quick voice recognition execution mode entry function) execution button.

According to various embodiments, the electronic device 100 may include components for performing various functions of the electronic device 100, which are disposed to be exposed to the display 201 or disposed not to be exposed thereto while performing the functions through the front plate 2011. According to one embodiment, at least some of the components may be disposed to be in contact with an external environment from an inside of the electronic device through at least a partial region of the front plate 2011 made of a transparent material. According to one embodiment, the components may include at least one sensor module 204. The sensor module 204 may include, for instance, an illumination sensor (e.g., a light sensor), a proximity sensor (e.g., a light sensor), an infrared sensor, an ultrasonic sensor, a fingerprint recognition sensor, a face recognition sensor, an EM sensor, or an iris recognition sensor. According to one embodiment, the component may include a first camera device 205. According to one embodiment, the component may include an indicator 206 (e.g., an LED device) for visually providing the status information of the electronic device 100 to a user. According to one embodiment, the component may include a light source 214 (e.g., an infrared LED) disposed on one side of the receiver 202. According to one embodiment, the component may include an imaging sensor assembly 215 (e.g., an iris camera) for detecting an iris image while light generated from the light source 214 is irradiated around the user's eyes. According to one embodiment, at least one of these components may be disposed to be exposed through at least a partial region of the second surface 2002 (e.g., rear or back surface) facing in a direction (e.g., −Z axis direction) opposite to the first direction of the electronic device 100.

According to various embodiments, the electronic device 100 may include an external speaker hole 207. According to one embodiment, the electronic device 100 may output sound through the external speaker hole 207 using a speaker disposed therein. According to one embodiment, the electronic device 100 may include a data transmission/reception function by an external device and a first connector hole 208 (e.g., an interface connector port) for charging the electronic device 200 by receiving an external power source. According to one embodiment, the electronic device 100 may include a second connector hole 209 (e.g., an ear jack assembly) for accommodating an ear jack of an external device.

According to various embodiments, the electronic device 100 may include a rear plate 211 (e.g., a rear window) disposed on the second surface 2002. According to one embodiment, a rear camera device 212 may be disposed on the rear plate 211. At least one electronic component 213 may be disposed around the rear camera device 212. According to one embodiment, the electronic component 213 may include at least one of an illuminance sensor (e.g., a light sensor), a proximity sensor (e.g., a light sensor), an infrared sensor, an ultrasonic sensor, a heart rate sensor, a fingerprint recognition sensor, an EM sensor, and a flash device.

According to various embodiments, the display 201 may include a touch panel and a display panel stacked on a rear surface of the front plate 2011. According to one embodiment, an image displayed through the display panel may be provided to a user through the front plate 2011 made of a transparent material. According to one embodiment, the front plate 2011 may be made of various materials such as transparent glass or acryl.

According to various embodiments, the electronic device 100 may include a sealing structure. According to one embodiment, the electronic device 100 may include at least one sealing member for sealing therein. According to one embodiment, at least one sealing member may be disposed between the display 201 and the side member 216 and/or between the side member 216 and the rear plate 211.

Figure 2D:
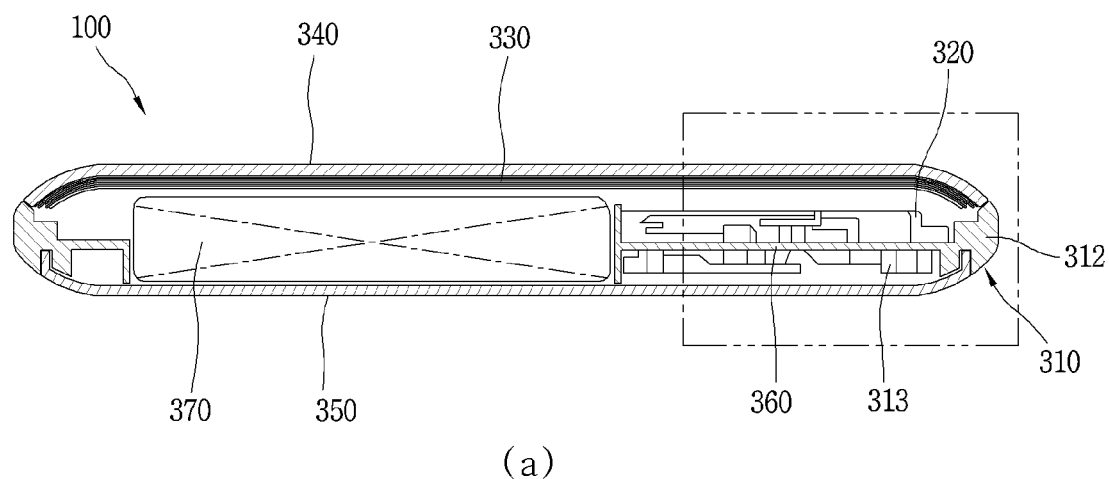
FIG. 2D is a view sectionally illustrating an electronic device in an assembled state according to various implementations and a sectional view illustrating a main part.
Figure 2D:
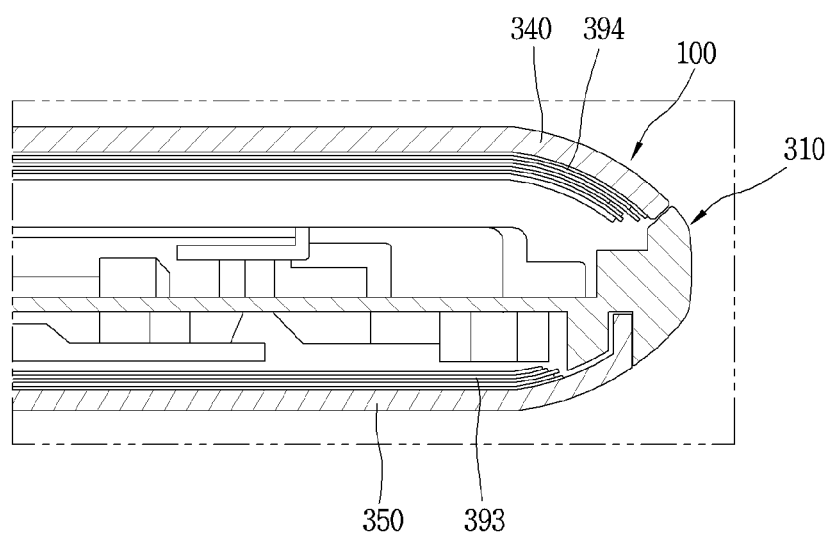

FIG. 2D is a view sectionally illustrating an electronic device in an assembled state according to various implementations and a sectional view illustrating a main part.

Referring to (a) of FIG. 2D, a bracket 320 may be fixed to a housing 310. According to one embodiment, the housing 310 may be formed by injection-molding a non-metal member (e.g., polycarbonate (PC)) 313 to the housing 310. A display module 330 may be fixed to a front surface of the bracket 320, and a front window 340 may be disposed on the display module 330. The front window 340 may be attached to and fixed to the bracket 320 by a first adhesive member 391 adjacent to an end portion of the housing 310. According to one embodiment, the front window 340 may be attached and fixed thereto. According to one embodiment, the front window 340 may be fixed to the bracket 320 by the first adhesive member 391 to correspond to the shape of the end portion of the housing 310. According to one embodiment, the front window 340 may have a uniform thickness and may be defined in a shape having a constant curvature. Both a flat portion and a left-right bent portion of the front window 340 may be defined to have a predetermined thickness.

According to various embodiments, a rear window 350 may be fixed to the housing 310 by a second adhesive member 392. An electronic component such as a PCB 360 may be accommodated in a space between the bracket 320 and the housing 310, and a battery 370 may be disposed in parallel to the PCB 360.

Referring to (b) of FIG. 2D, non-transparent layers 393, 394 may be disposed between a rear surface of the front window 340 and the display module 330 and between the housing 310 and a rear surface of the rear window 350, respectively. According to one embodiment of the present disclosure, the non-transparent layer 394 disposed on the front window 340 may be applied to a region (e.g., a BM region) other than the display region. According to one embodiment, the non-transparent layers 393, 394 may be implemented through a process such as printing, deposition, and painting, and an auxiliary material such as a film-type sheet may be additionally attached thereto. According to one embodiment of the present disclosure, the sheet may include various types of patterns on one surface, and may be formed through various processes such as ultraviolet (UV) molding, printing, and painting. According to one embodiment, the sheet may be applied to the front window 340 as well as the rear window 350. According to one embodiment, the electronic component may include an input device such as a touch panel, a charging device such as a wireless charging module, and a communication module such as an NFC antenna.

Meanwhile, the plurality of antennas arranged on a side surface of the terminal may be implemented with four or more antennas to support MIMO. In addition, when the 5G wireless communication module operates in a millimeter-wave (mmWave) band, as each of the plurality of antennas is implemented as an array antenna, a plurality of array antennas may be arranged in the electronic device.

Hereinafter, a multi-communication system structure and an electronic device including the same according to an embodiment, particularly embodiments related to an antenna and an electronic device including the same in a heterogeneous radio system, will be described with reference to the accompanying drawings. It will be apparent to those skilled in the art that the present disclosure may be embodied in other specific forms without departing from the spirit or essential characteristics thereof.

Meanwhile, a detailed operation and function of an electronic device having a plurality of antennas according to an embodiment provided with the 4G/5G wireless communication module as shown in FIG. 2A will be described below.

In a 5G communication system according to an embodiment, a 5G frequency band may be a higher frequency band than a sub-6 band. For example, the 5G frequency band may be a millimeter wave band, but the present disclosure is not limited thereto and may be changed according to an application.

Figure 3A:
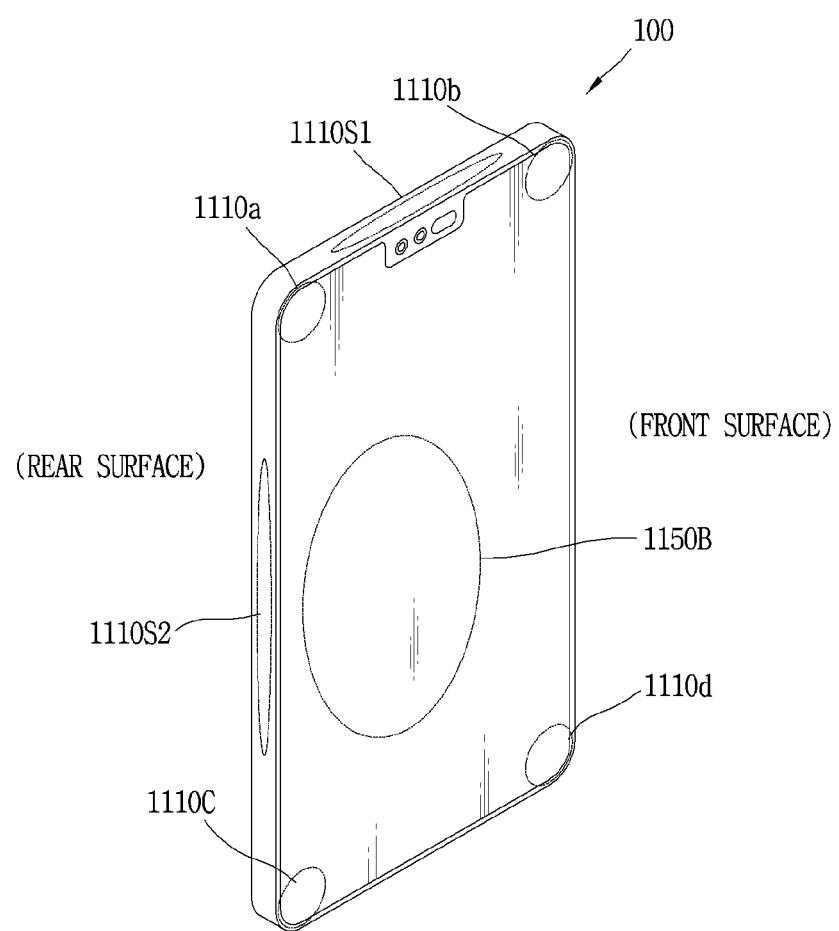
FIG. 3A shows an example of a configuration in which a plurality of antennas in an electronic device according to an embodiment can be disposed.

FIG. 3A shows an example of a configuration in which a plurality of antennas in an electronic device according to an embodiment can be disposed. Referring to FIG. 3A, a plurality of antennas 1110a to 1110d may be arranged on an inner side of or a front surface of the electronic device 100. In this regard, the plurality of antennas 1110a to 1110d may be implemented in a form printed on a carrier in an electronic device or in a system-on-chip (Soc) form along with an RFIC. Meanwhile, the plurality of antennas 1110a to 1110d may be disposed on a front surface of the electronic device in addition to an inner side of the electronic device. In this regard, the plurality of antennas 1110a to 1110d disposed on a front surface of the electronic device 100 may be implemented as transparent antennas embedded into a display.

Meanwhile, a plurality of antennas 1110S1 and 1110S2 may be disposed on a side surface of the electronic device 100. In this regard, a 4G antenna may be disposed on a side surface of the electronic device 100 in the form of a conductive member, and a slot may be disposed in a conductive member region, and the plurality of antennas 1110a to 1110d may be configured to radiate 5G signals through the slot. Furthermore, antennas 1150B may be arranged on a rear surface of the electronic device 100 to radiate 5G signals to the back.

In some examples, at least one signal may be transmitted or received through the plurality of antennas 1110S1 and 1110S2 on the side surfaces of the electronic device 100. In some examples, at least one signal may be transmitted or received through the plurality of antennas 1110a to 1110d, 1150B, 1110S1, and 1110S2 on the front surface and/or the side surfaces of the electronic device 100. The electronic device may communicate with the base station through any one of the plurality of antennas 1110a to 1110d, 1150B, 1110S1 and 1110S2. Alternatively, the electronic device may perform multi-input multi-output (MIMO) communication with the base station through two or more antennas among the plurality of antennas 1110a to 1110d, 1150B, 1110S1 and 1110S2.

Figure 3B:
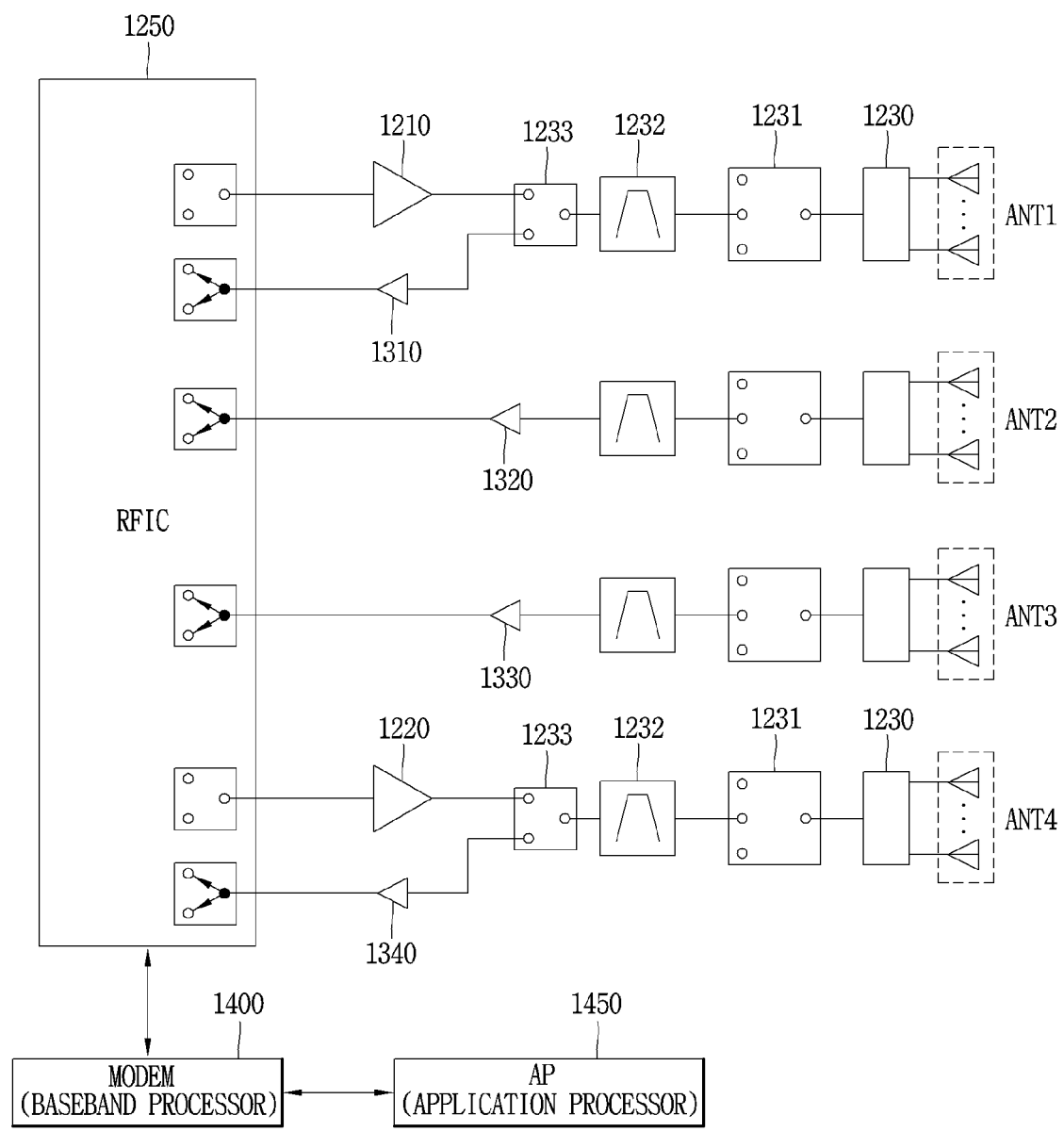
FIG. 3B illustrates a configuration of a wireless communication unit of an electronic device operable in a plurality of wireless communication systems according to an embodiment.

FIG. 3B illustrates a configuration of a wireless communication unit of an electronic device operable in a plurality of wireless communication systems according to an embodiment. Referring to FIG. 3B, the electronic device includes a first power amplifier 1210, a second power amplifier 1220, and an RFIC 1250. In addition, the electronic device may further include a modem 400 and an application processor (AP) 500. Here, the modem 400 and the application processor (AP) 500 may be physically implemented on a single chip, and may be implemented in a logical and functionally separated form. However, the present disclosure is not limited thereto and may be implemented in the form of a chip that is physically separated according to an application.

Meanwhile, the electronic device includes a plurality of low noise amplifiers (LNAs) 410 to 440 in the receiver. Here, the first power amplifier 1210, the second power amplifier 1220, the controller 1250, and the plurality of low noise amplifiers 310 to 340 are all operable in a first communication system and a second communication system. In this case, the first communication system and the second communication system may be a 4G communication system and a 5G communication system, respectively.

As illustrated in FIG. 2B, the RFIC 1250 may be configured as a 4G/5G integration type, but is not limited thereto, and may also be configured as a 4G/5G separation type according to an application. When the RFIC 1250 is configured as a 4G/5G integrated type, it is advantageous in terms of synchronization between 4G/5G circuits, and also there is an advantage capable of simplifying control signaling by the modem 1400.

On the other hand, when the RFIC 1250 is configured as the 4G/5G separated type, the separated RFIDs may be referred to as 4G RFIC and 5G RFIC, respectively. In particular, when a band difference between the 5G band and the 4G band is large, such as when the 5G band is configured as a millimeter wave band, the RFIC 1250 may be configured as a 4G/5G separation type. As such, when the RFIC 1250 is configured as a 4G/5G separation type, there is an advantage that the RF characteristics can be optimized for each of the 4G band and the 5G band.

Meanwhile, even when the RFIC 1250 is configured as a 4G/5G separation type, the 4G RFIC and the 5G RFIC may be logically and functionally separated but physically implemented on a single chip.

On the other hand, the application processor (AP) 1450 is configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate the power circuits of the transmitter and the receiver in a low power mode through the RFIC 1250.

In this regard, when it is determined that the electronic device is in an idle mode, the application processor (AP) 500 may control the RFIC 1250 through the modem 300 as follows. For example, when the electronic device is in an idle mode, the application processor 280 may control the RFIC 1250 through the modem 300, such that at least one of the first and second power amplifiers 110 and 120 operates in the low power mode or is turned off.

According to another implementation, the application processor (AP) 500 may control the modem 300 to provide wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, the application processor (AP) 500 may control the modem 1400 and the RFIC 1250 to perform short-range communication using only the short-range communication module 113, even at the expense of throughput.

According to another implementation, when the remaining battery level of the electronic device is above a threshold value, the modem 300 may be controlled to select an optimal wireless interface. For example, the application processor (AP) 1450 may control the modem 1400 to receive data through both the 4G base station and the 5G base station according to the remaining battery level and the available radio resource information. In this case, the application processor (AP) 1450 may receive the remaining battery information from the PMIC, and the available radio resource information from the modem 1400. Accordingly, when the remaining battery level and the available radio resources are sufficient, the application processor (AP) 500 may control the modem 1400 and the RFIC 1250 to receive data through both the 4G base station and 5G base station.

Meanwhile, the multi-transceiving system of FIG. 3B may integrate a transmitter and a receiver of each radio system into a single transceiver. Accordingly, there is an advantage in that a circuit portion for integrating two types of system signals may be eliminated at a RF front-end.

Furthermore, since the front-end parts can be controlled by an integrated transceiver, the front-end parts may be more efficiently integrated than when the transceiving system is separated by communication systems.

In addition, when separated by communication systems, it may be impossible to control other communication systems as required, or impossible to perform efficient resource allocation since system delay increases due to this. On the contrary, the multi-transceiving system as shown in FIG. 2 may control other communication systems as needed, thereby minimizing system delay due to this, and thus there is an advantage in that efficient resource allocation is possible.

Meanwhile, the first power amplifier 1210 and the second power amplifier 1220 may operate in at least one of the first and second communication systems. In this regard, when the 5G communication system operates in a 4G band or a sub-6 band, the first and second power amplifiers 1210 and 1220 may operate in both the first and second communication systems.

On the contrary, when the 5G communication system operates in a millimeter wave (mmWave) band, the first and second power amplifiers 1210, 1220 may operate in either the 4G band and the other in the millimeter wave band.

On the other hand, a transmitter and a receiver may be integrated to implement two different wireless communication systems using a single antenna using a dual transmit/receive antenna. Here, 4×4 MIMO may be implemented using four antennas as shown in FIG. 3B. In this case, 4×4 DL MIMO may be performed through downlink (DL).

In this regard, MIMO is a key technology to improve the throughput. It uses multiple antennas both on the transmitter and receiver sides, so as to enable multi-layer data transmission. NR supports multi-layer data transmission for a single UE (single-user MIMO) with a maximum of eight transmission layers for DL and four for UL. NR also supports multi-layer data transmission to multiple UEs on different layers (multi-user MIMO) using a maximum of twelve transmission layers for DL and UL transmissions.

Reference Signals (RSs) are specified by assuming multi-layer transmissions. For demodulation of date/control information for both uplink and downlink, demodulation RS (DM-RS) is supported. For measurement of channel state information of downlink, channel state information RS (CSI-RS) is supported. CSI-RS is also used for mobility measurement, measurement of gNB transmission beamforming, and frequency/time tracking. The CSI-RS used for the frequency/time tracking is named as tracking RS (TRS). In a high frequency range, phase noise is a problem that degrades the transmission performance. A phase tracking reference signal (PT-RS) is applied with respect to PDSCH and PUSCH to enable a receiver to track the phase and mitigate performance loss due to the phase noise. For uplink channel sounding, sounding RS (SRS) is supported.

For UL multi-layer data transmission, both codebook based precoding and non-codebook based precoding are supported. In codebook-based UL transmission, precoding matrix applied for PUSCH transmission is selected by gNB. In non-codebook based UL transmission, precoded multiple SRS are transmitted and then the gNB selects a desired transmission layer for PUSCH based on the reception of the SRS.

Since NR supports a multi-beam operation where every signal/channel is transmitted on directional beam, beamforming is an important technique for achieving higher throughput and sufficient coverage especially in a high frequency range. For DL transmission beamforming, a gNB applies transmission beamforming to SS/PBCH block and/or CSI-RS transmissions, and a UE measures reference signal received power on a physical layer (L1-RSRP) on the configured SS/PBCH block and/or CSI-RS resource. The UE reports an SS/PBCH block or CSI-RS resource with a maximum L1-RSRP value as L1-RSRP beam reporting. The gNB may decide gNB transmission beamforming for the UE based on the reported L1-RSRP. For PDCCH/PDSCH transmission, the gNB informs the UE that the gNB transmission beamforming applied to a certain SS/PBCH block or CSI-RS resource is applied to the PDCCH/PDSCH transmission so that the UE can apply reception beamforming which fits into the gNB transmission beamforming. For UL transmission beamforming, two mechanisms are supported. In one of the mechanisms, the UE transmits multiple SRS symbols with different UE transmission beamforming so that the gNB can measure them and identify the best UE transmission beamforming. In another mechanism, the UE generates UL transmission beamforming which is the same as DL reception beamforming used for SS/PBCH block or CSI-RS resource reception. In addition, beam failure recovery (BFR) is supported to achieve quick recovery from the beam failure. The UE can identify the beam failure and informs the gNB of the index of SS/PBCH block or CSI-RS resource as new candidate beam.

For DL channel state information (CSI) acquisition, NR supports two precoding matrix indicator (PMI) definitions, type I and II codebooks that provide different levels of CSI granularity.

Meanwhile, when the 5G band is a sub-6 band, first to fourth antennas ANT1 to ANT4 may be configured to operate in both the 4G band and the 5G band. In this regard, UL-MIMO and/or DL-MIMO may be performed through the first to fourth antennas ANT1 to ANT4.

In the case of PC2 UE having two transmitting antennas in a closed-loop spatial multiplexing scheme, maximum output power for all transmission bandwidths in a channel bandwidth may be specified. These maximum output power requirements may comply with the specified UL-MIMO configuration. For UE supporting UL-MIMO, the maximum output power may be measured as the sum of maximum output power at each UE antenna connector. A measurement period may be defined as at least one subframe (1 ms), but is not limited thereto. In the case of UE having two transmitting antennas in a closed-loop spatial multiplexing scheme, the maximum power reduction (MPR) allowable for maximum output power may be specified. In the case of UE having two transmitting antennas in a closed loop spatial multiplexing scheme, a specific additional maximum output power reduction (A-MPR) value may be applied to specific maximum output power. In the case of UE supporting UL-MIMO, transmission power may be configured for each UE. Definitions of the configured maximum output power $P_{CMAX,c}$, a lower limit $P_{CMAX\_L,c}$ and an upper limit $P_{CMAX\_H,c}$ may be applied to the UE supporting UL-MIMO.

Regarding the output power adjustment (dynamics) for UL-MIMO, the minimum output power for the UL-MIMO, transmission OFF power, transmission ON/OFF time mask, and power control may be applied. For UE having two transmitting antennas in a closed-loop spatial multiplexing scheme, the minimum output power is defined as the sum of an average power of each transmitting antenna in one subframe (1 ms). It may be controlled so that the minimum output power does not exceed a specific value.

If a 5G band is a mmWave band, UL-MIMO and/or DL-MIMO may be performed in the mmWave band through the first to fourth antennas ANT1 to ANT4. The operating band for UL-MIMO may be at least one of n257, n258, n260, and n261 bands. Transmission power for UL-MIMO may be defined. UE maximum power for UL-MIMO may be defined for each power class (PC). For PC1 UE, the UE maximum power may be defined as the maximum output power radiated by the UE using UL-MIMO for all transmission bandwidths within a channel bandwidth for non-CA configuration.

For each of PC1 UE to PC4 UE, the UE minimum peak EIRP (dBm) for UL-MIMO, UE maximum power limit, and UE spherical coverage may be defined for each band. In relation to these requirements, a measurement period may be at least one subframe (1 ms).

Meanwhile, a channel bandwidth for UL-MIMO and UE maximum power for modulation may be defined for each power class (PC). Regarding the output power adjustment (dynamics) for UL-MIMO, the minimum output power for the UL-MIMO, transmission OFF power, transmission ON/OFF time mask, and power control may be applied.

Each of the first to fourth antennas ANT1 to ANT4 may be configured as an array antenna. Meanwhile, 2×2 MIMO may be implemented using two antennas connected to the first power amplifier 1210 and the second power amplifier 1220 among the four antennas. In this case, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 1210, 1220 may operate in the 5G band. Meanwhile, when the 5G communication system is implemented with 4Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is integrated into the RFIC corresponding to the RFIC 1250, and an additional component does not need to be disposed externally, thereby improving component mountability. In more detail, a single pole double throw (SPDT) type switch may be provided in the RFIC corresponding to the controller 1250 to select transmitters (TXs) of two different communication systems.

Also, the electronic device operable in the plurality of wireless communication systems according to an embodiment may further include a duplexer 1231, a filter 1232, and a switch 1233.

The duplexer 1231 is configured to separate signals in a transmission band and a reception band from each other. In this case, signals in a transmission band transmitted through the first and second power amplifiers 1210, 1220 are applied to the antennas ANT1, ANT4 through a first output port of the duplexer 1231. On the contrary, a signal in a reception band received through the antennas ANT1, ANT4 is received by the low noise amplifiers 310, 340 through a second output port of the duplexer 1231.

The filter 1232 may be configured to pass signals in a transmission band or a reception band and block signals in the remaining bands. In this case, the filter 1232 may include a transmission filter connected to the first output port of the duplexer 1231 and a reception filter connected to the second output port of the duplexer 1231. Alternatively, the filter 1232 may be configured to pass only signals in the transmission band or only signals in the reception band according to a control signal.

The switch 1233 is configured to transmit only one of the transmission signal and the reception signal. In an implementation of the present disclosure, the switch 1233 may be configured in a single-pole double-throw (SPDT) form to separate the transmission signal and the reception signal in a time division duplex (TDD) scheme. Here, the transmission signal and the reception signal are signals of the same frequency band, and thus the duplexer 1231 may be implemented in the form of a circulator.

Meanwhile, in another implementation of the present disclosure, the switch 1233 may also be applied to a frequency division multiplex (FDD) scheme. In this case, the switch 1233 may be configured in the form of a double-pole double-throw (DPDT) to connect or block a transmission signal and a reception signal, respectively. On the other hand, the transmission signal and the reception signal may be separated by the duplexer 1231, and thus the switch 1233 is not necessarily required.

Meanwhile, the electronic device according to an embodiment may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally divided into a single circuit.

The modem 1400 may perform control and signal processing for the transmission and reception of signals through different communication systems through the RFIC 1250. The modem 1400 may be acquired through control information received from the 4G base station and/or the 5G base station. Here, the control information may be received through a physical downlink control channel (PDCCH), but the present disclosure is not limited thereto.

The modem 1400 may control the RFIC 1250 to transmit and/or receive signals through the first communication system and/or the second communication system at specific time and frequency resources. Accordingly, the RFIC 1250 may control transmission circuits including the first and second power amplifiers 1210, 1220 to transmit 4G or 5G signals in a specific time interval. In addition, the RFIC 1250 may control reception circuits including first through fourth low-noise amplifiers 1310 to 1340 to receive 4G or 5G signals in a specific time interval.

Meanwhile, the multi-transceiving system of FIG. 3B may integrate a transmitter and a receiver of each radio system into a single transceiver. Accordingly, there is an advantage in that a circuit portion for integrating two types of system signals may be eliminated at a RF front-end. Furthermore, since the front-end parts can be controlled by an integrated transceiver, the front-end parts may be more efficiently integrated than when the transceiving system is separated by communication systems. The multi-transceiving system as shown in FIG. 3B may control other communication systems as needed, thereby minimizing system delay due to this, and thus there is an advantage in that efficient resource allocation is possible.

Meanwhile, the first power amplifier 1210 and the second power amplifier 1220 may operate in at least one of the first and second communication systems. In this regard, when the 5G communication system operates in a 4G band or a sub-6 band, the first and second power amplifiers 1210 and 1220 may operate in both the first and second communication systems.

On the contrary, when the 5G communication system operates in a millimeter wave (mmWave) band, the first and second power amplifiers 1210, 1220 may operate in either the 4G band and the other in the millimeter wave band.

Figure 5A:
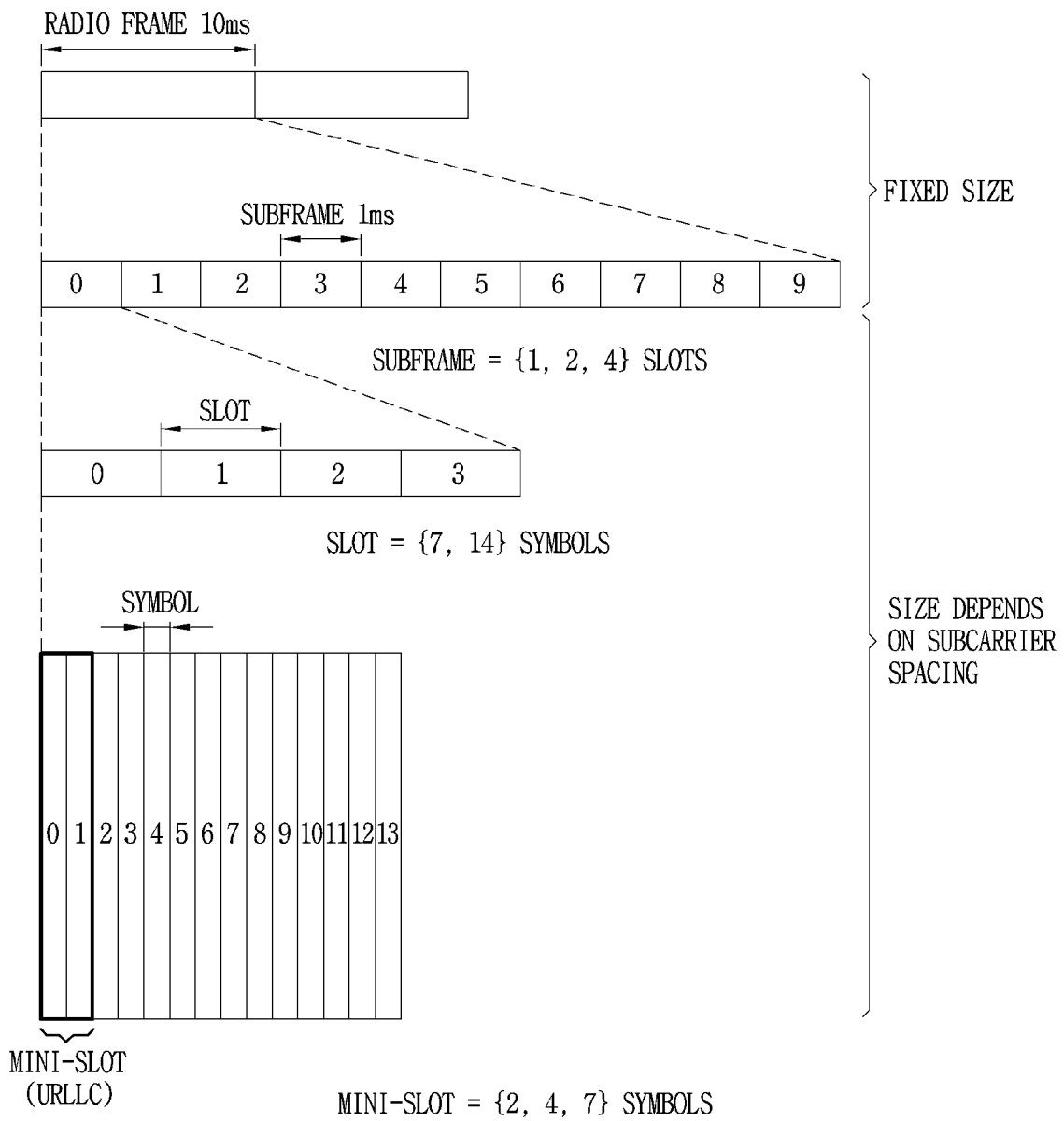
FIG. 5A is a view illustrating an example of a frame structure in NR.

On the other hand, a transmitter and a receiver may be integrated to implement two different wireless communication systems using a single antenna using a dual transmit/receive antenna. Here, 4×4 MIMO may be implemented using four antennas as shown in FIG. 5A. In this case, 4×4 DL MIMO may be performed through downlink (DL).

Figure 3C:
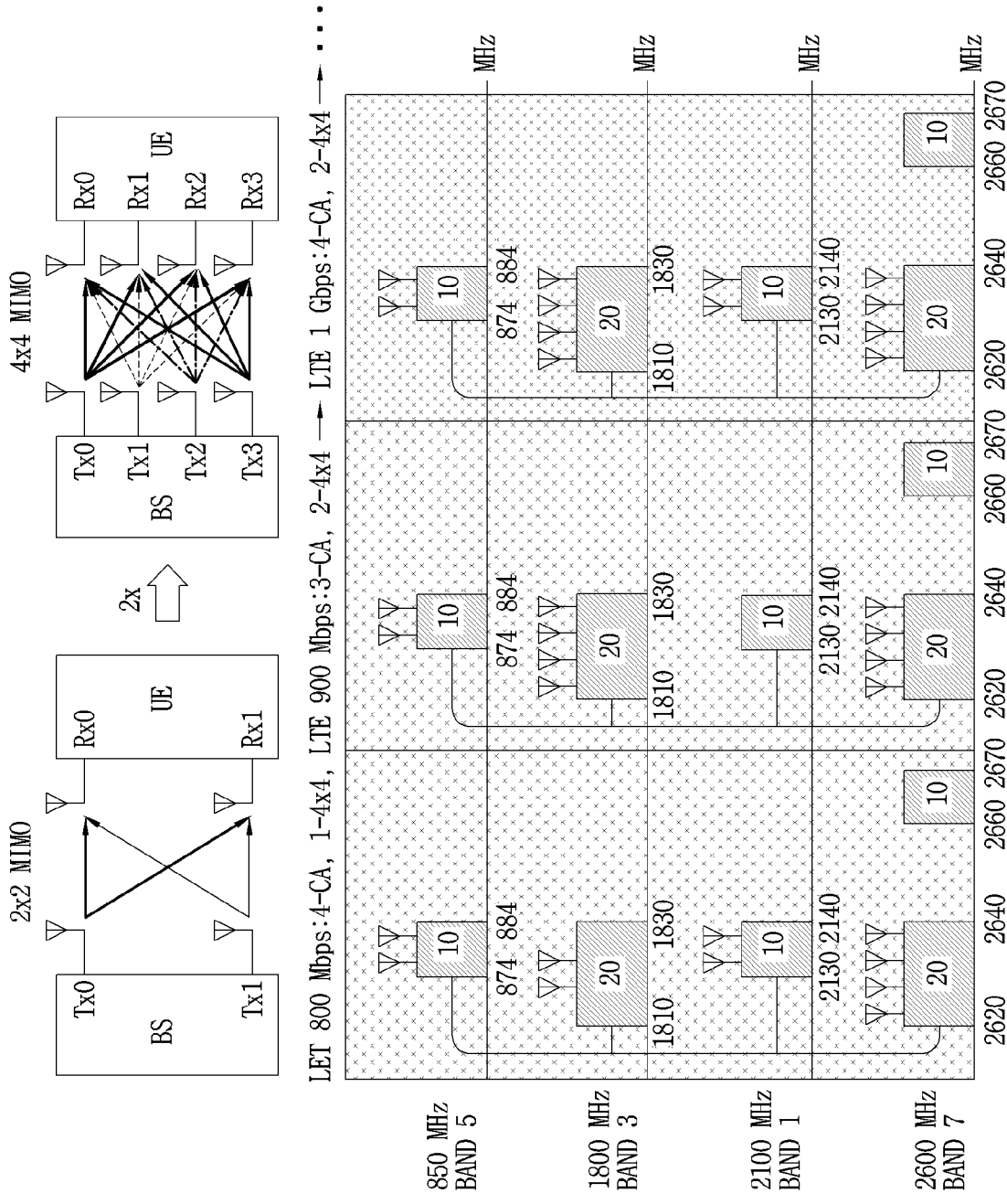
FIG. 3C is a diagram illustrating a MIMO configuration and a MIMO+carrier aggregation (CA) configuration between a UE and a base station (BS) in accordance with one embodiment.
Figure 4:
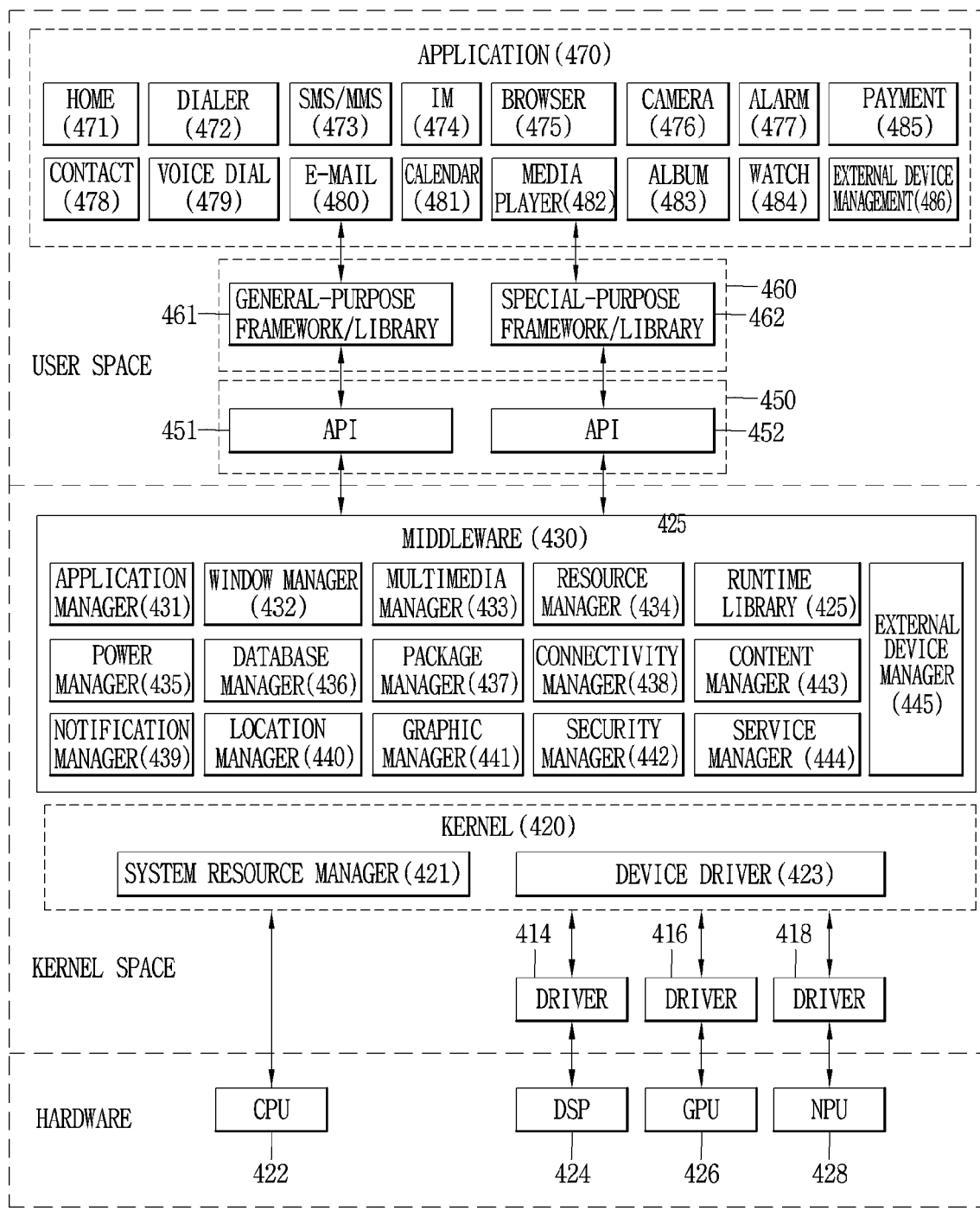
FIG. 4 is a view illustrating a framework structure related to an application program operating in an electronic device according to one implementation.

In this regard, MIMO is a key technology to improve the throughput. In this regard, FIG. 5C is a diagram illustrating a MIMO configuration and a MIMO+carrier aggregation (CA) configuration between a UE and a base station (BS) in accordance with one embodiment. Referring to FIG. 3C, 4×4 MIMO requires four Tx antennas at the base station and four Rx antennas at the UE. In addition, if the four antennas of the base station operate as Rx antennas, the four antennas of the UE operate as Tx antennas. Thus, 4×4 MIMO can double a data rate (or capacity) compared to 2×2 MIMO.

It uses multiple antennas both on the transmitter and receiver sides, so as to enable multi-layer data transmission. NR supports multi-layer data transmission for a single UE (single-user MIMO) with a maximum of eight transmission layers for DL and four for UL. NR also supports multi-layer data transmission to multiple UEs on different layers (multi-user MIMO) using a maximum of twelve transmission layers for DL and UL transmissions.

Reference Signals (RSs) are specified by assuming multi-layer transmissions. For demodulation of date/control information for both uplink and downlink, demodulation RS (DM-RS) is supported. For measurement of channel state information of downlink, channel state information RS (CSI-RS) is supported. CSI-RS is also used for mobility measurement, measurement of gNB transmission beamforming, and frequency/time tracking. The CSI-RS used for the frequency/time tracking is named as tracking RS (TRS). In a high frequency range, phase noise is a problem that degrades the transmission performance. A phase tracking reference signal (PT-RS) is applied with respect to PDSCH and PUSCH to enable a receiver to track the phase and mitigate performance loss due to the phase noise. For uplink channel sounding, sounding RS (SRS) is supported.

For UL multi-layer data transmission, both codebook based precoding and non-codebook based precoding are supported. In codebook-based UL transmission, precoding matrix applied for PUSCH transmission is selected by gNB. In non-codebook based UL transmission, precoded multiple SRS are transmitted and then the gNB selects a desired transmission layer for PUSCH based on the reception of the SRS.

Since NR supports a multi-beam operation where every signal/channel is transmitted on directional beam, beamforming is an important technique for achieving higher throughput and sufficient coverage especially in a high frequency range. For DL transmission beamforming, a gNB applies transmission beamforming to SS/PBCH block and/or CSI-RS transmissions, and a UE measures reference signal received power on a physical layer (L1-RSRP) on the configured SS/PBCH block and/or CSI-RS resource. The UE reports an SS/PBCH block or CSI-RS resource with a maximum L1-RSRP value as L1-RSRP beam reporting. The gNB may decide gNB transmission beamforming for the UE based on the reported L1-RSRP. For PDCCH/PDSCH transmission, the gNB informs the UE that the gNB transmission beamforming applied to a certain SS/PBCH block or CSI-RS resource is applied to the PDCCH/PDSCH transmission so that the UE can apply reception beamforming which fits into the gNB transmission beamforming. For UL transmission beamforming, two mechanisms are supported. In one of the mechanisms, the UE transmits multiple SRS symbols with different UE transmission beamforming so that the gNB can measure them and identify the best UE transmission beamforming. In another mechanism, the UE generates UL transmission beamforming which is the same as DL reception beamforming used for SS/PBCH block or CSI-RS resource reception. In addition, beam failure recovery (BFR) is supported to achieve quick recovery from the beam failure. The UE can identify the beam failure and informs the gNB of the index of SS/PBCH block or CSI-RS resource as new candidate beam.

For DL channel state information (CSI) acquisition, NR supports two precoding matrix indicator (PMI) definitions, type I and II codebooks that provide different levels of CSI granularity.

With respect to carrier aggregation (CA), 5-CA that aggregates up to 5 bands may be applied. The CA may be applied in combination with MIMO. Referring to FIG. 3C, 4-CA and 1-4×4 MIMO (2.6 GHz) may support up to 800 Mbps. In this regard, 4-CA may be supported for Bands 1, 3, 5, and 7. Bands 1, 3, 5, and 7 may have bandwidths of 10, 20, 10, and 20 MHz, respectively. 4×4 MIMO may be applied to Band 7.

Meanwhile, 3-CA and 2-4×4 MIMO (2.6 GHz and 1.8 GHz) may support up to 900 Mbps. 3-CA may be supported for Bands 3, 5, and 7. 4×4 MIMO may be applied to Band 7.

Meanwhile, 4-CA and 2-4×4 MIMO supporting 1 Gbps may be supported. In this regard, 4-CA may be supported for Bands 1, 3, 5, and 7. Bands 1, 3, 5, and 7 may have bandwidths of 10, 20, 10, and 20 MHz, respectively. 4×4 MIMO may be applied to Bands 3 and 7. Meanwhile, 5-CA and 3-4×4 MIMO supporting 1.2 Gbps may be supported.

By aggregating 5 carriers and applying 256 QAM and 4×4 MIMO in all bands, a data rate can be improved up to 1.4 Gbps. However, a 4.5G or 5G data rate may be gradually improved depending on processing performance of a UE in use (e.g., the number of data streams that can be simultaneously processed).

The combination of CA and MIMO may be applied to 5G NR in addition to 4G LTE. CA and MIMO for 4G LTE or 5G NR may be referred to as intra-CA+MIMO. On the other hand, CA and MIMO for both 4G LTE and 5G NR may be referred to as inter-CA+MIMO.

Meanwhile, when the 5G band is a sub-6 band, first to fourth antennas ANT1 to ANT4 may be configured to operate in both the 4G band and the 5G band. In this regard, UL-MIMO and/or DL-MIMO may be performed through the first to fourth antennas ANT1 to ANT4.

In the case of PC2 UE having two transmitting antennas in a closed-loop spatial multiplexing scheme, maximum output power for all transmission bandwidths in a channel bandwidth may be specified. These maximum output power requirements may comply with the specified UL-MIMO configuration. For UE supporting UL-MIMO, the maximum output power may be measured as the sum of maximum output power at each UE antenna connector. A measurement period may be defined as at least one subframe (1 ms), but is not limited thereto. In the case of UE having two transmitting antennas in a closed-loop spatial multiplexing scheme, the maximum power reduction (MPR) allowable for maximum output power may be specified. In the case of UE having two transmitting antennas in a closed loop spatial multiplexing scheme, a specific additional maximum output power reduction (A-MPR) value may be applied to specific maximum output power. In the case of UE supporting UL-MIMO, transmission power may be configured for each UE. Definitions of the configured maximum output power $P_{CMAX,c}$, a lower limit $P_{CMAX\_L,c}$ and an upper limit $P_{CMAX\_H,c}$ may be applied to the UE supporting UL-MIMO.

Regarding the output power adjustment (dynamics) for UL-MIMO, the minimum output power for the UL-MIMO, transmission OFF power, transmission ON/OFF time mask, and power control may be applied. For UE having two transmitting antennas in a closed-loop spatial multiplexing scheme, the minimum output power is defined as the sum of an average power of each transmitting antenna in one subframe (1 ms). It may be controlled so that the minimum output power does not exceed a specific value.

If a 5G band is a mmWave band, UL-MIMO and/or DL-MIMO may be performed in the mmWave band through the first to fourth antennas ANT1 to ANT4. The operating band for UL-MIMO may be at least one of n257, n258, n260, and n261 bands. Transmission power for UL-MIMO may be defined. UE maximum power for UL-MIMO may be defined for each power class (PC). For PC1 UE, the UE maximum power may be defined as the maximum output power radiated by the UE using UL-MIMO for all transmission bandwidths within a channel bandwidth for non-CA configuration.

For each of PC1 UE to PC4 UE, the UE minimum peak EIRP (dBm) for UL-MIMO, UE maximum power limit, and UE spherical coverage may be defined for each band. In relation to these requirements, a measurement period may be at least one subframe (1 ms).

Meanwhile, a channel bandwidth for UL-MIMO and UE maximum power for modulation may be defined for each power class (PC). Regarding the output power adjustment (dynamics) for UL-MIMO, the minimum output power for the UL-MIMO, transmission OFF power, transmission ON/OFF time mask, and power control may be applied.

Each of the first to fourth antennas ANT1 to ANT4 may be configured as an array antenna. Meanwhile, 2×2 MIMO may be implemented using two antennas connected to the first power amplifier 1210 and the second power amplifier 1220 among the four antennas. In this case, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 1210, 1220 may operate in the 5G band. Meanwhile, when the 5G communication system is implemented with 4Tx, an additional power amplifier operating in the 5G band may be further provided. Alternatively, a transmission signal may be branched in each of one or two transmission paths, and the branched transmission signal may be connected to a plurality of antennas.

Meanwhile, an application program running in the electronic device described herein may be executed in conjunction with a user space, a kernel space, and hardware. In this regard, FIG. 4 is a view illustrating a framework structure related to an application program operating in an electronic device according to one embodiment. The program module 410 may include a kernel 420, middleware 430, an API 450, a framework/library 460, and/or an application 470. At least part of the program module 410 may be pre-loaded on an electronic device or downloaded from an external device or a server.

The kernel 420 may include a system resource manager 421 and/or a device driver 423. The system resource manager 421 may perform control, allocation, or retrieval of system resources. According to one embodiment, the system resource manager 421 may include a process manager, a memory manager, or a file system manager. The device driver 423 may include a display driver, a camera driver, a Bluetooth driver, a shared memory driver, a USB driver, a keypad driver, a WiFi driver, an audio driver, or an inter-process communication (IPC) driver. The middleware 430 may provide functions commonly required by the application 470 or provide various functions to the application 470 through the API 460, for example, to allow the application 470 to use limited system resources inside the electronic device.

The middleware 430 may include at least one of a runtime library 425, an application manager 431, a window manager 432, a multimedia manager 433, a resource manager 434, a power manager 435, a database manager 436, a package manager 437, a connectivity manager 438, a notification manager 439, a location manager 440, a graphic manager 441, a security manager 442, a content manager 443, a service manager 444 and an external device manager 445.

The framework/library 460 may include a general-purpose framework/library 461 and a special-purpose framework/library 462. Here, the general-purpose framework/library 461 and the special-purpose framework/library 462 may be referred to as a first framework/library 451 and a second framework/library 452, respectively. The first framework/library 461 and the second framework/library 462 may be interfaced with a kernel space and hardware through the first API 451 and the second API 452, respectively. Here, the second framework/library 452 may be an exemplary software architecture capable of modularizing artificial intelligence (AI) functions. Using the architecture, the various processing blocks of hardware implemented with a System on Chip (SoC) (e.g., CPU 422, DSP 424, GPU 426, and/or NPU 428) may perform functions for supporting operations during the runtime operation of the application 470.

The application 470 may include a home 471, a dialer 472, an SMS/MMS 473, an instant message 474, a browser 475, a camera 476, an alarm 477, a contact 478, a voice dial 479, an email 480, a calendar 481, a media player 482, an album 483, a watch 484, a payment 485, an accessory management 486, a health care, or an environmental information providing application.

An AI application may be configured to call functions defined in a user space capable of allowing the electronic device to provide for detection and recognition of a scene indicating a location at which it is currently operating. The AI application may configure a microphone and a camera differently depending on whether the recognized scene is an indoor space or an outdoor space. The AI application may make a request for compiled program codes associated with a library defined in a scene detect application programming interface (API) to provide an estimate of the current scene. This request may rely on the output of a deep neural network configured to provide scene estimates based on video and location data.

The framework/library 462, which may be compiled codes of the Runtime Framework, may be further accessible by the AI application. The AI application may cause a runtime framework engine to request scene estimation triggered at specific time intervals or by events detected by the application's user interface. When estimating a scene, the runtime engine may then send a signal to an operating system such as a Linux kernel running on the SoC. The operating system may cause the operation to be performed on the CPU 422, the DSP 424, the GPU 426, the NPU 428, or some combination thereof. The CPU 422 may be accessed directly by the operating system and other processing blocks may be accessed via a driver such as a driver 414 to 418 for the DSP 424, the GPU 426, or the NPU 428. In an illustrative example, a deep neural network and an AI algorithm may be configured to run on a combination of processing blocks, such as the CPU 422 and the GPU 426, or an AI algorithm such as a deep neural network may run on the NPU 428.

The AI algorithm performed through the special-purpose framework/library as described above may be performed only by the electronic device or by a server supported scheme. When the AI algorithm is performed by the server supported scheme, the electronic device may receive and transmit information associated with the AI server and AI processing through the 4G/5G communication system.

Meanwhile, referring to FIGS. 1A and 2A, a 5G wireless communication system, that is, 5G new radio access technology (NR) may be provided. In this regard, as more communication devices demand larger communication capacities, there is a need for improved mobile broadband communication as compared to radio access technology in the related art. In addition, massive MTC (Machine Type Communications), which connects multiple devices and objects to provide various services anytime and anywhere, is also one of major issues to be considered in next-generation communication. In addition, communication system design in consideration of services/terminals that are sensitive to reliability and latency is being discussed. As described above, introduction of next-generation radio access technology in consideration of enhanced mobile broadband communication (eMBB), massive MTC (mMTC), ultra-reliable and low latency communication (URLLC), and the like, is being discussed, and the relevant technology is referred to herein as NR for the sake of convenience. The NR is an expression showing an example of 5G radio access technology (RAT).

A new RAT system including the NR uses an OFDM transmission scheme or a similar transmission scheme. The new RAT system may follow OFDM parameters different from the OFDM parameters of LTE. Alternatively, the new RAT system may follow the existing numerology of LTE/LTE-A as it is but have a larger system bandwidth (e.g., 100 MHz). Alternatively, a single cell may support a plurality of numerologies. In other words, terminals operating with different numerologies may coexist in a single cell.

In this regard, in the case of 4G LTE, since the maximum bandwidth of the system is limited to 20 MHz, a single sub-carrier spacing (SCS) of 15 kHz is used. However, since 5G NR supports a channel bandwidth between 5 MHz and 400 MHz, FFT processing complexity may increase to process the entire bandwidth through a single subcarrier spacing. Accordingly, the subcarrier spacing used for each frequency band may be extended and applied.

A numerology corresponds to one subcarrier spacing in the frequency domain. By scaling a reference subcarrier spacing to an integer N, different numerologies may be defined. In this regard, FIG. 5A shows an example of a frame structure in NR. FIG. 5B shows a change in a slot length in accordance with a change in a subcarrier spacing in the NR.

An NR system may support a number of numerologies. Here, a numerology may be defined by a subcarrier spacing and a cyclic prefix overhead. Here, a plurality of subcarrier spacings may be derived by scaling a basic subcarrier spacing to an integer N (or μ). Furthermore, even when it is assumed that a very low subcarrier spacing is not used at a very high carrier frequency, the used numerology may be selected independently of the frequency band. In addition, in an NR system, various frame structures according to a number of numerologies may be supported.

Hereinafter, an Orthogonal Frequency Division Multiplexing (OFDM) numerology and frame structure that can be considered in the NR system will be described. A number of OFDM numerologies supported in the NR system may be defined as shown in Table 1 below.

TABLE 1

| μ | $\Delta f = 2^\mu * 15$ [kHz] | Cyclic prefix (CP) |
| --- | --- | --- |
| 0 | 15 | Normal |
| 1 | 30 | Normal |
| 2 | 60 | Normal, Extended |
| 3 | 120 | Normal |
| 4 | 240 | Normal |

NR supports a number of numerologies (or subcarrier spacings (SCSs)) for supporting various 5G services. For example, NR supports a wide area in traditional cellular bands when the SCS is 15 kHz, and supports a dense-urban, a lower latency and a wider carrier bandwidth when the SCS is 30 kHz/60 kHz, and supports a bandwidth greater than 24.25 GHz to overcome phase noise when the SCS is 60 kHz or higher. The NR frequency band is defined as a frequency range of two types (FR1, FR2). The FR1 is a sub-6 GHz range, and the FR2 is a range of above 6 GHz, which may denote millimeter waves (mmWs). Table 2 below shows the definition of the NR frequency band.

TABLE 2

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

With regard to a frame structure in a NR system, the sizes of various fields in the time domain are expressed in multiples of a specific time unit. FIG. 3A illustrates an example of an SCS of 60 kHz, in which one subframe may include four slots. One subframe={1,2,4} slots shown in FIG. 3 is an example, in which the number of slot(s) that can be included in one subframe may be one, two or four. In addition, a mini-slot may include two, four, or seven symbols or may include more or fewer symbols. Referring to FIG. 5B, a subcarrier spacing of 5G NR phase I and a length of an OFDM symbol corresponding to the spacing are shown. Each subcarrier spacing is extended by a multiplier of two, which inversely reduces the symbol length. In FR1, subcarrier spacings of 15 kHz, 30 kHz, and 60 kHz are available, depending on the frequency band/bandwidth. In FR2, 60 kHz and 120 kHz may be used for data channels, and 240 kHz may be used for synchronization signals. In 5G NR, a basic unit of scheduling may be defined as a slot, and the number of OFDM symbols included in a single slot may be limited to 14 as shown in FIG. 3A or 3B regardless of the subcarrier spacing. Referring to FIG. 3B, when a wide subcarrier spacing is used, the length of one slot may decrease in inverse proportion to reduce transmission delay in a wireless section. In addition, in order to efficiently support ultra-reliable low latency communication (uRLLC), mini-slot (e.g., 2, 4, 7 symbols) unit scheduling may be supported, as described above, in addition to slot-based scheduling.

In consideration of the foregoing technical features, slots in 5G NR described herein may be provided at the same interval as those in 4G LTE or may be provided with slots of various sizes. For an example, in 5G NR, the slot interval may be configured to be 0.5 ms equal to that of 4G LTE. For another example, the slot interval in 5G NR may be configured to be 0.25 ms, which is a narrower interval than that of 4G LTE.

In this regard, the 4G communication system and the 5G communication system may be referred to as a first communication system and a second communication system, respectively. Accordingly, a first signal (first information) of the first communication system may be a signal (information) in a 5G NR frame having a slot interval that is scalable to 0.25 ms, 0.5 ms, and the like. On the contrary, a second signal (second information) of the second communication system may be a signal (information) in a 4G LTE frame having a fixed slot interval of 0.5 ms.

Meanwhile, the first signal of the first communication system may be transmitted and/or received through a maximum bandwidth of 20 MHz. On the contrary, the second signal of the second communication system may be transmitted and/or received through a variable channel bandwidth of 5 MHz to 400 MHz. In this regard, the first signal of the first communication system may be FFT-processed at a single sub-carrier spacing (SCS) of 15 kHz.

On the other hand, the second signal of the second communication system may be FFT-processed at subcarrier spacings of 15 kHz, 30 kHz, and 60 kHz according to the frequency band/bandwidth. In this case, the second signal of the second communication system may be modulated and frequency-converted into a FR1 band and transmitted through a 5G sub-6 antenna. Meanwhile, the FR1 band signal received through the 5G sub-6 antenna may be frequency-converted and demodulated. Then, the second signal of the second communication system may be IFFT-processed at subcarrier spacings of 15 kHz, 30 kHz, and 60 kHz according to the frequency band/bandwidth.

On the other hand, the second signal of the second communication system may be FFT-processed at spacings of 60 kHz, 120 kHz, and 240 kHz according to the frequency band/bandwidth and data/synchronous channel. In this case, the second signal of the second communication system may be modulated in a FR2 band and transmitted through a 5G mmWave antenna. Meanwhile, the FR2 band signal received through the 5G mmWave antenna may be frequency-converted and demodulated. Then, the second signal of the second communication system may be IFFT-processed through subcarrier spacings of 60 kHz, 120 kHz, and 240 kHz according to the frequency band/bandwidth and data/synchronous channel.

In 5G NR, symbol-level time alignment may be used for transmission schemes using various slot lengths, mini-slots, and different subcarrier spacings. Accordingly, the present disclosure provides flexibility to efficiently multiplex various communication services such as enhancement mobile broadband (eMBB) and ultra-reliable low latency communication (uRLLC) in the time domain and the frequency domain. In addition, unlike 4G LTE, 5G NR may define uplink/downlink resource allocation at a symbol level within a single slot as shown in FIG. 3. In order to reduce a hybrid automatic repeat request (HARQ) delay, a slot structure capable of directly transmitting HARQ ACK/NACK in a transmission slot may be defined. This slot structure may be referred to as a self-contained structure.

Unlike 4G LTE, 5G NR may support a common frame structure constituting an FDD or TDD frame through a combination of various slots. Accordingly, a dynamic TDD scheme may be adopted to freely dynamically adjust the transmission direction of individual cells according to traffic characteristics.

On the other hand, a detailed operation and function of the electronic device having a plurality of antennas according to an embodiment provided with a multi-transceiving system as shown in FIG. 3B will be discussed below.

Figure 6A:
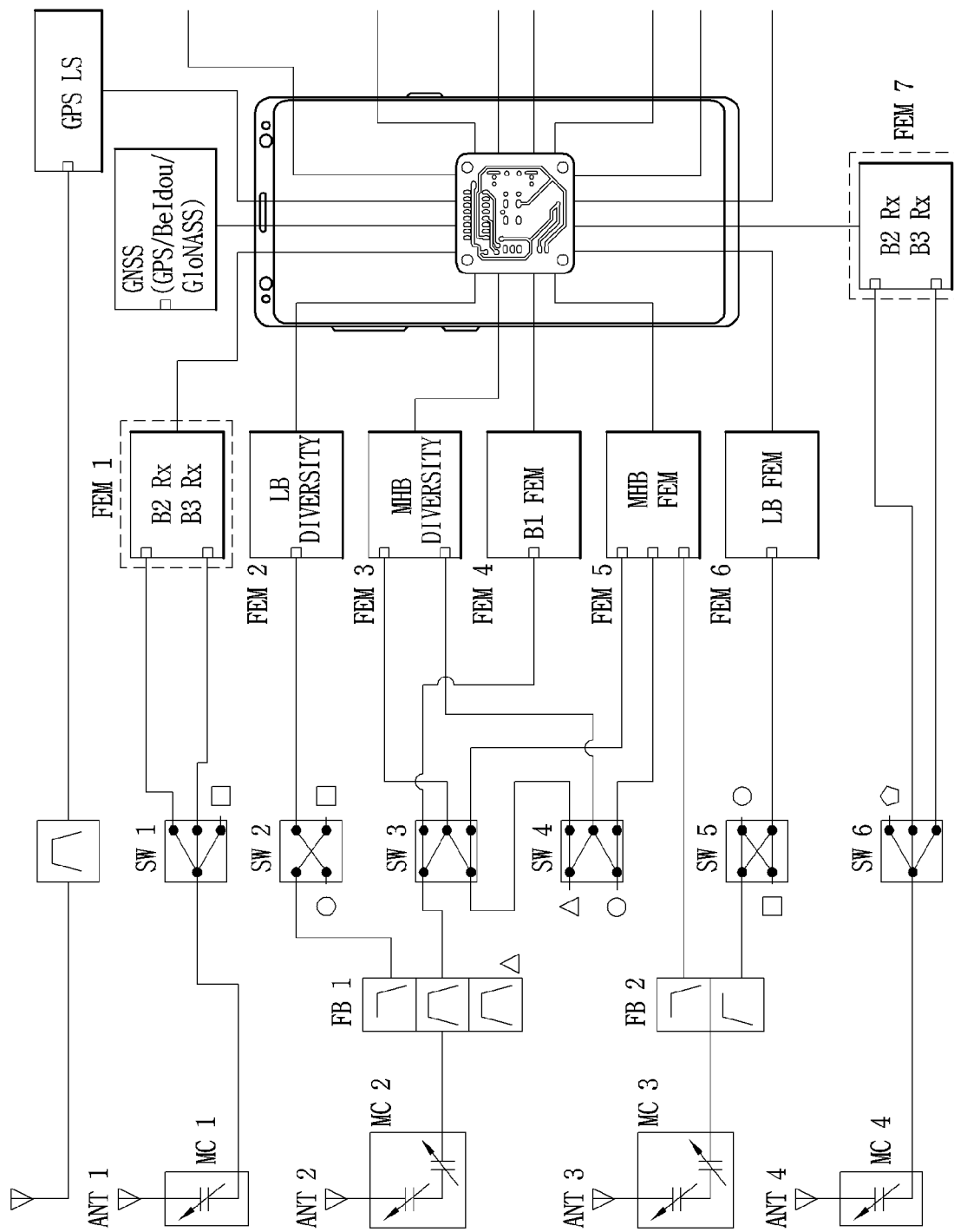
FIG. 6A is a configuration diagram in which a plurality of antennas and transceiver circuits according to an implementation are coupled to a processor in an operable manner.
Figure 6B:
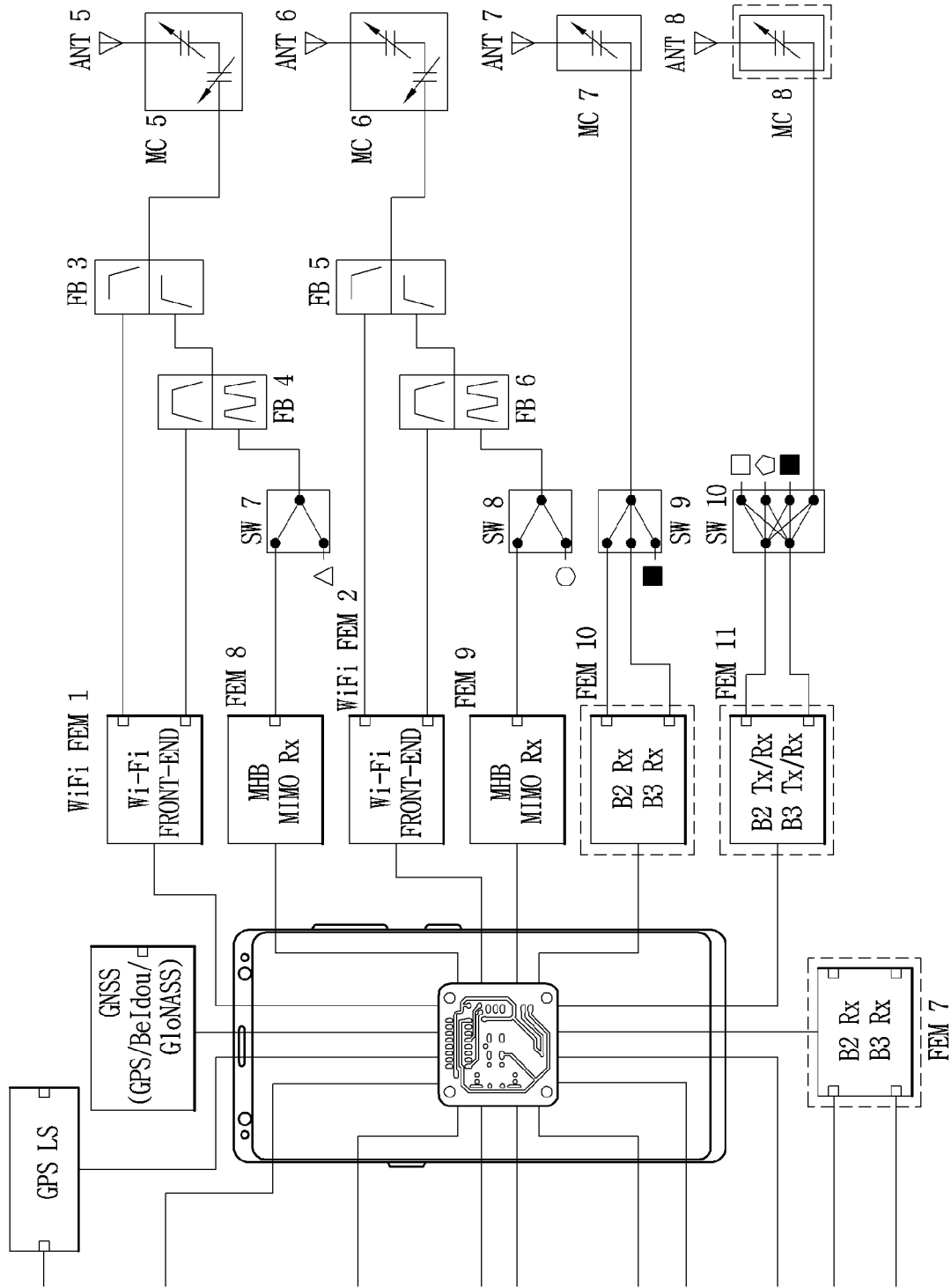
FIG. 6B is a configuration diagram in which antennas and transceiver circuits are additionally coupled to a processor in an operable manner in the configuration diagram in FIG. 6A.

In a 5G communication system according to an embodiment, the 5G frequency band may be a sub-6 band. In this regard, FIG. 6A is a configuration diagram in which a plurality of antennas and transceiver circuits according to an embodiment are coupled to a processor in an operable manner. FIG. 6B is a configuration diagram in which antennas and transceiver circuits are additionally coupled to a processor in an operable manner in the configuration diagram in FIG. 6A.

Referring to FIGS. 6A and 6B, the electronic device may include a plurality of antennas ANT1 to ANT4 and front-end modules FEM1 to FEM7 operating in a 4G band and/or a 5G band. In this regard, a plurality of switches SW1 to SW6 may be arranged between the plurality of antennas ANT1 to ANT4 and the front-end modules FEM1 to FEM7.

Referring to FIGS. 6A and 6B, the electronic device may include a plurality of antennas ANT5 to ANT8 and front-end modules FEM8 to FEM11 operating in a 4G band and/or a 5G band. In this regard, a plurality of switches SW7 to SW10 may be arranged between the plurality of antennas ANT1 to ANT4 and the front-end modules FEM8 to FEM11.

Meanwhile, a plurality of signals that can be branched through the plurality of antennas ANT1 to ANT8 may be transmitted to the input of the front-end modules FEM1 to FEM11 or to the plurality of switches SW1 to SW10 through one or more filters.

For an example, the first antenna ANT1 may be configured to receive signals in a 5G band. In this case, the first antenna ANT1 may be configured to receive a second signal of a second band B2 and a third signal of a third band B3. Here, the second band B2 may be an n77 band and the third band B3 may be an n79 band, but the present disclosure is not limited thereto. The second band B2 and the third band B3 may be changed according to an application. Meanwhile, the first antenna ANT1 may also operate as a transmitting antenna in addition to a receiving antenna.

In this regard, the first switch SW1 may be configured as an SP2T switch or an SP3T switch. When implemented as an SP3T switch, one output port may be used as a test port.

The first and second output ports of the first switch SW1 may be connected to the inputs of the first front end module FEM1.

In one example, the second antenna ANT2 may be configured to transmit and/or receive signals in a 4G band and/or a 5G band. In this case, the second antenna ANT2 may be configured to transmit/receive a first signal of a first band B1. Here, the first band B1 may be an n41 band, but the present is not limited thereto, and the first band B1 may be changed according to an application.

Meanwhile, the second antenna ANT2 may operate in a low band (LB). In addition, the second antenna ANT2 may be configured to operate in a mid band (MB) and/or a high band (HB). Here, the middle band (MB) and high band (HB) may be referred to as MHB.

A first output of the first filter bank FB1 connected to the second antenna ANT2 may be connected to the second switch SW2. Meanwhile, a second output of the first filter bank FB1 connected to the second antenna ANT2 may be connected to the third switch SW3. Furthermore, a third output of the first filter bank FB1 connected to the second antenna ANT2 may be connected to the fourth switch SW4.

Accordingly, an output of the second switch SW2 may be connected to an input of the second front end module FEM2 operating in the low band (LB). Meanwhile, a second output of the third switch SW3 may be connected to an input of the third front end module FEM3 operating in the MHB band. In addition, a first output of the third switch SW3 may be connected to an input of a fourth front end module FEM4 operating in a first 5G band (B1). Furthermore, a third output of the third switch SW3 may be connected to an input of the fifth front end module FEM5 operating in the MHB band operating in the first 5G band B1.

In this regard, a first output of the fourth switch SW4 may be connected to an input of the third switch SW3. Meanwhile, a second output of the fourth switch SW4 may be connected to an input of the third front end module FEM3. In addition, a third output of the fourth switch SW4 may be connected to an input of the fifth front end module FEM5.

For an example, the third antenna ANT3 may be configured to transmit and/or receive signals in the LB band and/or the MHB band. In this regard, a first output of the second filter bank FB2 connected to the second antenna ANT2 may be connected to an input of the fifth front end module FEM5 operating in the MHB band. Meanwhile, a second output of the second filter bank FB2 connected to the second antenna ANT2 may be connected to the fifth switch SW5.

In this regard, an output of the fifth switch SW5 may be connected to an input of the sixth front end module FEM6 operating in the LB band.

For an example, the fourth antenna ANT4 may be configured to transmit and/or receive a signal in a 5G band. In this regard, the fourth antenna ANT4 may be configured such that the second band B2 that is a transmission band and the third band B3 that is a reception band are frequency-division multiplexed (FDM). Here, the second band B2 may be an n77 band and the third band B3 may be an n79 band, but the present disclosure is not limited thereto. The second band B2 and the third band B3 may be changed according to an application.

In this regard, the fourth antenna ANT4 may be connected to the sixth switch SW6, and one of the outputs of the sixth switch SW6 may be connected to a reception port of the seventh front end module FEM7. Meanwhile, another one of the outputs of the sixth switch (SW6) may be connected to the transmission port of the seventh front end module (FEM7).

For an example, the fifth antenna ANT5 may be configured to transmit and/or receive signals in a WiFi band. Furthermore, the fifth antenna ANT5 may be configured to transmit and/or receive signals in the MHB band.

In this regard, the fifth antenna ANT5 may be connected to the third filter bank FB3, and a first output of the third filter bank FB3 may be connected to a first WiFi module (WiFi FEM1). On the other hand, a second output of the third filter bank FB3 may be connected to a fourth filter bank FB4. In addition, a first output of the fourth filter bank FB4 may be connected to the first WiFi module (WiFi FEM1). Meanwhile, a second output of the fourth filter bank FB4 may be connected to the eighth front end module FEM8 operating in the MHB band through the seventh switch SW7. Therefore, the fifth antenna ANT5 may be configured to receive WiFi band and 4G/5G band signals.

Similarly, the sixth antenna ANT6 may be configured to transmit and/or receive signals in a WiFi band. Furthermore, the sixth antenna ANT6 may be configured to transmit and/or receive signals in the MHB band.

In this regard, the sixth antenna ANT6 may be connected to a fifth filter bank FB5, and a first output of the fifth filter bank FB5 may be connected to a second WiFi module (WiFi FEM2). On the other hand, a second output of the fifth filter bank FB5 may be connected to a sixth filter bank FB6. In addition, a first output of the sixth filter bank FB6 may be connected to a second WiFi module (WiFi FEM2). A second output of the sixth filter bank FB6 may be connected to the ninth front end module FEM9 operating in the MHB band through the eighth switch SW8. Therefore, the sixth antenna ANT6 may be configured to receive the WiFi band and 4G/5G band signals.

Referring to FIGS. 3B, 6A, and 6B, the baseband processor 1400 may control antennas and the transceiver circuit 1250 to perform multi-input and multi-output (MIMO) or diversity in the MHB band. In this regard, the second antenna ANT2 and the third antenna ANT3 adjacent thereto may be used in a diversity mode for transmitting and/or receiving the same information as a first signal and a second signal. On the contrary, antennas disposed on different side surfaces may be used in the MIMO mode in which first information is included in the first signal and second information is included in the second signal. For an example, the baseband processor 1400 may perform MIMO through the second antenna ANT2 and the fifth antenna ANT5. In another example, the baseband processor 1400 may perform MIMO through the second antenna ANT2 and the sixth antenna ANTE.

For an example, the seventh antenna ANT7 may be configured to receive signals in a 5G band. In this case, the seventh antenna ANT7 may be configured to receive a third signal of a second band B2 and a third signal of a third band B3. Here, the second band B2 may be an n77 band and the third band B3 may be an n79 band, but the present disclosure is not limited thereto. The second band B2 and the third band B3 may be changed according to an application. Meanwhile, the seventh antenna ANT7 may also operate as a transmitting antenna in addition to a receiving antenna.

In this regard, the ninth switch SW9 may be configured as an SP2T switch or an SP3T switch. When implemented as an SP3T switch, one output port may be used as a test port. On the other hand, the first and second output ports of the ninth switch SW9 may be connected to the inputs of the tenth front end module FEM10.

For an example, the eighth antenna ANT8 may be configured to transmit and/or receive signals in the 4G band and/or the 5G band. In this case, the eighth antenna ANT8 may be configured to transmit/receive a signal of the second band B2. In addition, the eighth antenna ANT8 may be configured to transmit/receive a signal of the third band B3. Here, the second band B2 may be an n77 band and the third band B3 may be an n79 band, but the present disclosure is not limited thereto. The second band B2 and the third band B3 may be changed according to an application. In this regard, the eighth antenna ANT8 may be connected to the eleventh front end module FEM11 through the tenth switch SW10.

Meanwhile, the antennas ANT1 to ANT8 may be connected to impedance matching circuits MC1 to MC8 to operate in a plurality of bands. In this regard, when operating in adjacent bands such as the first antenna ANT1, the fourth antenna ANT4, the seventh antenna ANT7 and the eighth antenna ANT8, only one variable element may be used. In this case, the variable element may be a variable capacitor configured to vary the capacitance by varying the voltage.

On the contrary, when operating in spaced bands such as the second antenna ANT2, the third antenna ANT3, the fifth antenna ANT5, and the sixth antenna ANTE, only two or more variable elements may be used. In this case, the two or more variable elements may be two or more variable capacitors or a combination of variable inductors and variable capacitors.

Referring to FIGS. 3B, 4A, and 4B, the baseband processor 1400 may perform MIMO through at least one of the second band B2 and the third band B3 in a 5G band. In this regard, the baseband processor 1400 may perform MIMO through at least two of the first antenna ANT1, the fourth antenna ANT4, the seventh antenna ANT7, and the eighth antenna ANT8 in the second band B2. On the other hand, the baseband processor 1400 may perform MIMO through at least two of the first antenna ANT1, the fourth antenna ANT4, the seventh antenna ANT7, and the eighth antenna ANT8 in the third band B3. Accordingly, the baseband processor 1400 may control the plurality of antennas and the transceiver circuit 1250 to support MIMO up to 4 RXs as well as 2 RXs in the 5G band.

Hereinafter, a detailed operation and function of the electronic device having a plurality of antennas according to an embodiment provided with a multi-transceiving system as illustrated in FIGS. 3B, 6A, and 6B will be described.

Figure 7:
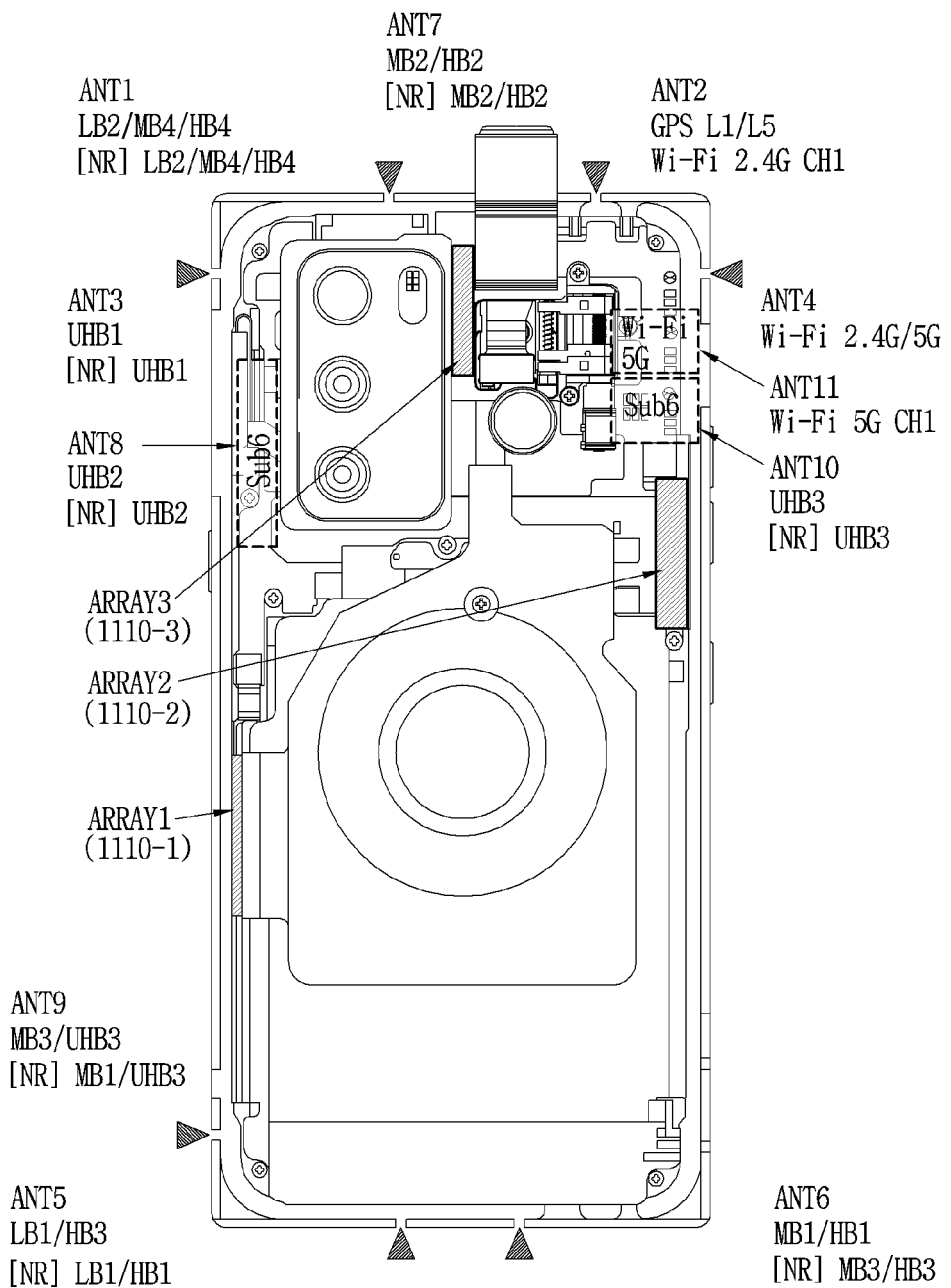
FIG. 7 is a view illustrating a structure in which a plurality of antennas is disposed on metal rims of an electronic device.

In this regard, FIG. 7 is a view illustrating a structure in which a plurality of antennas is disposed on metal rims of an electronic device. Specifically, FIG. 7 shows a structure in which a plurality of LTE/5G sub-6 antennas and WiFi antennas are disposed on metal rims of the electronic device. On the other hand, a plurality of mmWave antenna modules may be disposed inside the electronic device. In this regard, the electronic device of FIG. 7 may be an electronic device according to various form factors. In one implementation, the electronic device of FIG. 7 may be a swivel terminal in which one frame is rotated with respect to another frame by a predetermined angle to be switched into a swivel state, but the present disclosure may not be limited thereto.

Referring to FIG. 7, the plurality of antennas may be configured to include a first antenna ANT1 and a second antenna ANT2 disposed in an upper portion of the electronic device. The plurality of antennas may alternatively be configured to include first to fourth antennas ANT1 to ANT4 disposed in the upper portion of the electronic device. In addition, the plurality of antennas may alternatively be configured to include first to sixth antennas ANT1 to ANTE disposed in upper and lower portions of the electronic device. Further, the plurality of antennas may alternatively be configured to include first to eleventh antennas ANT1 to ANT11 disposed in the upper and lower portions of the electronic device.

For example, the first antenna ANT1 may be configured to operate in a low band (LB), a mid-band (MB) and a high band (HB) of the LTE band. The first antenna ANT1 may alternatively be configured to operate in the LB, MB and HB of the NR band (5G sub-6 band). Accordingly, the first antenna ANT1 may be configured to transmit and/or receive at least one of signals of the LB, MB and HB of the LTE band. In addition, the first antenna ANT1 may be configured to transmit and/or receive at least one of signals of the LB, MB, and HB of the NR band (5G sub-6 band). On the other hand, the second antenna ANT2 may be configured to operate in a GPS L1/L5 band and a WiFi band of a first band. Therefore, the second antenna ANT2 may be configured to transmit and/or receive signals of the GPS L1/L5 band and/or the WiFi band of the first band.

The third antenna ANT3 may be configured to operate in an ultra-high band UHB of the LTE band. In addition, the third antenna ANT3 may be configured to operate in a UHB of the NR band (5G sub-6 band). Therefore, the third antenna ANT3 may be configured to transmit and/or receive a signal of the UHB of the LTE band. Also, the third antenna ANT3 may be configured to transmit and/or receive a signal of the UHB of the NR band (5G sub-6 band). Meanwhile, the fourth antenna ANT4 may operate in a WiFi band. In detail, the fourth antenna ANT4 may be configured to operate in WiFi bands of the first band and a second band. In this regard, the first band and the second band may be 2.4 GHz and 5 GHz bands, respectively, but are not limited thereto.

The fifth antenna ANT5 and the sixth antenna ANT6 may be disposed in a lower region of the electronic device. The fifth antenna ANT5 may be configured to operate in the LB and HB of the LTE band. The fifth antenna ANT5 may be configured to operate in the LB and HB of the NR band (5G sub-6 band). For an example, the fifth antenna ANT5 may be configured to transmit and/or receive signals of the LB and HB of the LTE band. In addition, the fifth antenna ANT5 may be configured to transmit and/or receive signals of the LB and HB of the NR band (5G sub-6 band). Meanwhile, the sixth antenna ANT6 may be configured to operate in the MB and HB of the LTE band. The sixth antenna ANT6 may be configured to operate in the MB and HB of the NR band (5G sub-6 band). Accordingly, the sixth antenna ANT6 may be configured to transmit and/or receive at least one of signals of the MB and HB of the LTE band. In addition, the sixth antenna ANT6 may be configured to transmit and/or receive at least one of signals of the MB and HB of the NR band (5G sub-6 band).

An antenna may additionally be disposed between the first antenna ANT1 and the second antenna ANT2. The seventh antenna ANT7 may be disposed by being isolated from the first antenna ANT1 and the second antenna ANT2 by a slit. The seventh antenna ANT7 may be configured to operate in the MB And HB of the LTE band. In addition, the seventh antenna ANT7 may be configured to operate in the MB and HB of the NR band (5G sub-6 band). Accordingly, the seventh antenna ANT7 may be configured to transmit and/or receive at least one of signals of the MB and HB of the LTE band. In addition, the seventh antenna ANT7 may be configured to transmit and/or receive at least one of signals of the MB and HB of the NR band (5G sub-6 band).

Antennas may be further disposed on a different side surface portion of the electronic device. An eighth antenna ANT8 and a ninth antenna ANT9 may be disposed on one side surface portion of the electronic device. A tenth antenna ANT10 and an eleventh antenna ANT11 may be disposed on another side surface portion of the electronic device. In this regard, some of the eighth antenna ANT8 to the eleventh antenna ANT11 may be disposed inside side surface portions of the electronic device. For example, the eighth antenna ANT8 may be disposed inside one side surface portion. In addition, the tenth antenna ANT10 and the eleventh antenna ANT11 may be disposed inside another side surface portion.

The eighth antenna ANT8 may be configured to operate in the UHB of the LTE band. In addition, the eighth antenna ANT8 may be configured to operate in the UHB of the NR band (5G sub-6 band). Therefore, the third antenna ANT8 may be configured to transmit and/or receive a signal of the UHB of the LTE band. Also, the eighth antenna ANT8 may be configured to transmit and/or receive a signal of the UHB of the NR band (5G sub-6 band). Meanwhile, the ninth antenna ANT9 may be configured to operate in the MB and UHB of the LTE band. In addition, the ninth antenna ANT9 may be configured to operate in the MB and UHB of the NR band (5G sub-6 band). Accordingly, the ninth antenna ANT9 may be configured to transmit and/or receive at least one of signals of the MB and UHB of the LTE band. In addition, the ninth antenna ANT9 may be configured to transmit and/or receive at least one of signals of the MB and UHB of the NR band (5G sub-6 band).

A tenth antenna ANT10 and an eleventh antenna ANT11 may be disposed on another side surface portion of the electronic device. The tenth antenna ANT10 may be configured to operate in the UHB of the LTE band. In addition, the tenth antenna ANT10 may be configured to operate in the UHB of the NR band (5G sub-6 band). Therefore, the tenth antenna ANT10 may be configured to transmit and/or receive a signal of the UHB of the LTE band. Also, the tenth antenna ANT10 may be configured to transmit and/or receive a signal of the UHB of the NR band (5G sub-6 band). Meanwhile, the eleventh antenna ANT11 may operate in a WiFi band. Also, the eleventh antenna ANT11 may operate in a WiFi band of the second band. Therefore, the eleventh antenna ANT11 may be configured to transmit and/or receive a WiFi signal of the second band.

Referring to FIG. 7, a plurality of mmWave band antenna modules may be disposed on the side portions of and/or inside the electronic device. The plurality of mmWave band antenna modules may be configured to include a first array antenna ARRAY1 to a third array antenna ARRAY3. The first array antenna ARRAY1 and the second array antenna ARRAY2 may be disposed on one and another side portions (or side surfaces) of the electronic device, respectively, to emit signals in a lateral direction. The third array antenna ARRAY3 may be provided with antenna elements that are disposed to emit signals in a rear direction of the electronic device. In the first to third array antennas ARRAY1 to ARRAY3, a plurality of antenna elements may be arranged at predetermined intervals. Beamforming may be performed by controlling a phase of a signal applied to each antenna element arranged at the predetermined interval.

An optimal antenna may be selected from among the first to third array antennas ARRAY1 to ARRAY3, and beamforming may be performed through the selected array antenna. As another example, MIMO or diversity may be performed using two or more array antennas among the first array antenna ARRAY1 to the third array antenna ARRAY3.

In this regard, the electronic device may be configured to provide 5G communication services in various frequency bands. Recently, attempts have been made to provide 5G communication services using a sub-6 band below a 6 GHz band. In the future, it is also expected to provide 5G communication services by using a millimeter wave (mmWave) band in addition to the sub-6 band for faster data rate.

Meanwhile, electronic devices that provide 4G and 5G communication services may be provided in various form factors. As an example of the form factors for the electronic device, a foldable device may be considered. The foldable device may cause deviation in wireless performance in open and closed states.

As one of electronic devices having a plurality of frames, a swivel terminal in which one frame rotates relative to another frame at a predetermined angle may be provided. In a swivel electronic device, when one frame rotates at a predetermined angle with respect to another frame, there is a problem in that wireless performance of antennas disposed on a side surface of the device is changed.

In detail, a metal structure for supporting the front display may be required in an electronic device to which a swivel structure is applied, which may deteriorate antenna radiation efficiency. In the swivel state of the electronic device, a change in antenna performance may occur due to changes in ground characteristics compared to a normal state.

However, when LTE antennas are already provided in the form of metal rims on side surfaces of the swivel electronic device, an arrangement space limitation problem may occur for some of antennas operating in a sub-6 band.

The present disclosure is directed to solving the aforementioned problems and other drawbacks. Another aspect of the implementation is to provide an antenna structure capable of minimizing changes in characteristics of antennas disposed on side surfaces of an electronic device when a form factor changes.

Another aspect of the implementation is to provide an antenna structure capable of minimizing changes in antenna characteristics due to frame rotation in a swivel structure.

Yet still another aspect of the present disclosure is to provide an electronic device having various form factors capable of radiating electromagnetic waves through a side surface of the electronic device.

Still yet another aspect of the present disclosure is to provide a structure capable of radiating electromagnetic waves through a side surface of the electronic device while a mmWave antenna module is disposed at a low slant angle.

Figure 8A:
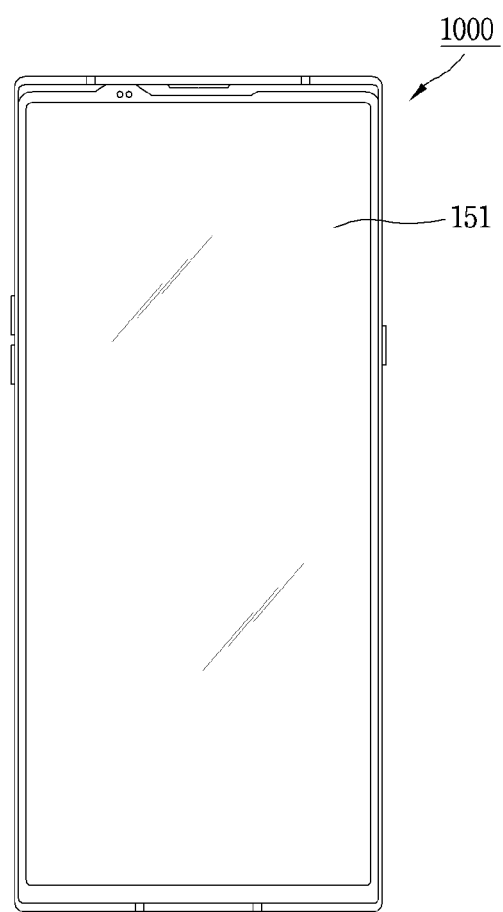
FIGS. 8A and 8B are views illustrating a normal state in which a display of an electronic device according to one implementation fully overlap a main body and a swivel state in which the display has rotated relative to the main body by a predetermined angle.
Figure 8B:
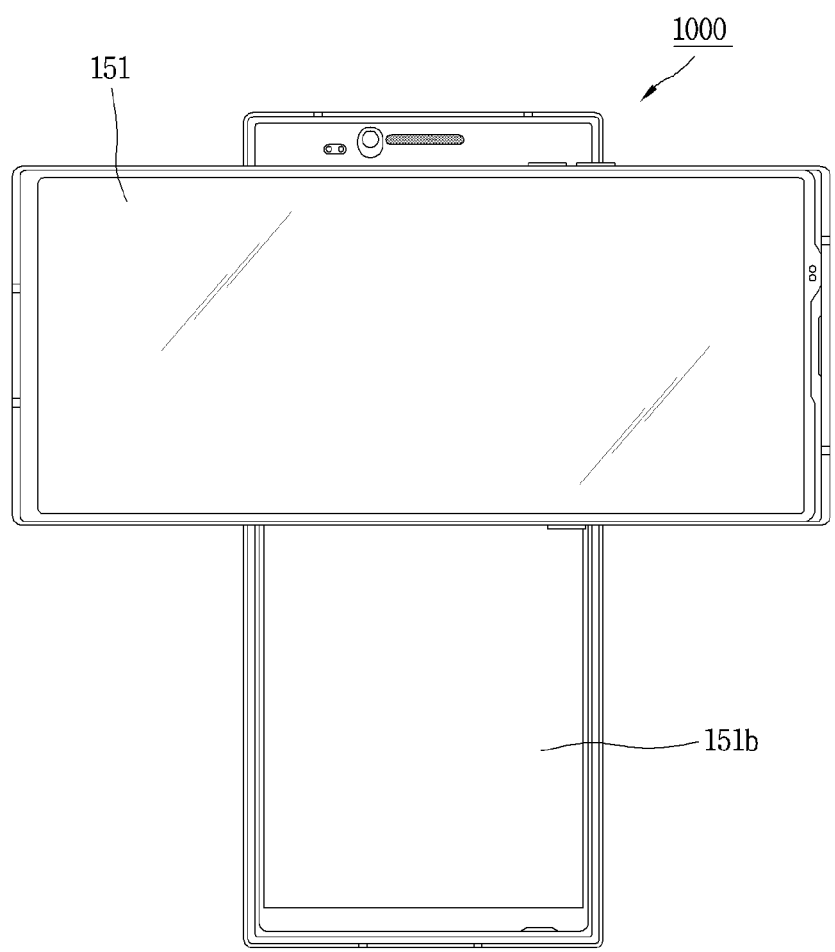

FIGS. 8A and 8B are views illustrating a normal state in which a display of an electronic device according to one implementation fully overlap a main body and a swivel state in which the display has rotated relative to the main body by a predetermined angle.

Specifically, FIG. 8A illustrates a normal state in which a display of the electronic device 1000 overlaps the main body. On the other hand, FIG. 8B illustrates a swivel state in which the display of the electronic device 1000 is rotated by a predetermined angle with respect to the main body.

Referring to FIG. 8A, in the normal state, a screen may be displayed through a front display 151 corresponding to a main display. Meanwhile, referring to FIG. 8B, the front display 151 and a sub display 151b may be disposed on the front surface in the swivel state. Accordingly, according to this specification, a structure in which the front display 151 may be used in the normal state and both the front display 151 and the sub display 151b may be used in the swivel state. In this regard, according to this specification, it is intended to secure antenna performance by implementing slits and antenna clearance in the normal state. In addition, it is intended to secure performance of antennas configured as metal rims, by way of changing a structure of slit and slot in the swivel state.

Meanwhile, the subject matter of the present disclosure related to an electronic device capable of securing antenna performance even in the swivel state compared to the normal state may be proposed in the following structure, but is not limited thereto.
1) Proposing a front display cover structure configured by an injection part and a metal part
2) Proposing a front metal structure that can be applied simultaneously to the normal state and the swivel state
3) Improving antenna efficiency characteristics by using a front display metal slot Specifically, in an electronic device to which a variable structure such as a swivel structure according to this specification is applied, a front display metal slot structure for securing antenna performance is proposed. In this regard, a front metal case may be used as a swivel front display assembly. When the swivel type electronic device is in the normal state, slit positions of the front metal case and a middle metal case may align with (or overlap) each other. On the other hand, in the swivel state, a structure in which opening structures such as slits and slots are formed on the front metal case so as not to interfere with the slit position of the middle metal case. Meanwhile, side surface portions of the middle metal case may be used as antennas. Hereinafter, a display and antenna structure of the swivel type electronic device will be described in detail with reference to FIGS. 9A and 9B.

Figure 9A:
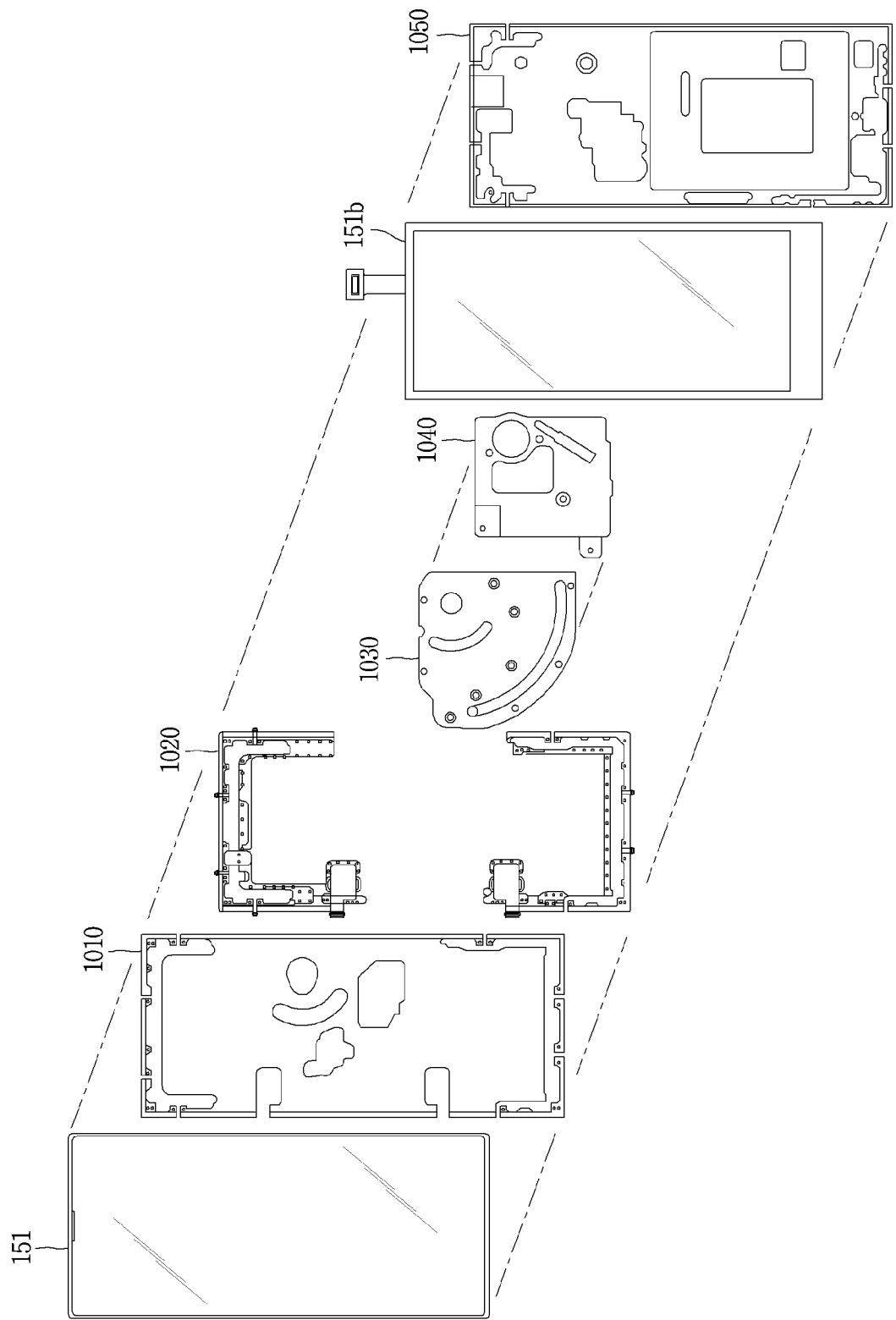
FIG. 9A is an exploded view illustrating a plurality of detailed components configuring an electronic device according to one implementation.
Figure 9B:
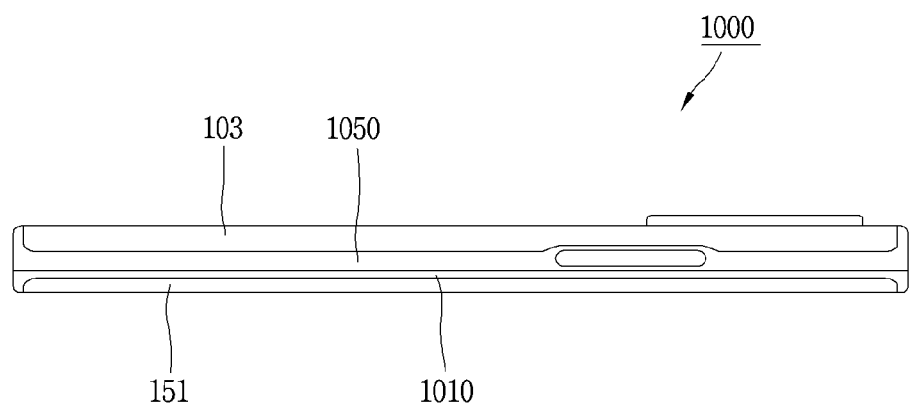
FIG. 9B is a lateral view of the electronic device in which the plurality of detailed components is coupled together.

First of all, a detailed structure of the electronic device disclosed herein will be described. In this regard, FIG. 9A is an exploded view illustrating a plurality of detailed components configuring an electronic device according to one implementation. FIG. 9B is a lateral view of the electronic device in which the plurality of detailed components is coupled together.

Referring to FIGS. 9A and 9B, the electronic device may include a display 151, a supporting frame 1010 corresponding to a metal frame of a front display, and a dielectric frame 1020 corresponding to an injection region of the front display. In addition, the electronic device may further include a swivel hinge 1030, a fixing hinge 1040, and a sub display 151b. In addition, the electronic device may further include a main frame 1050 and a rear cover 103.

The display 151 may be configured to display a screen, and disposed on a front surface of a main body of the electronic device. On the other hand, a sub-display 151b may be configured to be exposed on the front surface together with the display 151 when the electronic device is switched to the swivel state.

The supporting frame 1010 may be configured as a metal frame that supports the front display. The supporting frame 1010 may be coupled to the display to support the display, and provided with a metal rim disposed on at least one side surface (or side portion).

The dielectric frame 1020 may be configured to support the display 151 by being coupled to the supporting frame 1010. The dielectric frame 1020 may correspond to an injection region of the display 151 to be coupled to the front display 151.

The swivel hinge 1030 may be disposed in aperture regions of the supporting frame 1010 and the main frame 1050 so that the supporting frame 1010 and the main frame 1050 are coupled to each other. The swivel hinge 1030 may be disposed in aperture regions of the supporting frame 1010 and the main frame 1050 so that the supporting frame 1010 rotates with respect to the main frame 1050. Alternatively, the swivel hinge 1030 may be disposed in aperture regions of the supporting frame 1010 and the main frame 1050 so that the main frame 1050 rotates with respect to the supporting frame 1010. The fixing hinge 1040 may be coupled to the swivel hinge 1030 so that the supporting frame 1010 rotates with respect to the main frame 1050. Alternatively, the fixing hinge 1040 may be coupled to the swivel hinge 1030 such that the main frame 1050 rotates with respect to the supporting frame 1010.

The main frame 1050 may be rotatably coupled to the supporting frame 1010 and provided with a metal rim disposed on a side portion (or side surface). The metal rim of the main frame 1050 may include a first antenna ANT1 and a second antenna ANT2 operating in different bands. The rear cover 103 coupled to the main frame 1050 may be formed of a glass material.

Hereinafter, a description will be given of a detailed operation and function of the electronic device having a plurality of antennas according to an embodiment provided with a multi-transceiving system as illustrated in FIGS. 3B, 3C, 6A, and 6B, in the electronic device of FIGS. 2A to 3A.

In this regard, the electronic device may be configured to provide 5G communication services in various frequency bands. Recently, attempts have been made to provide 5G communication services using a sub-6 band below a 6 GHz band. Meanwhile, some of LTE frequency bands may be allocated to provide 5G communication services.

In this regard, the electronic device may be configured to provide 5G communication services in various frequency bands. Recently, attempts have been made to provide 5G communication services using a sub-6 band below a 6 GHz band. It is also expected to provide 5G communication services by using a millimeter-wave (mmWave) band in addition to the sub-6 band for a faster data rate.

In order to provide a 5G communication service using such a mmWave band, array antennas including a plurality of antenna elements may be disposed in the electronic device. In the present disclosure, we intend to secure 5G wireless technology in advance by proposing a frame slot structure for improving mmWave antenna performance in an electronic device having a metal rim structure.

In this regard, due to design constraints of an electronic device such as a mobile terminal, the height of a metal rim may be reduced or post-processed. However, in this case, structural design constraints of an electronic device such as a mobile terminal are generated. In addition, large cost may be incurred during post-processing (NCVM) to avoid color heterogeneity due to the use of a member other than a metal material.

Meanwhile, in an electronic device such as a mobile terminal, when a mmWave antenna module is disposed inside the electronic device, interference with a metal rim constituting the exterior of the electronic device may be generated. The radiation performance of the antenna module may be degraded due to interference with such a metal rim. Furthermore, in order to reduce a thickness of the electronic device, a space inside the electronic device may be limited, and a metal rim may be adopted as a design matter.

Therefore, the main technical features of the present disclosure to solve this problem are as follows.
1) A mmWave antenna module disposed inside an electronic device designed with a metal rim design.
2) A structure for avoiding interference with a metal rim while partially removing the metal rim and placing the mmWave antenna module therein
3) Antenna module seated on an inclined surface to avoid interference with the metal rim Specifically, in the present disclosure, a mmWave antenna module provided at a region between a side metal and a rear cover metal sheet is intended to be claimed. In addition, as a major technical feature, a structure in which an USIM tray (side metal structure) and a mmWave antenna module are partially overlapped while avoiding mutual interference.

Figure 10A:
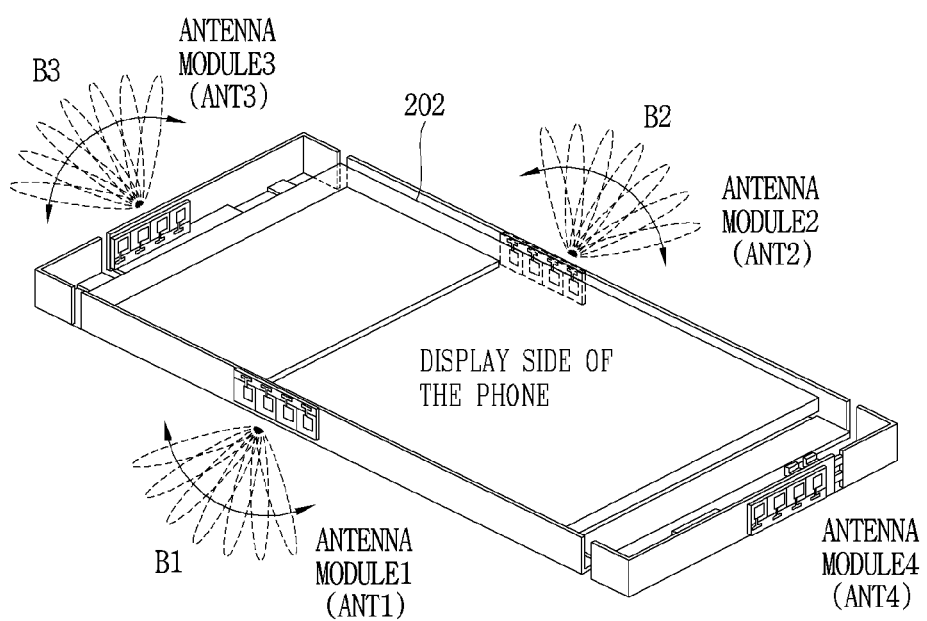
FIG. 10A shows a structure in which a plurality of array antennas according to the present disclosure are disposed on an electronic device.

In this regard, FIG. 10A shows a structure in which a plurality of array antennas according to the present disclosure are disposed on an electronic device. Referring to FIGS. 3A to 3C and 10A, a first array antenna ANT1, that is, an antenna module 1 (ANTENNA MODULE 1) is disposed on one of four side surfaces constituting an electronic device. Meanwhile, a second array antenna ANT2, that is, an antenna module 2 (ANTENNA MODULE 2) may be disposed on the other side opposite to the one side. Specifically, the first and second array antennas ANT1, ANT2 may be disposed on a left side surface and a right side surface. However, the present disclosure is not limited to this structure, and the antenna module 2 (ANTENNA MODULE 2) may be any antenna module disposed on a side surface different from that of the antenna module 1 (ANTENNA MODULE 1).

Meanwhile, a third array antenna ANT3, that is, an antenna module 3 (ANTENNA MODULE 3) may be disposed on a rear surface or another side surface of the electronic device. Meanwhile, when four array antennas are respectively disposed on four side surfaces of the electronic device, a fourth array antenna ANT4, that is, an antenna module 4 (ANTENNA MODULE 4) may be further provided. In this case, the third and fourth array antennas ANT3, ANT4 may be respectively disposed on different side surfaces, for instance, an upper side surface and a lower side surface.

The plurality of array antennas ANT1 to ANT4 may be disposed in a region where metal is removed from a case 202 made of a metal member. For an example, it is assumed that the first and second array antennas ANT1, ANT2 are disposed on left and right side surfaces of the electronic device, and the third and fourth array antennas ANT3, ANT4 are disposed on upper and lower side surfaces thereof. On the contrary, it is assumed that the first and second array antennas ANT1, ANT2 are disposed on upper and lower side surfaces of the electronic device, and the third and fourth array antennas ANT3, ANT4 are disposed on left and right side surfaces thereof.

Using the first to fourth array antennas ANT1 to ANT4 configured as described above, the baseband processor (modem) 1400 of the electronic device may perform a multi-input multi-output (MIMO) or diversity operation.

In this regard, the plurality of antenna elements constituting the first to fourth array antennas ANT1 to ANT4 may be patch antenna elements or dipole (or monopole) antenna elements. Alternatively, each of the first to fourth array antennas ANT1 to ANT4 may include a first type array antenna including patch antenna elements and a second type array antenna including dipole (or monopole) antenna elements.

Meanwhile, the number of array antennas is not limited to four as shown in FIG. 10A. In this regard, three array antennas may be used to cover a 270-degree side coverage of the electronic device. For an example, the 270-degree side coverage of the electronic device may be covered using the first, second, and third array antennas ANT1, ANT2, ANT3. For another example, the 270-degree side coverage of the electronic device may be covered using the first, second, and fourth array antennas ANT1, ANT2, ANT4.

Meanwhile, referring to FIGS. 3A, 6A, and 10A, each of a plurality of metal rims disposed on the case 202 may respectively correspond to 4G/5G antennas. Here, the 5G antenna disposed on the plurality of metal rims may be a sub-6 antenna having a band below 6 GHz. On the contrary, the plurality of array antennas ANT1 to ANT4 disposed in a region where metal is removed from the case 202 made of a metal member are 5G antennas operating in a mmWave band.

Figure 10B:
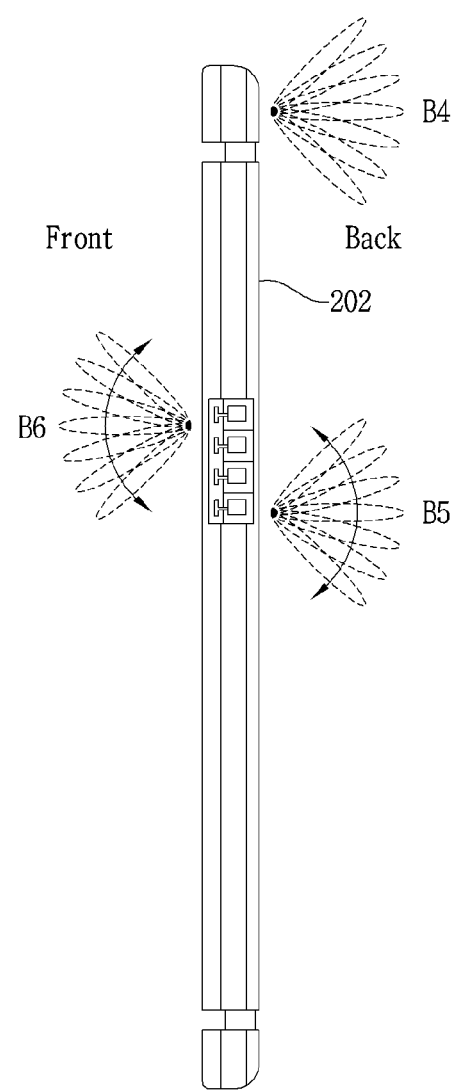
FIG. 10B shows a conceptual view in which beamforming is performed through a signal radiated to a front surface or back surface of an electronic device when a second type array antenna according to an embodiment is disposed in the electronic device.

On the other hand, FIG. 10B illustrates a conceptual view in which a second type array antenna according to an embodiment performs beamforming through a signal radiated to a front or rear surface of the electronic device when the second type array antenna is disposed in the electronic device. Referring to FIG. 10A, the 270-degree side coverage of the electronic device may be covered using three array antennas, for instance, the first, second, and third array antennas ANT1, ANT2, ANT3. Beamforming may be performed using the second, third, and fourth array antennas ANT2, ANT3, ANT4 through first to third beams B1 to B3 in the 270-degree side coverage of the electronic device.

Referring to FIG. 10B, beamforming may be performed through fourth to sixth beams B4 to B6 on a front or rear surface of the electronic device using a second type array antenna including dipole (or monopole) antenna elements. In this regard, the second type array antenna forming the fourth to sixth beams B4 to B6 on the rear side may be referred to as fourth to sixth array antennas, respectively.

Figure 11A:
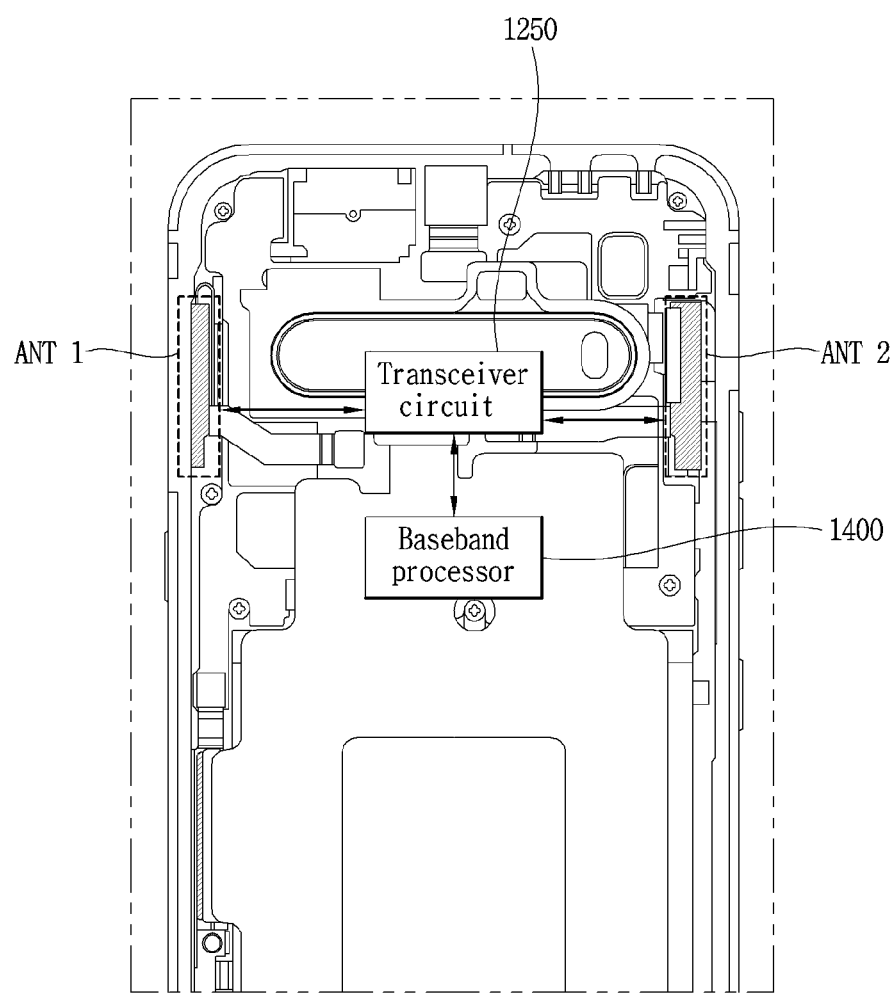
FIG. 11A shows a configuration in which two array antenna modules are disposed on a side surface of an electronic device according to an embodiment. Meanwhile.
Figure 11B:
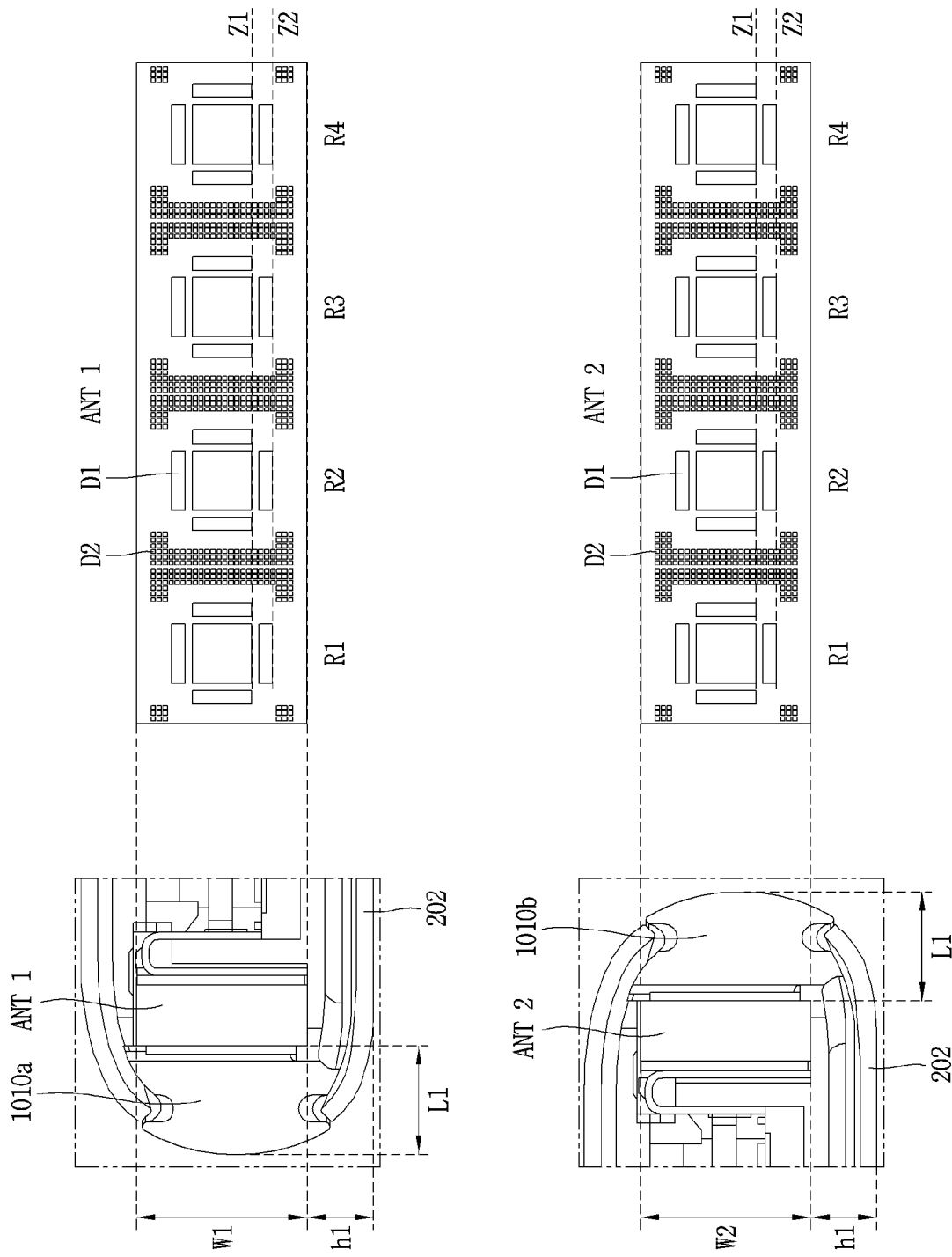
FIG. 11B shows a configuration in which two array antenna modules are vertically disposed on a baseline of an electronic device and an array antenna configuration including a plurality of antenna elements.

The number of array antennas disposed in the electronic device may be changed to two to four according to various embodiments. In this regard, FIG. 11A shows a configuration in which two array antenna modules are disposed on a side surface of an electronic device according to an embodiment. Meanwhile, FIG. 11B shows a configuration in which two array antenna modules are vertically disposed on a baseline of an electronic device and an array antenna configuration including a plurality of antenna elements.

Referring to FIG. 11A, metal rims may be removed from front surfaces of the first array antenna module ANT1 and the second array antenna module ANT2. Referring to FIG. 11B, the first array antenna module ANT1 and the second array antenna module ANT2 may be disposed substantially perpendicular to a baseline (BL) of the electronic device. Accordingly, first and second signals radiated through the first array antenna module ANT1 and the second array antenna module ANT2 may be radiated through side surfaces of the electronic device.

A cover glass 501 may be disposed above the electronic device to transmit electromagnetic waves. Dielectric mold portions 1010a, 1010b may be disposed between the cover glass 501 disposed thereabove and the lower case 202 disposed therebelow. In this regard, the lower case 202 may be a metal case 202.

The first and second signals beamformed through the first array antenna module ANT1 and the second array antenna module ANT2 may be radiated through the dielectric mold portions 1010a, 1010b disposed on side surfaces thereof. In this regard, part of the beamformed first and second signals may be radiated through the cover glass 501 disposed thereabove. Meanwhile, the arrangement structure of the cover glass 501 and the case 202 is not limited to a configuration shown in FIG. 9B. For another example, the cover glass 501 may be disposed below the electronic device and the case 202 may be disposed above the electronic device.

A width of the first array antenna module ANT1 may be expressed as W1, and a width of the second array antenna module ANT2 may be expressed as W2. In this regard, the width W1 of the first array antenna module ANT1 and the width W2 of the second array antenna module ANT2 may be configured to have the same dimension.

Meanwhile, a vertical distance from a lower end of the first array antenna module ANT1 to an end portion of the case 202 may be expressed as h1. A vertical distance from a lower end of the second array antenna module ANT2 to an end portion of the case 202 may be expressed as h2. In this regard, since the first array antenna module ANT1 and the second array antenna module ANT2 have the same configuration and arrangement form, the vertical distances h1, h2 may have the same dimension. Furthermore, a distance from an end portion of the first array antenna module ANT1 to an end portion of the dielectric mold portion 1010a may be expressed as L1. A distance from an end portion of the second array antenna module ANT2 to an end portion of the dielectric mold portion 1010b may be expressed as L2. In this regard, since the first array antenna module ANT1 and the second array antenna module ANT2 have the same configuration and layout, the distances L1, L2 to the end portions may be configured to have the same dimension.

Meanwhile, each of the first array antenna module ANT1 and the second array antenna module ANT2 may include a plurality of antenna elements R1 to R4. The first array antenna module ANT1 and the second array antenna module ANT2 may have a multi-layer substrate structure in which a plurality of substrates are stacked.

The number of the plurality of antenna elements R1 to R4 is not limited to four. Depending on an application in consideration of its beamforming resolution, the number of the plurality of antenna elements may be changed to 4, 6, 8, or the like. Meanwhile, the first array antenna module ANT1 and the second array antenna module ANT2 configured with a multi-layer board structure may be configured with two or more antenna elements in a vertical direction. Accordingly, the first array antenna module ANT1 and the second array antenna module ANT2 may operate in a wide band. For an example, the first array antenna module ANT1 and the second array antenna module ANT2 may operate in a first band corresponding to a 28 GHz band and a second band corresponding to a 39 GHz band.

Dummy structures D1, D2 may be disposed between the respective antenna elements R1 to R4 to reduce mutual interference. In this regard, the dummy structure may be a conductive plate structure configured in a stacked form on a multi-layer substrate. Mutual interference between the respective antenna elements R1 to R4 may be reduced through the dummy structures D1, D2 such as the conductive plate structures. Accordingly, the dummy structures D1, D2 may be referred to as an electronic band gap (EBG). Furthermore, structural stability such as rigidity of the first array antenna module ANT1 and the second array antenna module ANT2 may be improved through the dummy structures D1, D2 such as the conductive plate structures.

Meanwhile, an array antenna module disposed inside the electronic device described herein may be disposed offset in a vertical direction. In this regard, FIGS. 12A to 12C show a structure in which an antenna module does not overlap with a metal rim, a structure in which the antenna module overlaps with the metal rim, and a structure in which the antenna module is tilted with respect to the metal rim according to different embodiments, and radiation patterns thereof.

Figure 12A:
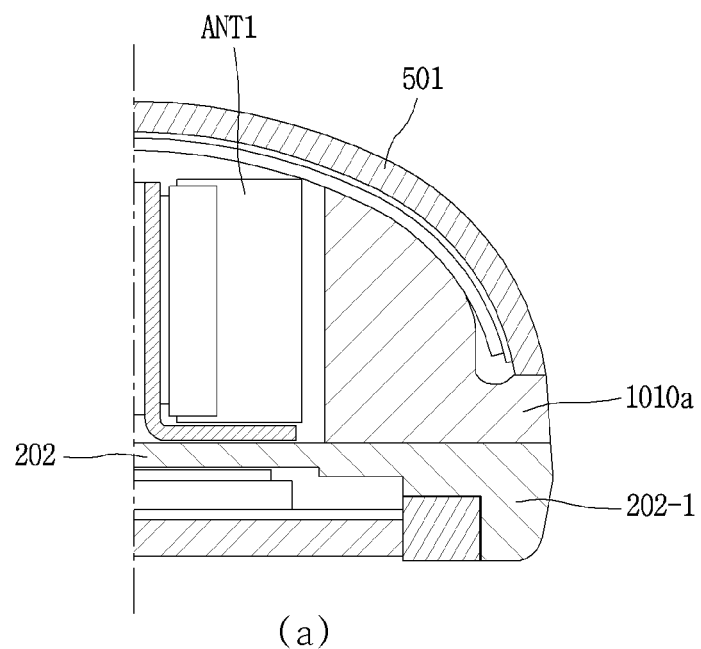
FIGS. 12A to 12C show a structure in which an antenna module does not overlap with a metal rim, a structure in which the antenna module overlaps with the metal rim, and a structure in which the antenna module is tilted with respect to the metal rim according to different embodiments, and radiation patterns thereof.
Figure 12A:
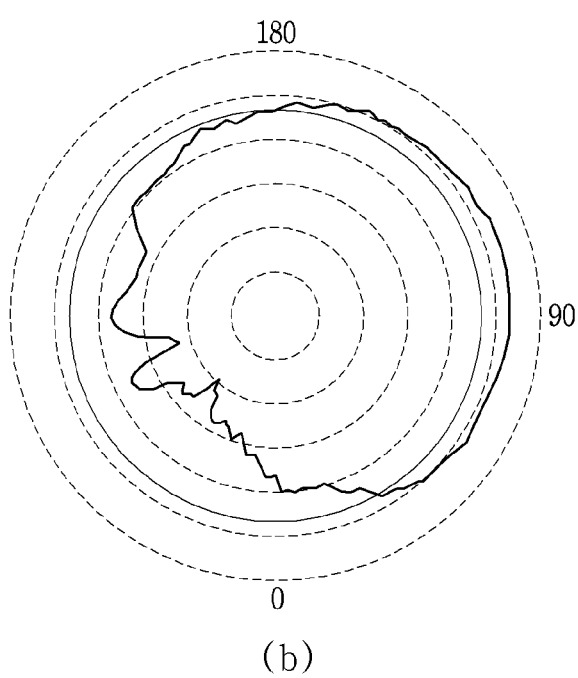

Referring to (a) of FIG. 12A, the antenna module ANT1 may be vertically disposed on the metal frame 202 disposed inside the electronic device to radiate a beam emitted from the antenna module ANT1 through a side surface portion of the electronic device. A dielectric mold portion 1010a may be disposed between the antenna module ANT1 and the cover 501. Accordingly, a beam emitted from the antenna module ANT1 may be radiated to a side surface portion of the cover 501 through the dielectric mold portion 1010a. A height of a metal rim 202-1 may be set such that the antenna module ANT1 does not overlap with a metal rim 202a of the metal rim 202.

Referring to FIGS. 11A to (b) of FIG. 12A, it can be seen that a radiation pattern by the antenna module ANT1 is formed in a side surface portion. Accordingly, a radiation pattern by the antenna module ANT1 forms a wide beam pattern in a vertical direction in the side surface portion. On the contrary, in the radiation pattern by the antenna module ANT1, a narrow beam pattern is formed in a horizontal direction in the side surface portion. Referring to FIG. 11B and (a) of FIG. 12A, in the antenna module ANT1, the plurality of antenna elements R1 to R4 are disposed in a horizontal direction, that is, in a y-axis direction, to form a narrow beam pattern. In addition, the phases of signals applied to the antenna elements R1 to R4 may be adjusted to perform beamforming in a horizontal direction. On the contrary, since only one antenna element is disposed in the antenna module ANT1 in a vertical direction, that is, in a z-axis direction, a wide beam pattern is formed. Meanwhile, the present disclosure may not be limited to a 1×4 array antenna of FIG. 11B and may be changed to 1×8, 2×4, and 2×8 array antennas. When a plurality of antenna elements are disposed in a vertical direction such as a 2×4 or 2×8 array antenna, beamforming may be performed in a vertical direction as well.

Figure 12B:
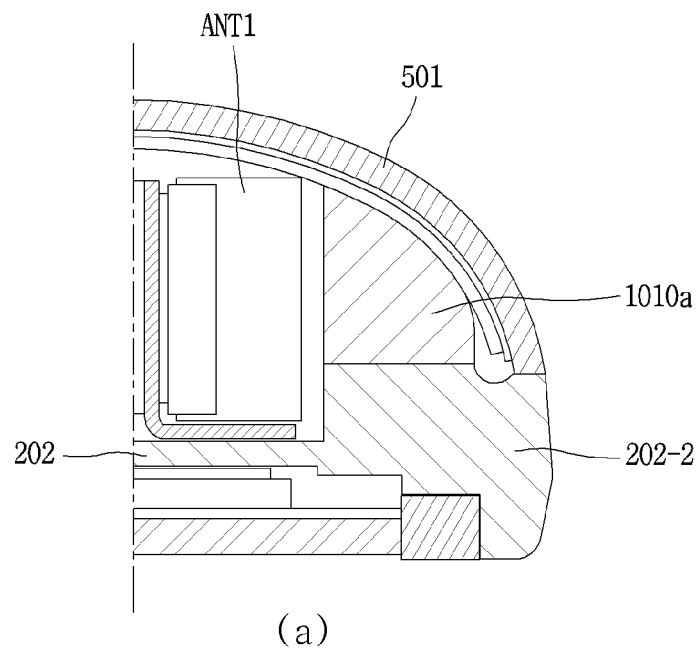
Figure 12B:
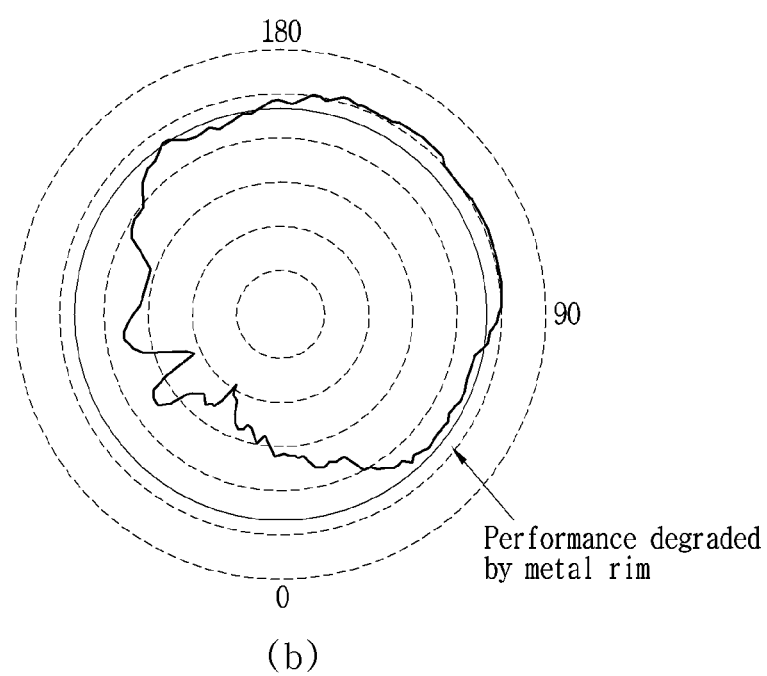
Figure 12C:
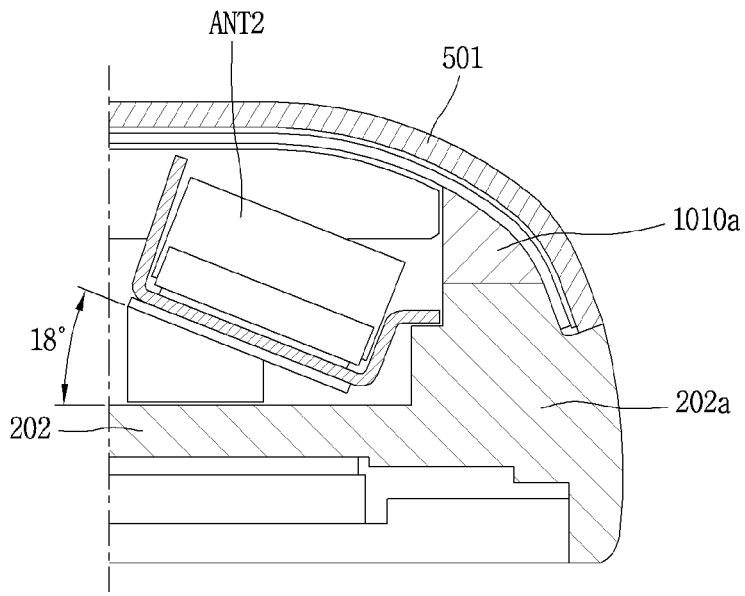
Figure 12C:
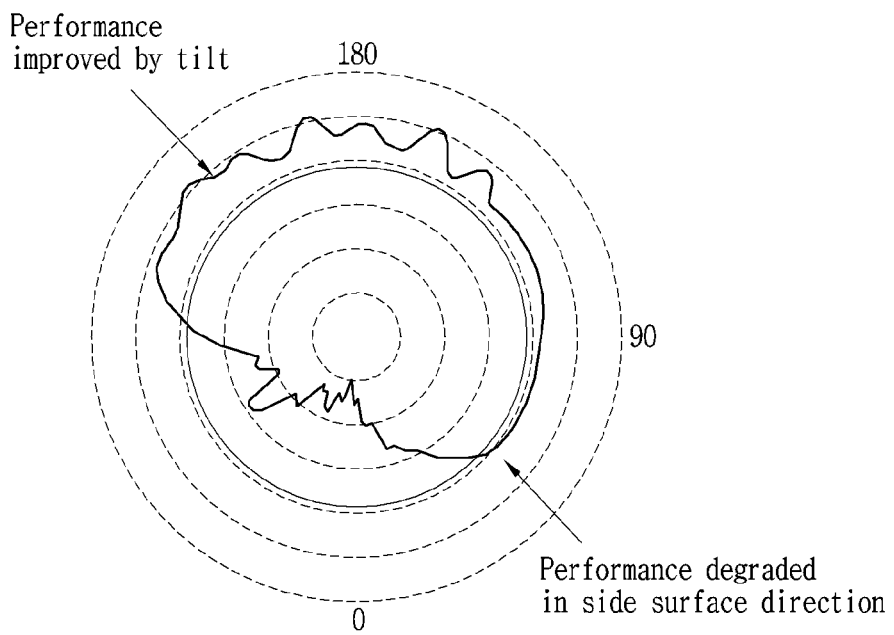

Referring to (a) of FIG. 12B, the antenna module ANT1 is vertically disposed on the metal frame 202 disposed inside the electronic device to radiate a beam emitted from the antenna module ANT1 through a side surface portion of the electronic device. A dielectric mold portion 1010a may be disposed between the antenna module ANT1 and the cover 501. Accordingly, a beam emitted from the antenna module ANT1 may be radiated to a side surface portion of the cover 501 through the dielectric mold portion 1010a. Meanwhile, a height of a metal rim 202-2 may be set such that the antenna module ANT1 partially overlaps with a metal rim 202b of the metal rim 202.

Referring to (a) of FIG. 12B and (b) of FIG. 12B, it can be seen that the radiation pattern by the antenna module ANT1 is formed in a side region, and radiation pattern performance is degraded by the metal rim 202b in a lower region of the side region. Accordingly, radiation pattern performance to the lower region of the side region is degraded to reduce a beamwidth in a vertical direction.

Referring to (a) of FIG. 12C (a), the antenna module ANT2 may be disposed to be inclined at a predetermined slant angle with respect to the metal frame 202. In this regard, when the predetermined slant angle is disposed to be 45 degrees or more, a beam by the antenna module ANT2 is advantageously radiated to the side surface portion. However, when the metal rim 202a is disposed at a predetermined height or more to accommodate a structure such as a side key, a slant angle of the antenna module ANT2 is limited. In this regard, the slant angle of the antenna module ANT2 may be limited to 45 degrees, 30 degrees, or 20 degrees or less. For an example, the slant angle of the antenna module ANT2 may be limited to about 18 degrees.

In this regard, a metal structure disposed on a side surface of the electronic device may be configured with various metal structures including a USIM module such as a USIM tray, in addition to the side key.

Referring to (a) of FIG. 12C and (b) of FIG. 12C, the radiation pattern by the antenna module ANT2 may be formed by an upper region and a side region, and the beam coverage region may be limited to the upper region and an upper region of the side region. Accordingly, the beam coverage region of the antenna module ANT2 does not cover a lower region of the side region, and the antenna performance to the lower region of the side region is degraded.

Figure 13A:
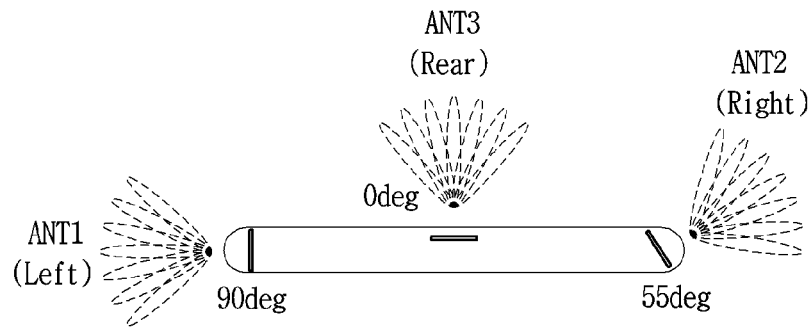
FIGS. 13A and 13B are views in which antenna performance characteristics are compared according to embodiments in which antenna modules disposed at different slant angles are disposed on a side surface of an electronic device.
Figure 13A:
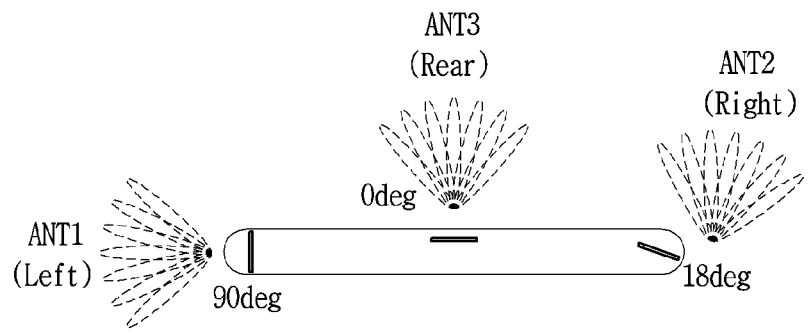
Figure 13A:
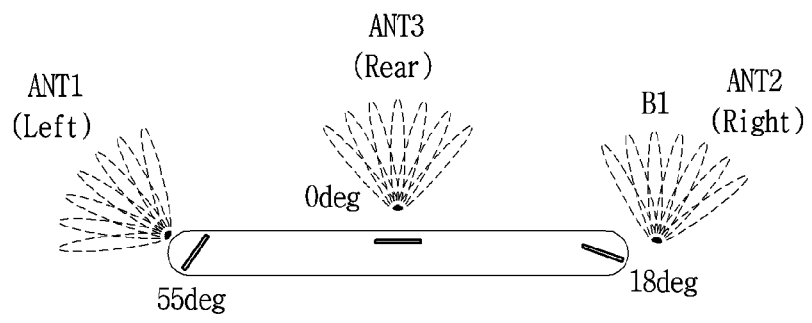
Figure 13B:
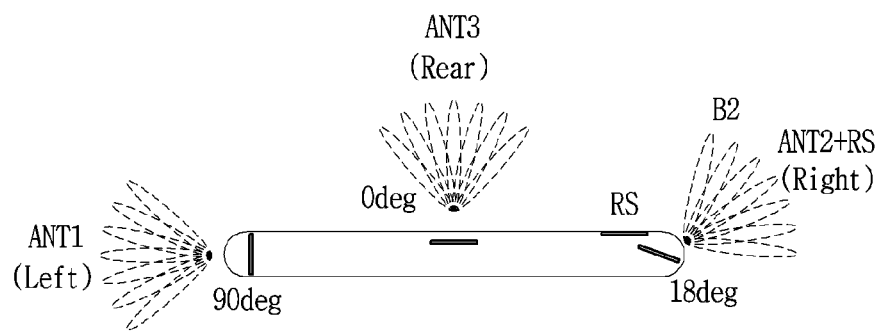

Meanwhile, FIGS. 13A and 13B are views in which antenna performances are compared according to embodiments in which antenna modules disposed at different slant angles are disposed on a side surface of an electronic device. (a) of FIG. 13A shows a structure in which a first antenna module ANT1 is vertically disposed on one side surface of an electronic device and a second antenna module ANT2 is disposed to be inclined at a predetermined angle on the other side surface thereof. In addition, a third antenna module ANT3 may be disposed inside the electronic device to radiate a beam to a rear surface of the electronic device. For an example, the first antenna module ANT1 may be disposed at about 90 degrees with respect to a baseline, and the second antenna module ANT2 may be disposed at about 55 degrees with respect to the baseline. The third antenna module ANT3 may be disposed at about 0 degrees with respect to the baseline.

Meanwhile, (b) of FIG. 13A shows a structure in which the first antenna module ANT1 is vertically disposed on one side surface of the electronic device, and the second antenna module ANT2 is disposed to be inclined at an angle of 30 degrees or less than 20 degrees on the other side surface thereof. In addition, a third antenna module ANT3 may be disposed inside the electronic device to radiate a beam to a rear surface of the electronic device. For an example, the first antenna module ANT1 may be disposed at about 90 degrees with respect to a baseline, and the second antenna module ANT2 may be disposed at about 18 degrees with respect to the baseline. The third antenna module ANT3 may be disposed at about 0 degrees with respect to the baseline.

(c) of FIG. 13A shows a structure in which the first antenna module ANT1 is disposed at a first slant angle on one side surface of the electronic device and the second antenna module ANT2 is disposed at a second slant angle on the other side surface thereof. In this regard, the second slant angle may be formed at a smaller slant angle than the first slant angle. In addition, a third antenna module ANT3 may be disposed inside the electronic device to radiate a beam to a rear surface of the electronic device. In this regard, the first antenna module ANT1 may be disposed at a slant angle of 45 degrees or greater with respect to the baseline, and the second antenna module ANT2 may be disposed at an slant angle of 30 degrees or less than 20 degrees with respect to the baseline. For an example, the first antenna module ANT1 may be disposed at about 55 degrees with respect to the baseline, and the second antenna module ANT2 may be disposed at about 18 degrees with respect to the baseline. The third antenna module ANT3 may be disposed at about 0 degrees with respect to the baseline.

Referring to (a) of FIG. 13B, when the side surface is tilted at 55 degrees as shown in (a) of FIG. 13A or (c) of FIG. 13A, it can be seen that peak gain and CDF 50% gain characteristics satisfy the specification in N261 and N260 bands (i.e., low bands (LBs)). On the other hand, when the side surface is tilted at 18 degrees as shown in (b) of FIG. 13A or (c) of FIG. 13A, it can be seen that peak gain and CDF 50% gain characteristics satisfy the specification in the N260 band (i.e., low band (LB)). However, when the side surface is tilted at 18 degrees, the peak gain characteristics satisfy the specification, but the CDF 50% gain characteristic does not satisfy the specification in the N261 band (i.e., low band (LB)).

As described above, since the 50% CDF gain characteristics does not satisfy the specification in some frequency bands, it is necessary to improve beam characteristics to satisfy the specification even when the antenna module is tilted at a predetermined angle or less. In this regard, when a reflection sheet (RS), that is, a metal sheet, is disposed on the cover as shown in (b) of FIG. 13B, a beam direction of the second antenna ANT2 is changed to the side region. On the contrary, referring to (b) of FIG. 13A or (c) of FIG. 13A, when the reflection sheet is not disposed on the cover, a beam direction of the second antenna ANT2 is formed adjacent to the rear region. When the reflection sheet is not disposed on the cover, a main beam of the second antenna ANT2 may be directed at about 72 degrees in the form of B1. However, when the reflection sheet RS is attached thereto as shown in (b) of FIG. 13B, the main beam of the second antenna ANT2 may be substantially directed to the side region in the form of B2. Accordingly, the peak gain and CDF 50% gain characteristics satisfy the specification in all bands including the N261 and N260 bands.

Figure 14A:
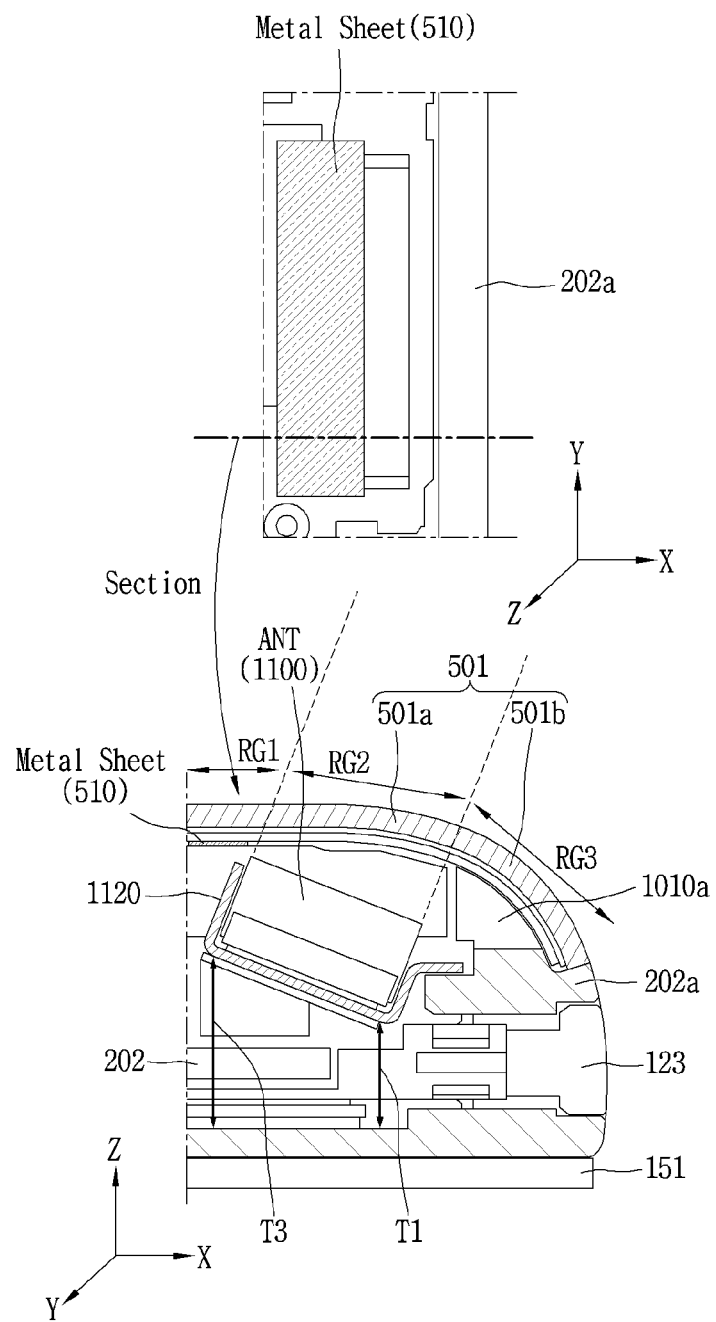
FIGS. 14A and 14B are conceptual views showing a configuration diagram in which a metal sheet is attached to a cover and a radiation pattern of an antenna module according to the presence or absence of the metal sheet.
Figure 14B:
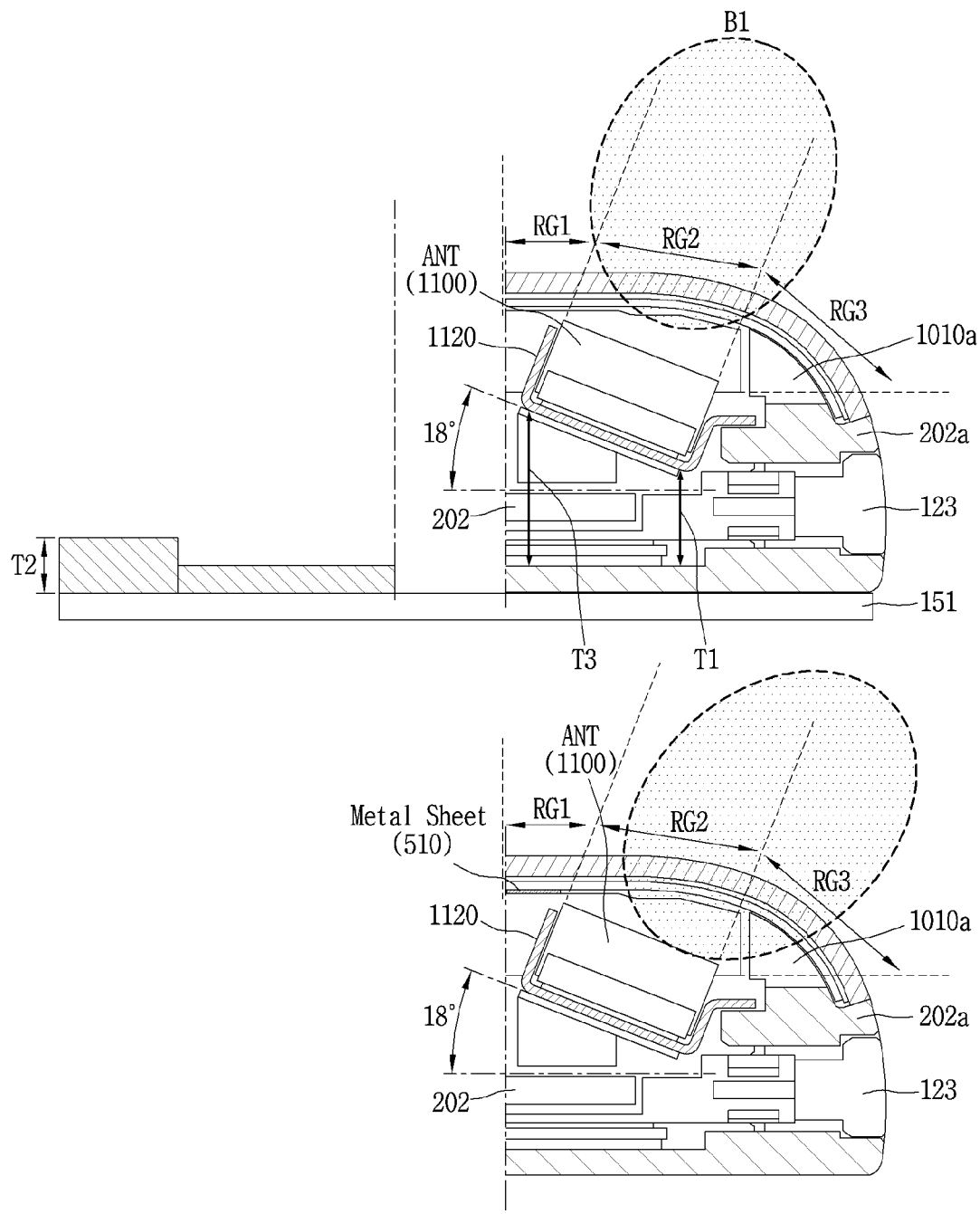

In this regard, on the other hand, FIGS. 14A and 14B are conceptual views showing a configuration diagram in which a metal sheet is attached to a cover and a radiation pattern of an antenna module according to the presence or absence of the metal sheet. FIG. 14A shows a front view and a side cross-sectional view of a configuration in which a metal sheet is attached to a cover of an electronic device. Referring to FIG. 14A, the electronic device may include a cover 501, an antenna module ANT 1100, and a metal sheet 510. The cover 501 may be disposed at a rear side portion of the electronic device and the display 151 may be disposed at a front side portion thereof.

The cover 501 may include a rear surface portion and a side surface portion to transmit electromagnetic waves. The cover 501 may include a planar portion 501a corresponding to the rear surface portion and a bending portion 501b corresponding to the side surface portion. In this regard, a partial region of the side surface portion may be configured as a planar portion extending from an end portion of the bending portion 501b.

In this regard, the bending portion 501b may be disposed as a non-transparent region. However, the present disclosure is not limited thereto, and at least part thereof may be disposed as a transparent region to display visual information through the bending portion 501b. Accordingly, in the present example, an edge portion of a window that is bent toward a side surface from front and rear surfaces of the electronic device to constitute at least part of the side surface may be used as a display. Alternatively, the cover glass 501 may be bent at upper and lower ends of the electronic device, and the bent portion may constitute a non-transparent bezel region.

The antenna module ANT 1100 may be disposed in an inclined shape at a predetermined slant angle with respect to the metal frame 202 inside the electronic device. Referring to FIGS. 11B and 14A, the antenna module ANT 1100 may be configured to transmit or receive a beamformed signal through a plurality of antenna elements R1 to R4.

The cover 501 may be divided into a plurality of regions around a region facing the antenna module ANT 1100. In this regard, a first region RG1 corresponds to a rear flat region. For an example, the first region RG1 may range from 60 degrees to 90 degrees with respect to the base line, but is not limited thereto. A second region RG2 may correspond to a region facing the antenna module ANT 1100. The second region RG2 may be a region connecting a flat region and a side region. For an example, the second region RG2 may range from 30 degrees to 60 degrees with respect to the baseline, but is not limited thereto. A third region RG3 corresponds to the side region. Part of the third region RG3 may be configured with a metal case. For an example, the third region RG3 may range from 0 degrees to 30 degrees with respect to the baseline, but is not limited thereto.

A predetermined slant angle of the antenna module ANT 1100 may be determined to be less than a threshold angle such that a module bracket 1120 and a side key 123 are separated from each other by a predetermined distance so as not to overlap each other. The module bracket 1120 may be implemented as a seating structure of the antenna module ANT 1100. In addition, the module bracket 1120 may be implemented as a heat dissipation and support structure by the antenna module ANT 1100 and the transceiver circuit.

In this regard, a thickness of the metal case 202 may be defined differently according to the slant angle of the antenna module ANT 1100. The metal case 202 may have different thicknesses at both side points of the module bracket 1120 where the antenna module ANT 1100 is seated. Meanwhile, when the antenna module is disposed at a higher slant angle on the other side of the electronic device, the metal case 202 may be defined to have a smaller thickness. For an example, when the antenna module is disposed at a slant angle higher than 18 degrees, for instance, a slant angle of 55 degrees or 90 degrees, on the other side of the electronic device, a second thickness T2 of the metal case may be defined to have a smaller thickness. Accordingly, the second thickness T2 of the metal case may be defined to have a smaller thickness than the first thickness T1.

The metal sheet 510 may be attached to a rear region of an inner region of the cover 501 such that at least part of the metal sheet 510 overlaps the antenna element. The metal sheet 510 may be configured to reflect a signal from the antenna element to radiate the signal to the side region.

Meanwhile, the electronic device may further include a metal case 202 having a metal rim 202*a* disposed on a side surface of the electronic device. The metal case 202 may be referred to as a metal frame 202. Alternatively, the metal case 202 may be provided separately from the metal frame. The metal case 202 may be configured to be coupled to the cover 501.

Referring to FIGS. 12C and 14A, the electronic device may further include a dielectric mold portion 1010*a* disposed between the metal rim 202*a* and the cover 501. In this regard, the shape of the bending portion 501*b* of the cover 501 may correspond to the shape of the dielectric mold portion 1010*a*. The dielectric mold portion 1010*a* may be seated on a stepped portion of the metal rim 202*a* and coupled to the metal rim 202*a*.

FIG. 14B is a conceptual view showing a configuration diagram in which a metal sheet is attached to a cover and a radiation pattern of an antenna module according to the presence or absence of the metal sheet. In FIG. 14B, when the metal sheet is not attached to the cover, a beam pattern by the antenna module ANT 1100 is as follows. When the antenna module ANT 1100 is disposed to be inclined at an angle of about 18 degrees with respect to the metal frame 202, a main beam direction of the antenna module ANT 1100 may be about 72 degrees. In this regard, the slant angle of the antenna module ANT 1100 may be limited by the metal rim 202*a*. Accordingly, the radiation component of a beam pattern emitted from the antenna module ANT 1100 may be distributed to the first region RG1 and the third region RG3 around the second region RG2. In this case, the first region RG1 corresponds to a rear flat region, the second region RG2 corresponds to a region connecting a flat region and a side region, and the third region RG3 corresponds to the side region. Meanwhile, it is necessary to reflect the beam radiation component of the first region RG1 to the third region RG3 to implement the radiation of the beam to the side region. In this regard, when the metal sheet is not disposed on the cover, a main beam formed through the antenna module ANT 1100 is formed substantially perpendicular to the antenna module ANT 1100 as in B1. On the contrary, when the metal sheet 510 is disposed on the cover, the main beam formed through the antenna module ANT 1100 may be formed in the side region as shown in B2.

Meanwhile, the electronic device may further include a side key 123 disposed between the metal rims 202*a* in one axial direction of the antenna module ANT 1100. In this regard, the metal rim 202*a* may include a lower metal rim disposed below the side key 123 and an upper metal rim disposed above the side key 123. Meanwhile, the side key 123 may be at least one of a volume key, an artificial intelligence (AI) key, and a power key disposed on a side surface of the electronic device.

A slant angle of the antenna module ANT 1100 may be limited by the side key 123 inserted into the metal rim 202*a*. Accordingly, since a main beam direction of the antenna module ANT 1100 is tilted only by a slant angle from a vertical direction, beam coverage may be limited in a lateral direction. In this regard, a predetermined slant angle of the antenna module ANT 1100 may be determined to be less than a threshold angle such that the module bracket 1120 and the side key 123 are separated from each other by a predetermined distance so as not to overlap each other.

For another example, a tilt angle of the antenna module ANT 1100 may be determined such that a module disposed inside the electronic device and the antenna module ANT 1100 are separated by a predetermined distance or more. For an example, a tilt angle of the antenna module ANT 1100 may be determined such that the USIM module and the antenna module ANT 1100 are separated from each other by a predetermined distance or more.

Meanwhile, as shown in FIG. 14B, in order to suppress CDF performance deficiency due to the tilt arrangement of the mmWave antenna module ANT 1100, the metal sheet 510 may be disposed on an upper region of the antenna module ANT 1100. Due to the influence of the metal sheet 510, a beam of the antenna module ANT 1100 may move to the side region, thereby improving the CDF performance.

A reflection sheet, for example, a metal sheet, may be provided to reflect the beam radiation component of the first region RG1 to the third region RG3 so as to implement the radiation of the beam to the side region. Specifically, the metal sheet 510 may be disposed on the first region RG1 of the cover 501 to reflect the beam radiation component of the first region RG1 to the third region RG3. Accordingly, as shown in FIG. 14B, a beam pattern by the antenna module ANT 1100 may be formed in the second region RG2 and the third region RG3.

Figure 15A:
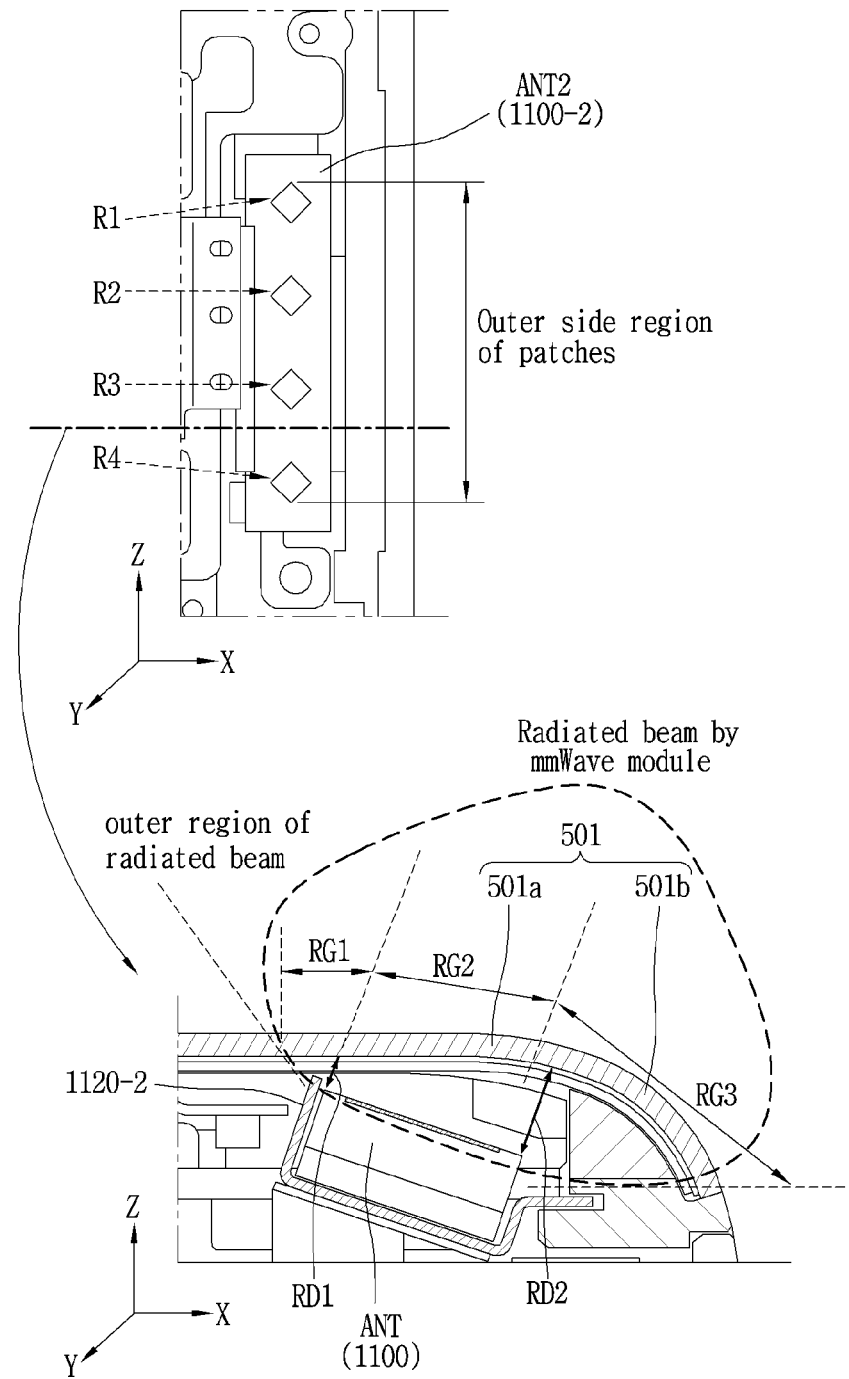
FIGS. 15A and 15B are conceptual views showing a beam coverage region according to whether a metal sheet is applied and a position where the metal sheet is disposed. Meanwhile.
Figure 15B:
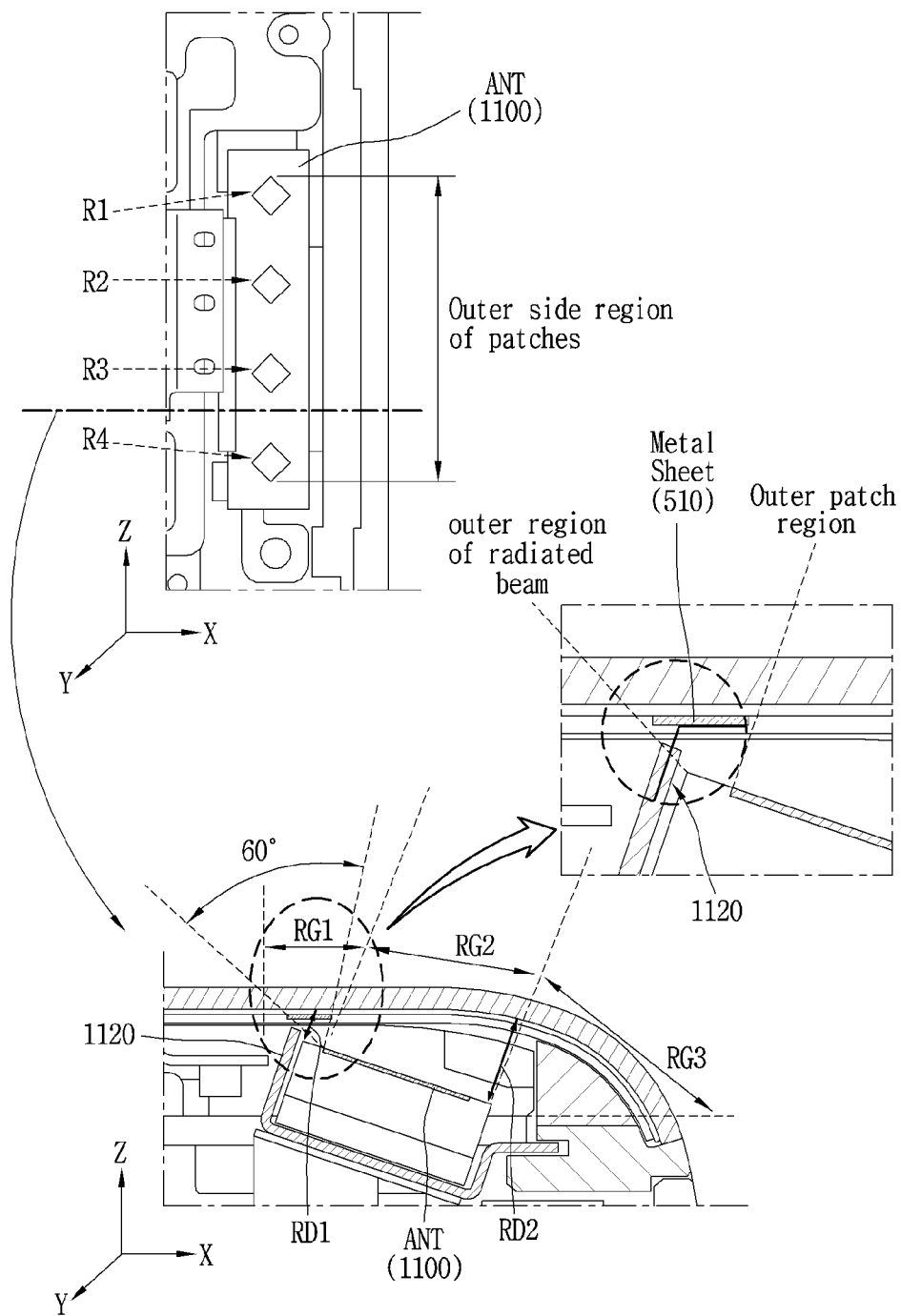
Figure 15C:
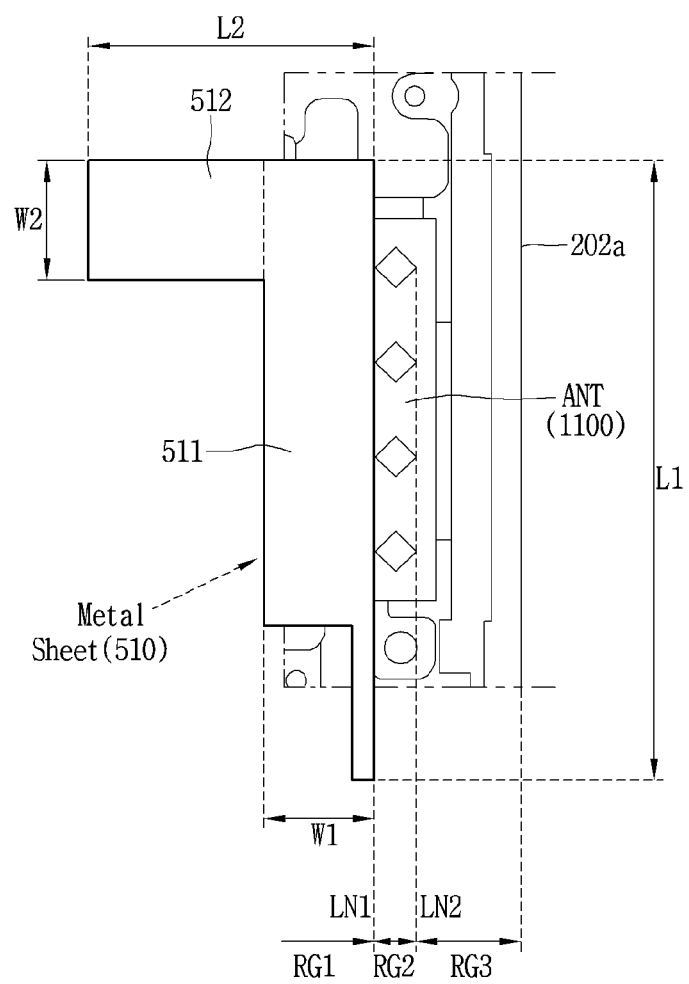
FIG. 15C shows a configuration in which a metal sheet structure is disposed over a patch antenna according to an embodiment.

Meanwhile, FIGS. 15A and 15B are conceptual views showing a beam coverage region according to whether a metal sheet is applied and a position where the metal sheet is disposed. Meanwhile, FIG. 15C shows a configuration in which a metal sheet structure is disposed over a patch antenna according to an embodiment.

Referring to FIGS. 14A to 15C, a mobile terminal having an antenna module according to an aspect of the present disclosure is disclosed. Referring to FIGS. 2B to 2D and 14A to 15C, the mobile terminal has a front surface, a rear surface, and side surfaces, and the housing 210, 310, 501 may have a front side, a rear side, and a lateral side. The housing 501 may include a metal rim 202a formed of a metal material and at least one bending portion 501b formed of a non-metal material. In addition, the housing 210, 310, 501 may be configured with both rear and front surfaces of the mobile terminal. In this case, the housing may include a metal rim 202a, 310 formed of a metal material and bending portions 340, 350 formed of a non-metal material. Meanwhile, a lateral side of the housing may include two short sides 2101, 2103 and two long sides 2102, 2104 that are longer than the two short sides.

The mobile terminal may include a rear cover 501, a reflection sheet 510, and an antenna module ANT 1100. The rear cover 501 may be disposed on a rear side of the housing and may include a planar portion 501a and at least one bending portion 501b that is bent from the planar portion 501a. The reflection sheet 510 may be disposed on the cover 501 and formed of a metal material, and may also be referred to as a metal sheet 510. The antenna module ANT 1100 may be disposed between a rear side of the housing and a front cover (second cover), and configured to radiate a beamforming radio signal. The front cover (second cover) may be configured with the display 151.

The antenna module ANT 1100 may include an insulating member, an electronic component disposed on a surface of the insulating member, and antenna patterns R1 to R4 disposed on the other surface of the insulating member. Here, the insulating member corresponds to a substrate on which the antenna patterns R1 to R4 are disposed. The antenna module ANT 1100 may be configured to be tilted from a portion of the rear side of the housing. The antenna module ANT 1100 may be tilted at a portion of the rear side of the planar portion of the housing. That is, a vertical extension line between both end portions of the antenna module ANT 1100 may be tilted to have a predetermined slant angle from the planar portion of the housing.

As the antenna module ANT 1100 is tilted, a first edge of a front surface of the antenna module ANT 1100 adjacent to the side surface may be disposed closer to the rear case 501 than a second edge thereof. Here, the first edge may be defined as a boundary line between the first region RG1 and the second region RG2. The second edge may be defined as a boundary line between the second region RG2 and the third region RG3. Accordingly, a vertical distance RD1 of a first side of the antenna module ANT 1100 may be configured to be shorter than a vertical distance RD2 of a second side thereof. On the other hand, a third edge of a rear surface of the antenna module ANT 1100 may be configured to be farther from an inside of a front housing than a fourth edge thereof. Here, the third edge and the fourth edge may be defined as a boundary line between each region or defined as a vertical line between both end portion.

Meanwhile, the shape of a side surface of the mobile terminal may be defined by the bending portion 501b of the cover 501 and the lateral side of the housing. The bending portion 501b of the cover 501 and the planar portion 501a of the cover 501 may include a first region RG1, a second region RG2, and a third region RG3. The second region RG2 may be disposed to face the antenna patterns R1 to R4. The third region RG3 may be connected to a portion of the second region RG2 adjacent to the side surface portion of the housing. The first region RG1 may be connected to another region (portion) of the second region RG2 opposite to the third region RG3. The reflection sheet 510 may be disposed on the first region RG1 of the cover 501. A beamforming radio signal of the first region RG1 may be reflected from the second region RG2 and the third region RG3 by the reflection sheet 510.

The antenna module ANT 1100 may further include a module mounting portion 1120. In this regard, the module mounting portion 1120 may be disposed to surround rear and side surfaces of the antenna module ANT 1100. For an example, the module mounting portion 1120 may be formed of a metal material to transmit heat generated from the antenna module ANT 1100 to the housing formed of a metal material.

Meanwhile, since the module mounting portion 1120 operates as a heat dissipation frame in addition to a supporter for supporting the antenna module ANT 1100, it may also be referred to as an antenna frame 1120. Furthermore, the antenna frame 1120 may be regarded as a separate component from the antenna module ANT 1100. In this regard, a mobile terminal according to another aspect of the present disclosure may include a housing, a rear cover 501, a reflection sheet 510, an antenna module ANT 1100, and an antenna frame 1120. In this regard, the detailed description of the housing, the rear cover 501, the reflection sheet 510, and the antenna module ANT 1100 will be replaced with the foregoing description. The antenna frame 1120 that supports the antenna module ANT 1100 may be formed of a metal material.

Meanwhile, referring to FIG. 15A, when the metal sheet is not disposed therein, an antenna beam is formed in a direction perpendicular to the substrate on which the plurality of antenna elements R1 to R4 are disposed. In this regard, the antenna module ANT 1100 may be disposed to be inclined at a predetermined angle to form a main radiation beam component in an XZ-axis direction. Meanwhile, some of radiation components by the antenna module ANT 1100 may also be formed in a Z-axis direction, which is a vertical direction, or an X-axis direction, which is a lateral direction. In this case, a radiation component in the Z-axis direction may be referred to as a rear radiation beam component. In addition, a radiation component in the X-axis direction may be referred to as a side radiation beam component. Meanwhile, the main radiation beam may be formed as a rear radiation beam or a side radiation beam according to a slant angle of the antenna module. For an example, when the third antenna module ANT3 of FIG. 13A is disposed at an angle of about 0 degrees, the main radiation beam may be formed in the Z-axis direction. Therefore, the main radiation beam may be formed in the Z-axis direction to perform rear radiation in a rear direction corresponding to a rear surface of the terminal. On the contrary, when the first antenna module ANT1 of FIGS. 13A (a) and (b) is disposed at about 90 degrees, the main radiation beam is formed in the X-axis direction to perform side radiation to the side region corresponding to a side surface of the terminal. can be done Referring to FIG. 15A, a beam coverage region by an antenna beam may be formed at a predetermined angle with respect to a main beam direction. For an example, when the metal sheet is not disposed therein, the beam coverage region may be formed at a predetermined angle with respect to 72 degrees, which is the main beam direction. Therefore, most of the beam coverage region by the antenna beam is a region corresponding to the planar portion 501a of the cover 501. Accordingly, the beam coverage region does not extend to the side region corresponding to the bending portion 501b of the cover 501.

In this regard, the radiation component of a beam pattern emitted from the antenna module ANT 1100 may be distributed to the first region RG1 and the third region RG3 around the second region RG2. In this case, the first region RG1 corresponds to a rear flat region, the second region RG2 corresponds to a region connecting a flat region and a side region, and the third region RG3 corresponds to the side region. Meanwhile, in order to implement side radiation by the antenna module ANT 1100, it is necessary to reflect the beam radiation component of the first region RG1 to implement the radiation of the beam to the side region.

Referring to FIGS. 15A and 15B, a vertical distance RD1 between a rear cover region provided with the metal sheet 510 corresponding to the reflection sheet and a first side of the antenna module ANT 1100 may be configured to be shorter. In other words, the vertical distance RD1 of the first side may be configured to be shorter than a vertical distance RD2 between a rear cover region that is not provided with the metal sheet 510 and a second side of the antenna module ANT 1100.

Referring to FIG. 15B, a length of the metal sheet 510 may be set to cover a region configured with the first to fourth antenna elements R1 to R4. Specifically, the length of the metal sheet 510 may be set to a length from an end portion of the first antenna element R1 to an end portion of the fourth antenna element R4. That is, the length of the metal sheet 510 may be set to a length from an outer region of the first antenna element R1 to an outer region of the fourth antenna element R4. In this regard, a maximum length of the metal sheet 510 may be a value within a maximum range allowed for a mechanism structure among values above a minimum length of the metal sheet capable of covering the outer region.

As described above, the radiation component of a beam pattern emitted from the antenna module ANT 1100 may be distributed to the first region RG1 and the third region RG3 around the second region RG2. In this case, the first region RG1 corresponds to a rear flat region, the second region RG2 corresponds to a region connecting a flat region and a side region, and the third region RG3 corresponds to the side region. In this regard, the metal sheet 510 may be attached to the first region RG1 of the rear cover in order to implement side radiation by the antenna module ANT 1100. Therefore, the metal sheet 510 may reflect the beam radiation component of the first region RG1 to the third region RG3 to implement the radiation of the beam to the side region.

Meanwhile, a width of the metal sheet 510 may be set to a point from a point corresponding to an end portion of each antenna element to a beam coverage boundary region. In this regard, a maximum width of the metal sheet 510 may be set to a value above a minimum width of the metal sheet capable of covering the points. However, the maximum width of the metal sheet 510 may be below a threshold width at which performance degradation due to blockage of the antenna region does not occur.

In this regard, the metal sheet 510 may be disposed such that an end portion of the metal sheet 510 does not overlap end portions of the first to fourth antenna elements R1 to R4. For another example, an end portion of the metal sheet 510 may be limited in beam coverage and reflected by a partition wall of the module bracket 1120. In other words, the beam coverage may be restricted and reflected by the partition wall of the module bracket 1120 corresponding to the antenna mounting portion and the metal sheet 510 corresponding to the reflection sheet. Accordingly, when the module bracket 1120, which is an antenna mounting portion, is made of a metal material, an end portion of the metal sheet 510 may be disposed to be further spaced apart from a position of the partition wall of the module bracket 1120.

Meanwhile, a thickness of the metal sheet 510 may be set to be above a minimum thickness that can be attached to the cover 501. In addition, a thickness of the metal sheet 510 may be set to a range between a minimum thickness and a maximum thickness capable of maintaining reflection and scattering characteristics in a mmWave band. For an example, the thickness of the metal sheet 510 may be set to 0.5 mm or more.

Referring to FIGS. 14A to 15C, one end portion of each of the antenna elements R1 to R4 of the antenna module ANT 1100 may extended to form a first line LN1 and the other end portion of each of the antenna elements R1 to R4 may be extended to form a second line LN2. The rear cover 501 may include a first region RG1, a second region RG2, and a third region RG3 based on a vertical region of the antenna module ANT 1100. The first region RG1, which corresponds to the planar portion 501*a*, may be disposed in a direction in which the planar portion 501*a* is disposed from the first line LN1. The second region RG2, which corresponds to a region overlapping the antenna elements of the antenna module ANT 1100, may be disposed between the first line LN1 and the second line LN2. The third region RG3 may be a region corresponding to a side edge of the rear cover 501 from the second line LN2.

Meanwhile, the reflection sheet 510 may be disposed to be spaced apart by a distance of 1.0 mm or less from the first line LN1 in the first region RG1 of the rear cover 501. In this regard, referring to FIG. 18, an offset separation distance between the end portion of the reflection sheet 510 and the antenna module 1100 ANT 1100 may be implemented to be less than 1.0 mm. In this regard, the beamforming radio signal radiated from the antenna module ANT 1100 may be radiated through the second region RG2 of the rear cover 501 overlapping the antenna module ANT 1100. In addition, the beamforming radio signal may be reflected by the reflection sheet 510 or the metal frame 202 and radiated through the second region RG2 and the third region RG3. On the contrary, the beamforming radio signal may be blocked in the first region RG1 of the rear cover 501 where the reflection sheet 510 is disposed.

Referring to FIG. 15C, as an example of the reflection sheet 510, the metal sheet 510 may include a first metal sheet 511 configured to reflect an antenna beam and a second metal sheet 512 configured to perform a heat dissipation function. In this regard, the first metal sheet 511 and the second metal sheet 512 may be integrally formed. Alternatively, the first metal sheet 511 and the second metal sheet 512 may be configured by combining different metal sheets. In this case, the second metal sheet 512 may be implemented by a metal having a material capable of optimizing heat dissipation characteristics. The first metal sheet 511 may be configured to have a first length L1 and a first width W1 to reflect beams emitted from the plurality of antenna elements. Referring to FIGS. 15B and 15C, the first width W1 of the first metal sheet 511 may be set to be above a threshold width that allows an antenna beam width to be above 60 degrees. Meanwhile, the second metal sheet 512 may extend from the first metal sheet 511 and extend into an inner region of the electronic device to operate as a heat dissipation sheet that absorbs heat inside the electronic device. The second metal sheet 512 may be configured to have a second length L1 and a second width W2.

Referring to FIGS. 15B and 15C, the first metal sheet 511 may be disposed such that an extension line formed in a direction perpendicular to the antenna module ANT 1100 from one end portion of the antenna element corresponds to an end portion of the first metal sheet 511. In other words, an x-axis end position of the first metal sheet 511 may be set to the same position as the position of an outer point of a patch antenna disposed in the antenna module ANT 1100. Meanwhile, the position of the first metal sheet 511 on a y-axis may be disposed to include all of the plurality of patch antennas disposed in the antenna module ANT 1100.

With regard to the x-axis end position, the first metal sheet 511 may be disposed such that an extension line formed in a direction perpendicular to the antenna module ANT 1100 from one end portion of the antenna element intersects the first metal sheet 511. Therefore, the first width W1 and the position of an end portion of the first metal sheet 511 may be determined such that the extension line corresponds to the end portion of the first metal sheet 511 or intersects the first metal sheet 511.

Meanwhile, the first metal sheet 511 may be disposed such that a first extension line formed in a direction perpendicular to the antenna module ANT 1100 and a second extension line formed at a predetermined angle with respect thereto at one end portion of the antenna element correspond to the other end portion of the first metal sheet 511. In this regard, the first extension line and the second extension line may be formed at an angle corresponding to an antenna beam width. For an example, the first extension line and the second extension line may be formed at 60 degrees corresponding to the antenna beam width, but are not limited thereto. Therefore, the first width W1 of the first metal sheet 511 may be set to correspond to an angle from an outer point of the mmWave patch antenna to an outer region of the radiation beam.

Alternatively, the first metal sheet 511 may be disposed such that a second extension line formed at a predetermined angle with respect to the first extension line intersects the first metal sheet 511. Therefore, the first width W1 and the position of the other end portion of the first metal sheet 511 may be determined such that the second extension line corresponds to the other end portion of the first metal sheet 511 or intersects the first metal sheet 511. Accordingly, a width of the first metal sheet 511 may be set to correspond to an angle up to the outer region of the radiation beam or may be set to a region wider than the corresponding angle.

Meanwhile, the first length L1 of the first metal sheet 511 may be determined to be longer than the length of the radiation region of the substrate on which the plurality of antenna elements are disposed. Accordingly, the first length L1 of the first metal sheet 511 may be set to a distance from a left outer point to a right outer point of the mmWave patch antenna. Furthermore, a vertical distance between one end portion of the antenna element and the first metal sheet 511 may be determined to be above a minimum separation distance. For an example, the minimum separation distance between one end portion of the antenna element and the first metal sheet 511 may be determined to be 0.1 mm or more. Meanwhile, a maximum separation distance between one end portion of the antenna element and the first metal sheet 511 may be determined such that the other end portion of the antenna element is not covered by the metal rim 202a.

Referring to FIG. 15C, one end portion of each antenna element of the antenna module ANT 1100 may be configured to substantially correspond to an end portion of the first metal sheet 511. In this regard, a line corresponding to the end portion of the first metal sheet 511 may be defined as a first line LN1. In this case, a region where the metal sheet 510 is disposed on a left side of the first line LN1 may be defined as the first region RG1. Meanwhile, a line connecting the other end portion of the antenna element may be defined as a second line LN2. In this case, a region where the antenna element is disposed on a left side of the second line LN2 may be defined as a second region RG2. In addition, a region corresponding to a right side of the second line LN2 may be defined as a third region RG3. Referring to FIGS. 15A to 15C, the first region RG1 may correspond to the planar portion 501a of the cover 501. The third region RG2 may correspond to the bending portion 501b of the cover 501. Meanwhile, a partial region of the second region RG2 may correspond to the planar portion 501a and the remaining region may correspond to the bending portion 501b.

With regard to a layer on which the metal sheet 510 is disposed, the metal sheet 510 may be disposed inside the cover 501 in various arrangements. The metal sheet 510 may be disposed in an upper or lower region of a rear case inside the cover 501. Alternatively, the metal sheet 510 may be disposed in a lower region of the cover 501. In this case, the cover 501 may correspond to the rear case.

Figure 15D:
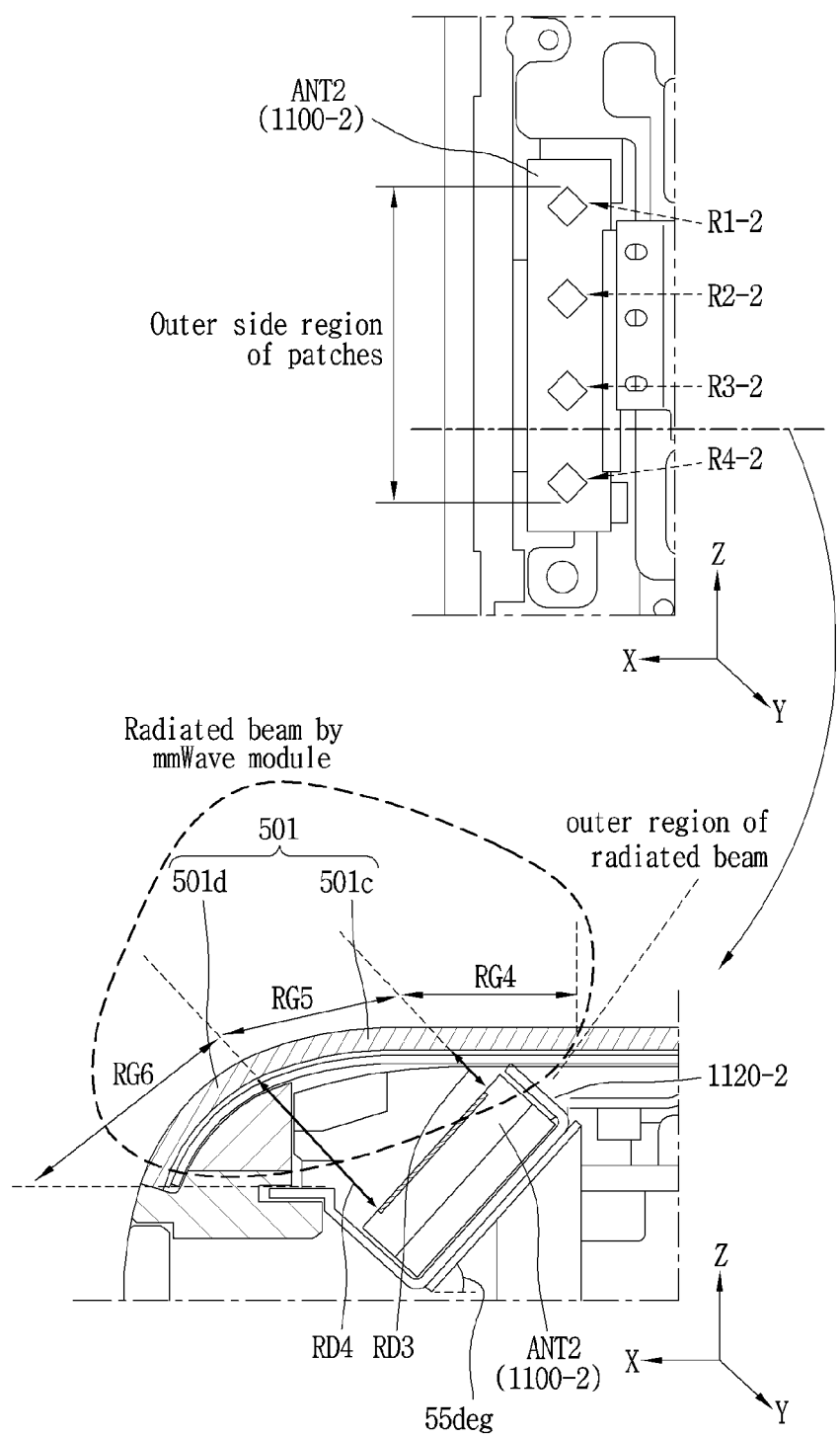
FIGS. 15D and 15E show configurations disposed at different tilt angles on different sides of a mobile terminal according to an embodiment.
Figure 15E:
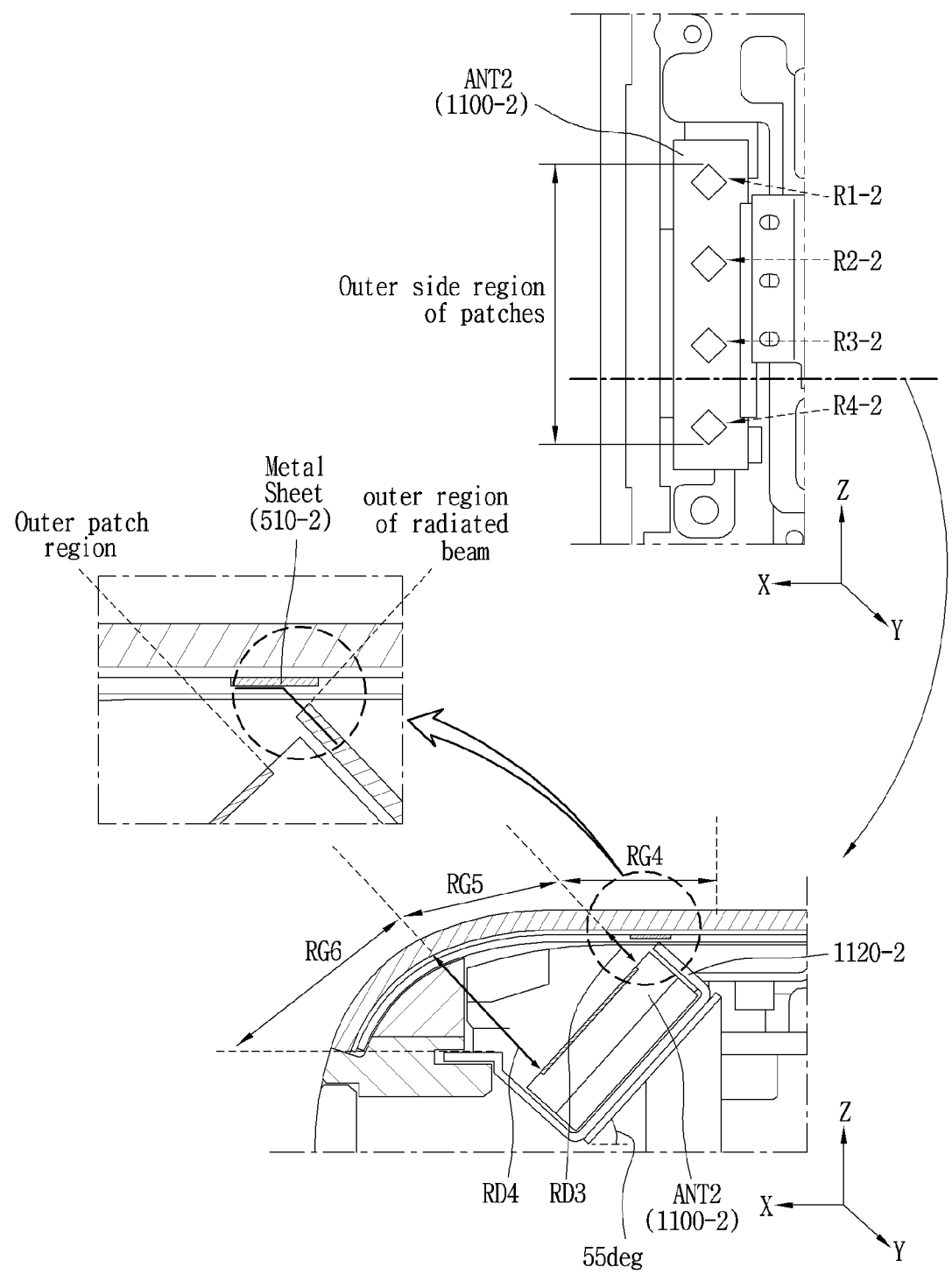

Meanwhile, the antenna modules disclosed herein may be disposed on different side surfaces of the mobile terminal as shown in FIGS. 13A and 13B. In this regard, FIGS. 15D and 15E show configurations disposed at different tilt angles on different sides of a mobile terminal according to an embodiment. Accordingly, FIGS. 15A and 15B show a configuration in which a first antenna module ANT1 1100 is disposed at a first tilt angle in a first side edge portion of a mobile terminal. Meanwhile, FIGS. 15D and 15E show a configuration in which a second antenna module ANT2 1100-2 is disposed at a second tilt angle in a second side edge portion of the mobile terminal.

Referring to FIGS. 2B to 2D and 14A to 15E, a mobile terminal having a plurality of antenna modules according to another aspect of the present disclosure is disclosed. The mobile terminal may include a housing, a rear cover 501, a reflection sheet 510, a first antenna module ANT1 1100, and a second antenna module ANT2 1100-2. In addition, the mobile terminal may further include a first antenna frame 1120 and a second antenna frame 1120-2. Meanwhile, a second reflection sheet 510-2 may be provided to reflect a beamforming radio signal from the second antenna module ANT2 1100-2. In this case, the reflection sheet may be referred to as a first reflection sheet 510.

The mobile terminal may have a front surface, a rear surface, and side surfaces, and the housing 210, 310, 501 may have a front side, a rear side, and lateral sides. The housing 501 may include a metal rim 202a formed of a metal material and at least one bending portion 501b formed of a non-metal material. In addition, the housing 210, 310, 501 may be configured with both rear and front surfaces of the mobile terminal. In this case, the housing may include a metal rim 202a, 310 formed of a metal material and bending portions 340, 350 formed of a non-metal material. Meanwhile, a lateral side of the housing may include two short sides 2101, 2103 and two long sides 2102, 2104 that are longer than the two short sides.

The rear cover 501 may be disposed on a rear side of the housing and may include a planar portion 501a and at least one bending portion 501b that is bent from the planar portion 501a. The first reflection sheet 510 is disposed at a first portion of the cover 501 and may be formed of a metal material. The second reflection sheet 510-2 is disposed at a second portion of the cover 501 and may be formed of a metal material.

The first antenna module ANT 1100 may be disposed between a rear side of the housing and a first side edge portion of the front cover (second cover), and configured to radiate a first beamforming radio signal. The front cover (second cover) may be configured with the display 151. The second antenna module ANT2 1100-2 may be disposed between a rear side of the housing and a second side edge portion of the front cover (second cover), and configured to radiate a second beamforming radio signal.

The first antenna module ANT 1100 may include an insulating member, an electronic component disposed on a surface of the insulating member, and antenna patterns R1 to R4 disposed on the other surface of the insulating member. Furthermore, the second antenna module ANT-2 1100-2 may include an insulating electronic element and antenna patterns R1-2 to R4-2. Here, the insulating member corresponds to a substrate on which the antenna patterns R1 to R4 and R1-2 to R4-2 are disposed.

The antenna module ANT 1100 may be configured to be tilted from a portion of the rear side of the housing. In addition, the second antenna module ANT-2 1100-2 may be configured to be tilted at another portion of the rear side of the housing. In this regard, a first tilting angle of the first antenna module ANT 1100 may be configured to be different from a second tilting angle of the second antenna module ANT-2 1100-2. The first tilting angle of the first antenna module ANT 1100 may be set to an angle greater than the second tilting angle of the second antenna module ANT-2 1100-2. For an example, the first tilt angle of the first antenna module ANT 1100 may be set to 18 degrees, and the second tilt angle of the second antenna module ANT-2 1100-2 may be set to 55 degrees, but the present disclosure may not be limited thereto. For another example, the first tilting angle may be set to an angle of 20 degrees or less or 30 degrees or less. The second tilting angle may be set to an angle of 40 degrees or more, 45 degrees or more, or 50 degrees or more. Meanwhile, when the second reflection sheet 510-2 is disposed in a region where the second antenna modules ANT-2 and 1100-2 are disposed, a second beamforming radio signal may be formed in a side region more than that of the first beamforming radio signal.

The first antenna frame 1120 that supports the first antenna module ANT 1100 may be formed of a metal material. The second antenna frame 1120-2 that supports the second antenna modules ANT2 1100-2 may be formed of a metal material. Meanwhile, the first and second antenna modules 1100, 1100-2 mounted on the first and second antenna frames 1120, 1120-2 may be configured to radiate beamforming radio signals. In this case, the first antenna module ANT 1100 may be configured to radiate the first beamforming radio signal, and the second antenna module ANT2 1100-2 may be configured to radiate the second beamforming radio signal.

The first antenna frame 1120 may be configured to transmit heat from the first antenna module ANT 1100 to the housing. The second antenna frame 1120-2 may be configured to transmit heat from the second antenna module ANT2 1100-2 to the housing.

Meanwhile, the exterior of a first side of the mobile terminal may be defined by a first bending portion 501b of the cover 501 and a first side surface portion of the housing. The exterior of a second side of the mobile terminal may be defined by a second bending portion 501d of the cover 501 and a second side surface portion of the housing.

Part of the bending portion 501b of the cover 501 and part of the planar portion 501a of the cover 501 may include a first region RG1, a second region RG2, and a third region RG3. The second region RG2 may face the first antenna patterns R1 to R4, and the third region RG3 may be connected to a portion of the second region RG2 adjacent to the first side surface portion of the housing. The first region RG1 may be connected to another portion of the second region RG2 opposite to the third region RG3. Meanwhile, the first reflection sheet 510 may be disposed on the first region RG1 of the cover 501, and the beamforming radio signal of the first region RG1 may be reflected to the second region (RG2) and the third region (RG3) by the first reflection sheet 510.

Part of the bending portion 501d of the cover 501 and part of the planar portion 501a of the cover 501 may include a fourth region RG4, a fifth region RG5, and a sixth region RG6. The fourth region RG4 may face the second antenna patterns R1-2 to R4-2, and the sixth region RG6 may be connected to a portion of the fifth region RG5 adjacent to the second side surface portion of the housing. The fourth region RG4 may be connected to another portion of the fifth region RG5 opposite to the sixth region RG6. Meanwhile, the second reflection sheet 510-2 may be disposed on the fourth region RG4 of the cover 501, and the beamforming radio signal of the fourth region RG4 may be reflected to the fifth region RG5 and the sixth region RG6 by the second reflection sheet 510-2.

Figure 16A:
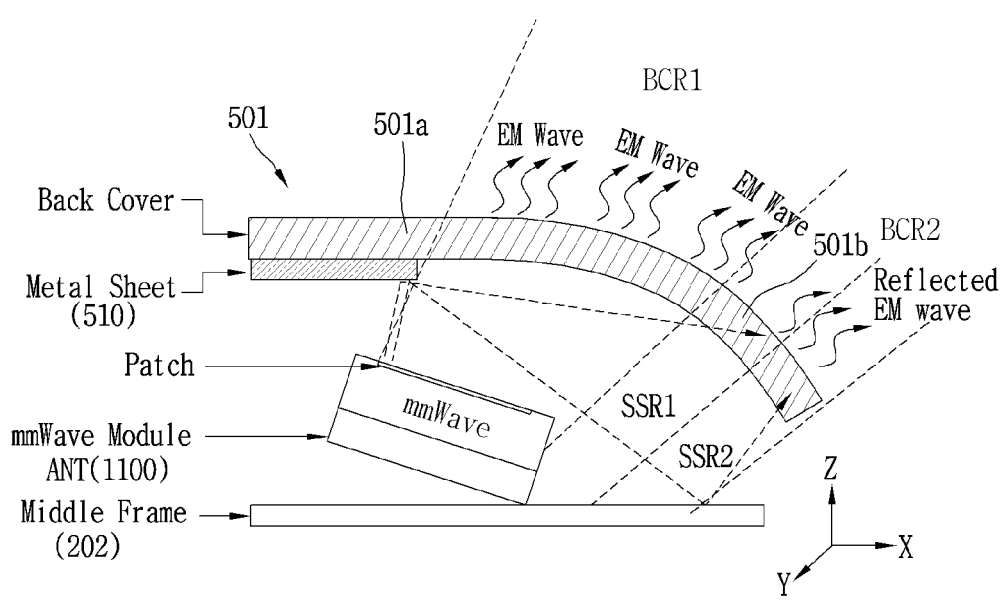
FIG. 16A shows a configuration in which electromagnetic waves emitted from an antenna element are reflected by a metal sheet and a metal frame. Meanwhile.
Figure 16B:
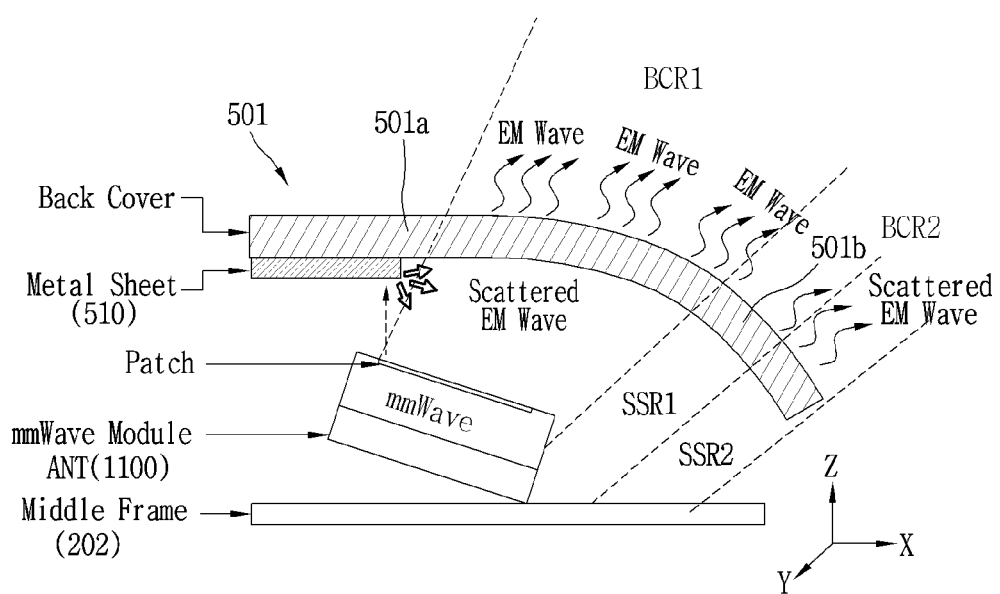
FIG. 16B shows a configuration in which electromagnetic waves radiated from an antenna element by a metal sheet are scattered by the metal sheet.

Meanwhile, electromagnetic waves emitted from the antenna element may be reflected and scattered by the metal sheet 501 disclosed herein. In this regard, FIG. 16A shows a configuration in which electromagnetic waves emitted from an antenna element are reflected by a metal sheet and a metal frame. Meanwhile, FIG. 16B shows a configuration in which electromagnetic waves radiated from an antenna element by a metal sheet are scattered by the metal sheet.

Referring to FIG. 16A, an electromagnetic (EM) waves emitted from the antenna module ANT 1100 may be radiated to the outside mainly through the planar portion 501a of the cover 501. Part of the electromagnetic waves emitted from the antenna module ANT 1100 may also be radiated to the outside through the bending portion 501b. However, electromagnetic (EM waves emitted from the antenna module ANT 1100 are hardly radiated through the side region.

In order to overcome such a beam coverage limitation, referring to FIG. 16A, the metal sheet 510 may be attached to a specific position of the cover 501 with a predetermined length and width. In addition, beam coverage may be further extended through the metal region of the frame 202. In this regard, a first signal reflected by the metal sheet 510 attached to the cover 501 is radiated to the outside through a first side surface region SSR1 of the cover 501. Meanwhile, a second signal reflected by the metal sheet 510 and the frame 202 is radiated to the outside through the second side surface region SSR2.

Meanwhile, a beam coverage region by the antenna module 1100 may include a first coverage region BCR1 and a second coverage region BCR2. The first coverage region BCR1 is a region where a beam of the antenna module 1100 is radiated to the planar portion 501a of the cover 501. The second coverage region BCR2 may be a region where the beam of the antenna module ANT 1100 is reflected from the metal sheet 510 and the frame 202 and radiated to a bending portion of the cover 501. In this regard, the second coverage region BCR2 may include the first side surface region SSR1 and the second side surface region SSR2, but the present disclosure is not limited thereto.

Referring to FIGS. 14A, 14B, and 16A, a predetermined slant angle at which the antenna module ANT 1100 is tilted may be determined to be below a threshold angle so as not to be blocked by the metal rim. In this regard, the predetermined slant angle at which the antenna module 1100 is tilted may be set to 30 degrees or 20 degrees or less, which is a threshold angle. For an example, the predetermined slant angle at which the antenna module 1100 is tilted may be set to 18 degrees. Therefore, the predetermined slant angle at which the antenna module 1100 is tilted may be set to be below a threshold angle so as not to block a beam reflected from the metal sheet 510 and the frame 202 and radiated to the bending portion 501b of the cover 501 by the metal rim.

Referring to FIGS. 11B and 15B to 16A, a first signal emitted from the antenna element and reflected by the metal sheet 510 may be radiated through the first side surface region SSR1 of the cover 501. In addition, a second signal emitted from the antenna element and reflected by the metal sheet 510 and the frame 202 may be radiated through the second side surface region SSR2 of the cover 501. In this regard, the second side surface region SSR2 may be disposed closer to the metal rim of the electronic device than the first side region SSR1.

The cover 501 that radiates electromagnetic waves to the outside is a cover glass corresponding to the rear case. In addition, a case corresponding to the metal frame 200 may be a middle case disposed between the rear case and the front case of the electronic device. The middle case may be provided with a metal frame, but may also be a frame in which only a partial region thereof is configured with a metal region. Accordingly, at least a partial region of the middle case may be configured with a metal region to reflect a signal reflected or scattered by the metal sheet 510.

In addition, referring to FIGS. 11B and 15B to 16B, a signal emitted from the antenna element and scattered by the metal sheet 510 may be radiated through a side surface region, in particular, the first side surface region SSR1 and the second side surface region SSR2. In this regard, referring to (b) of FIG. 16B, in the electric field scattered by the metal sheet 510, a horizontal component thereof is dominant compared to a vertical component thereof. Therefore, as shown in (a) of FIG. 16B, the antenna beam component scattered by the metal sheet 510 and radiated to the side surface region of the cover 501 increases.

Figure 17A:
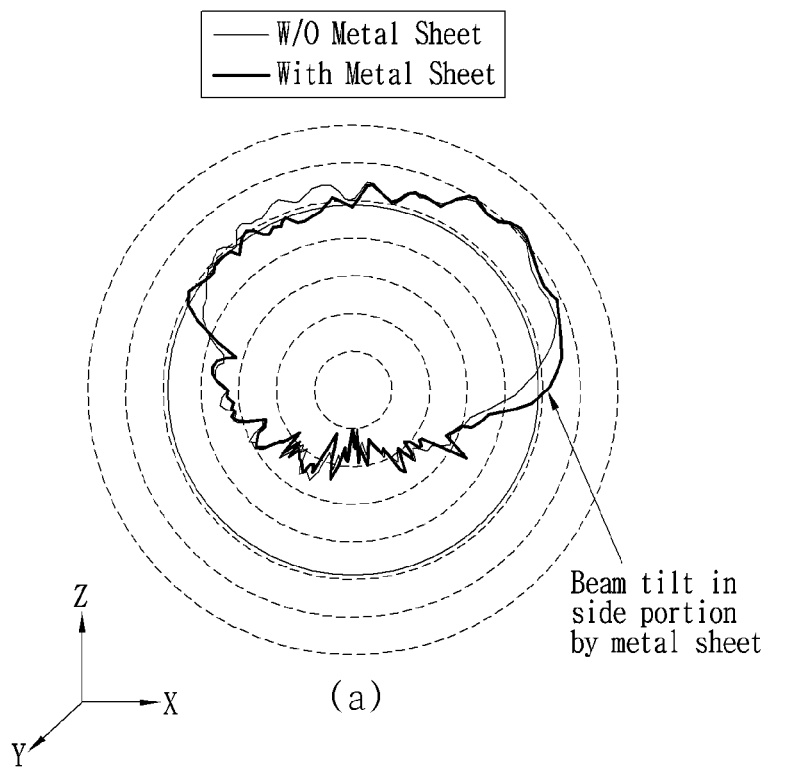
FIGS. 17A and 17B show a radiation pattern of an antenna module tilted at a predetermined angle and a radiation pattern by a plurality of antenna modules radiating to both sides and a rear surface of an electronic device.
Figure 17A:
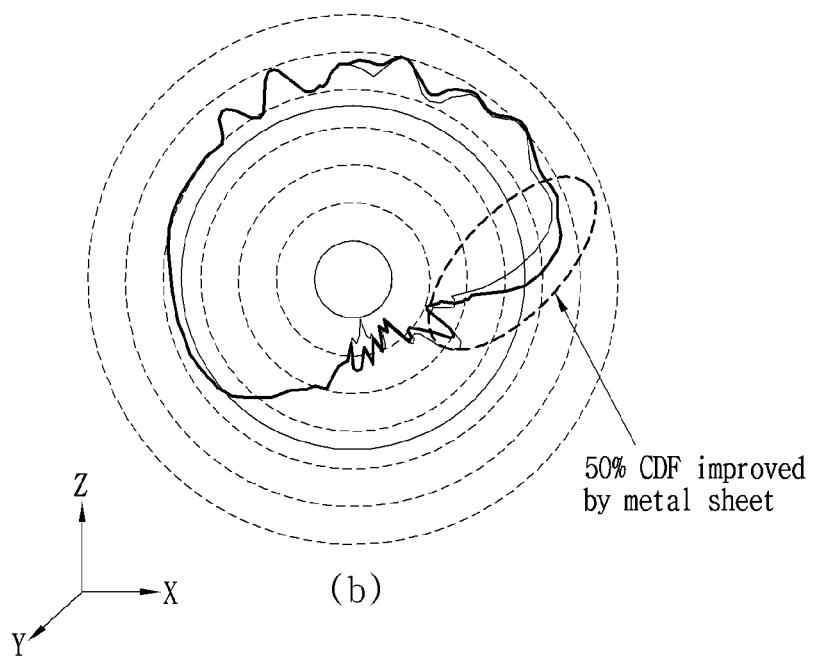
Figure 17B:
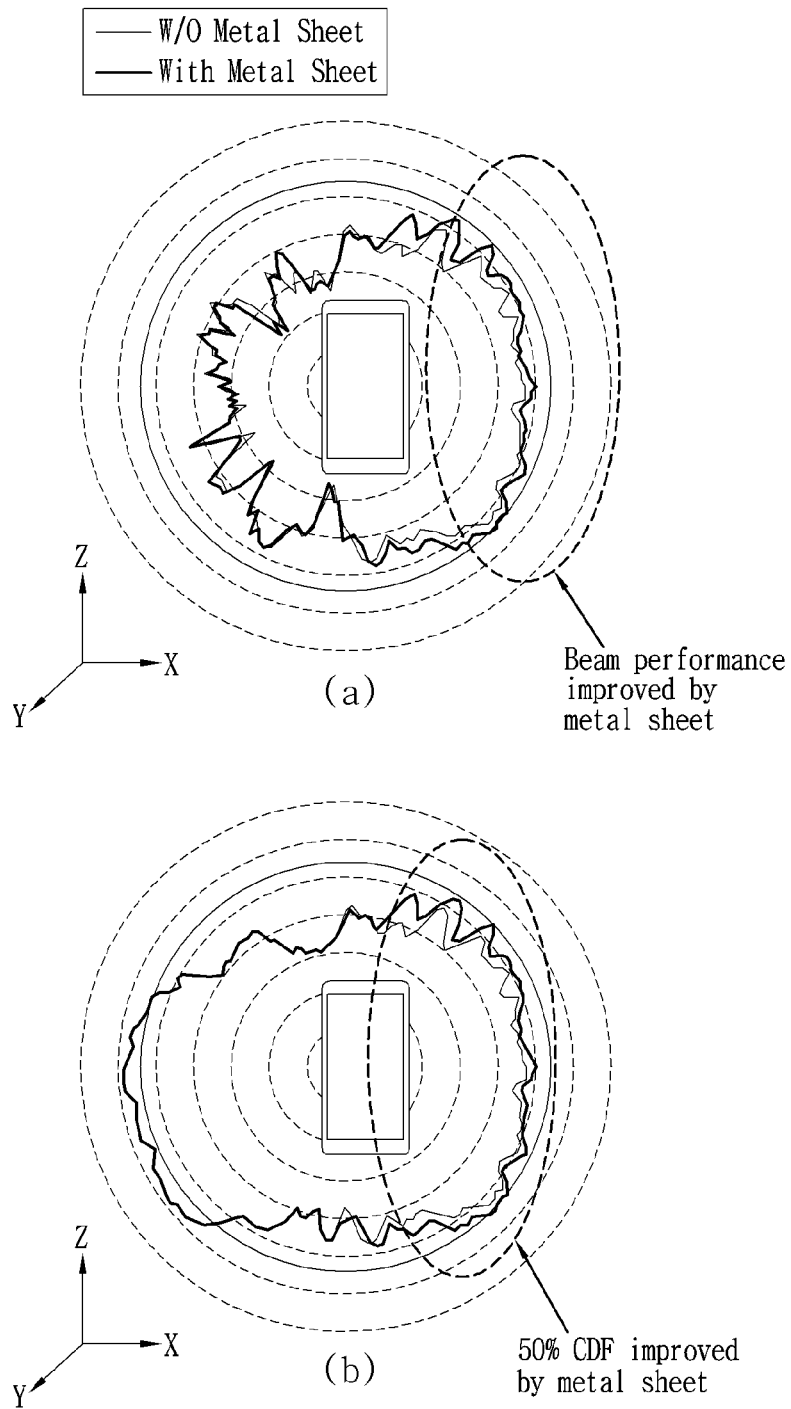

On the other hand, FIGS. 17A and 17B show a radiation pattern of an antenna module tilted at a predetermined angle and a radiation pattern by a plurality of antenna modules radiating to both sides and a rear surface of an electronic device.

FIG. 17A shows a radiation pattern in a vertical direction in a side surface region of an electronic device. That is, FIG. 17A shows a radiation pattern in an x-z plane corresponding to the vertical direction. On the contrary, FIG. 17B shows a radiation pattern in a horizontal direction in the side surface region of the electronic device. That is, FIG. 17B shows a radiation pattern in an x-y plane corresponding to the horizontal direction.

Referring to FIGS. 7, 15B to 16B, and (a) of FIG. 17A, a beam pattern of a second antenna module ARRAY2 disposed on a side surface has a radiation component that increases in a vertical direction in a side surface region by the metal sheet 510. Therefore, the radiation component in a lateral direction is increased by the metal sheet 510 to further tilt the beam in the lateral direction than in the case without having the metal sheet.

Referring to FIGS. 7, 15B to 16B, and (b) of FIG. 17A, a beam pattern by the first to third antenna modules ARRAY1 to ARRAY3 is formed in rear and lateral directions. A beam pattern of the second antenna module ARRAY2 has a radiation component that increases in a lateral direction by the metal sheet 510. Therefore, the radiation component in a lateral direction is increased by the metal sheet 510 to further tilt the beam in the lateral direction than in the case without having the metal sheet. Accordingly, the 50% CDF characteristics may be improved by a vertical beam pattern of the side region of the second antenna module ARRAY2 on which the metal sheet 510 is disposed.

Meanwhile, compared to the first antenna module ARRAY1 vertically disposed in a side surface region, a beam pattern of the second antenna module ARRAY2 has a smaller radiation component from a lateral direction to a front direction. However, a front direction of the electronic device is a direction in which the display is disposed, and CDF characteristics do not need to be greatly improved in the front direction.

Referring to FIGS. 7, 15B to 16B, and (a) of FIG. 17B, a beam pattern of a second antenna module ARRAY2 disposed on a side surface has a radiation component that increases in a horizontal direction in a side surface region by the metal sheet 510. Therefore, the radiation component in a lateral direction is increased by the metal sheet 510 to further tilt the beam in the lateral direction than in the case without having the metal sheet.

Referring to FIGS. 7, 15B to 16B, and (b) of FIG. 17B, a beam pattern by the first to third antenna modules ARRAY1 to ARRAY3 is formed in rear and lateral directions. A beam pattern of the second antenna module ARRAY2 has a radiation component that increases in a lateral direction by the metal sheet 510. Therefore, the radiation component in a lateral direction is increased by the metal sheet 510 to further tilt the beam in the lateral direction than in the case without having the metal sheet. Accordingly, the 50% CDF characteristics may be improved by a horizontal beam pattern of the side region of the second antenna module ARRAY2 on which the metal sheet 510 is disposed.

Meanwhile, compared to the first antenna module ARRAY1 vertically disposed in a side surface region, a beam pattern of the second antenna module ARRAY2 has a smaller radiation component from a lateral direction to a front direction. However, a front direction of the electronic device is a direction in which the display is disposed, and CDF characteristics do not need to be greatly improved in the front direction.

Figure 18:
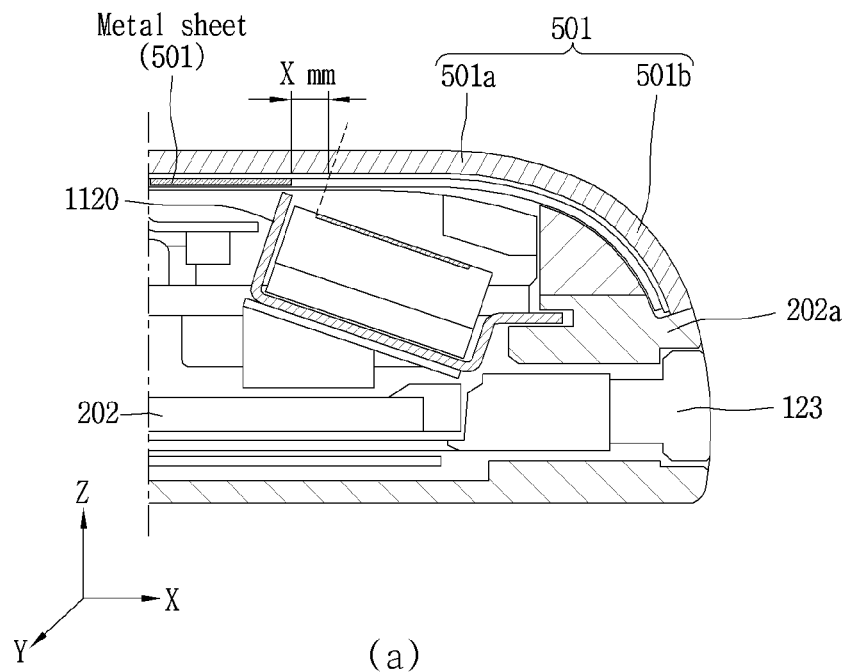
FIG. 18 shows a configuration in which a metal sheet is disposed offset from a patch antenna by a predetermined distance according to another embodiment and antenna characteristics compared according to arrangements thereof.

According to another embodiment, the position of an end portion of the metal sheet 510 may be disposed offset from the patch antenna by a predetermined distance. In this regard, FIG. 18 shows a configuration in which a metal sheet is disposed offset from a patch antenna by a predetermined distance according to another embodiment and antenna characteristics compared according to arrangements thereof. Referring to FIGS. 11B, 15C, and (a) of FIG. 18, the first metal sheet 511 may be disposed such that an extension line formed in a direction perpendicular to the antenna module ANT 1100 from one end portion of the antenna element is spaced apart by a minimum separation distance or more from an end portion of the first metal sheet 511.

In this regard, the metal sheet 510 may be located at a point outside the patch antenna on the x-axis coordinate for an optimal arrangement. However, in view of a slight antenna performance loss, the metal sheet 510 may be disposed to overlap or be spaced apart from the antenna module ANT 1100. However, in order to prevent an antenna blockage phenomenon, the metal sheet 510 cannot be disposed to overlap an entire antenna region of the antenna module ANT 1100 or over a predetermined ratio thereof.

Referring to (a) and (b) of FIG. 18, the metal sheet 510 may be disposed such that an end portion of the metal sheet 510 and the antenna module 1100 are spaced apart by a minimum separation distance or more. The metal sheet 510 may be disposed such that an end portion of the metal sheet 510 is spaced apart from an antenna end portion of the antenna module ANT 1100 in a range between 0.0 mm and 1.0 mm. In this case, there is no significant change in peak effective isotropic radiated power (EIRP) in the corresponding separation range. Meanwhile, the deviation of 50% EIRP is only about 0.02 dB in the corresponding separation range. In this regard, this is because an electric field value near the boundary of each antenna element is greater than that near the center, and a radiation component due to a fringing field is present from the vicinity of the boundary to an outer region. On the contrary, when an end portion of the metal sheet 510 overlap an antenna end portion of the antenna module ANT 1100, the 50% EIRP decreases more significantly than when they are spaced apart from each other. Therefore, the metal sheet 510 may be disposed such that an end portion of the metal sheet 510 is spaced apart from an antenna end portion of the antenna module ANT 1100 in a range between 0.0 mm and 1.0 mm, and the resultant deviation of 50% EIRP is very small.

Figure 19:
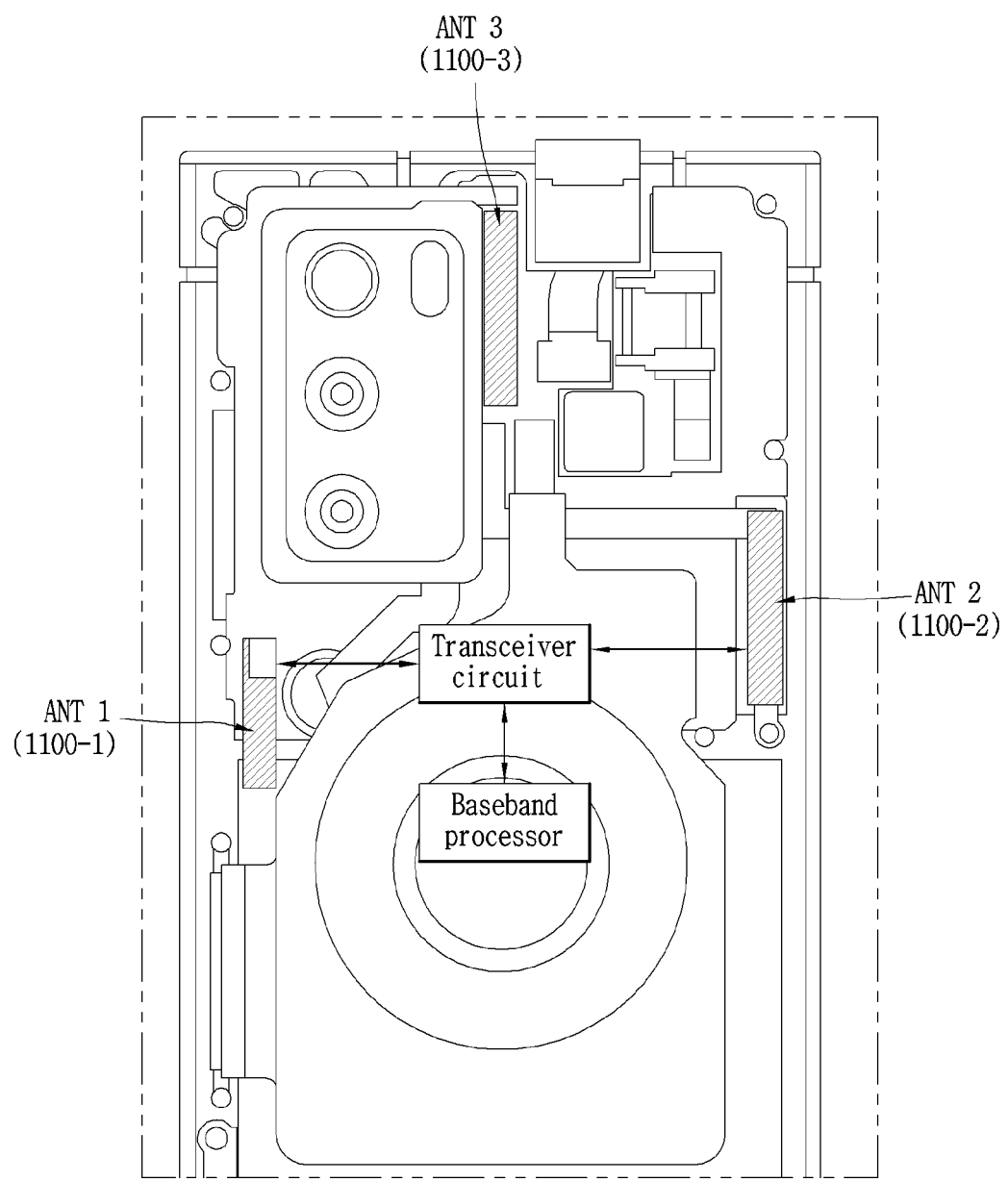
FIG. 19 shows a configuration having different array antenna modules and a configuration of controlling them according to an embodiment.

Meanwhile, in addition to the antenna module disposed on a side surface of the electronic device disclosed herein and configured to interact with the metal sheet and the frame, a plurality of antenna modules may be disposed on different side and rear regions of the electronic device as shown in FIG. 7. In this regard, FIG. 19 shows a configuration having different array antenna modules and a configuration of controlling them according to an embodiment.

Referring to FIGS. 7 to 19, the electronic device may include a first antenna module ANT1 1100-1 and a second antenna module ANT2 1100-2 disposed on different side surfaces of the electronic device. In this regard, the aforementioned antenna module ANT 1100 may be the second antenna module ANT2 1100-2. Meanwhile, the electronic device may further include a third antenna module ANT3 1100-3 disposed inside the electronic device to radiate a signal through a rear surface of the electronic device.

The first antenna module ANT1 1100-1 may be configured to radiate a first signal through the other side surface of the electronic device. On the other hand, the second antenna module ANT2 1100-2 may be configured to radiate a second signal through one side surface of the electronic device, and may be disposed in a shape inclined at a predetermined angle. In other words, the first antenna module ANT1 1100-1 may be disposed perpendicular to a baseline of the electronic device, and the second antenna module ANT2 1100-2 may be disposed to be inclined at a predetermined slant angle with respect to the baseline of the electronic device. In this case, a lower end portion of the vertically disposed first antenna module ANT1 1100-1 may be disposed higher than an upper end portion of the metal rim of the electronic device. Accordingly, a signal radiated through the first antenna module ANT1 1100-1 may not be blocked by the metal rim 202a. Meanwhile, a signal radiated from the second antenna module ANT2 1100-2 and reflected by the metal sheet 510 and/or the frame 202 may be radiated through a side region of the cover 501 to extend beam coverage.

According to another embodiment, the first antenna module ANT1 1100-1 may also be disposed in a shape inclined at a predetermined angle. For an example, the first antenna module ANT1 1100-1 may be disposed at a first slant angle with respect to a baseline of the electronic device, and the second antenna module ANT2 1100-2 may be disposed to be inclined at a second slant angle with respect to the baseline of the electronic device. In this regard, the second slant angle may be set to a value smaller than the first slant angle, and an inclination of the mounting frame of the second antenna module ANT2 1100-2 may be configured to be smaller than that of the first antenna module ANT1 1100-1. Accordingly, the second slant angle may be set to a value of 30 degrees or 20 degrees or less, and the first slant angle may be set to a value between 30 degrees or more and 90 degrees or a value between 45 degrees or more and 90 degrees. For an example, as described above, the second slant angle may be set to 18 degrees and the first slant angle may be set to 55 degrees. For another example, the first antenna module ANT1 1100-1 may be defined in a substantially vertical shape.

When the first slant angle of the first antenna module ANT1 1100-1 is set to 45 degrees or less, a metal sheet may also be disposed in a cover region where the first antenna module ANT1 1100-1 is disposed. In this regard, a first type metal sheet corresponding to the first antenna module ANT1 1100-1 may be configured to have a different shape and dimension from a second type metal sheet corresponding to the second antenna module ANT2 1100-2. Since the first slant angle is greater than the second slant angle, a width of the first type metal sheet may be disposed to be narrower than that of the second type metal sheet. On the contrary, when the first slant angle of the first antenna module ANT1 1100-1 is set to 45 degrees or more or 55 degrees or more, a metal sheet may not be disposed in a cover region where the first antenna module ANT1 1100-1 is disposed.

The electronic device may further include an antenna module 1100, a transceiver circuit 1250, and a baseband processor 1400. In this regard, the baseband processor 1400 may be a modem, but is not limited thereto and may be any processor that controls the transceiver circuit 1250.

The transceiver circuit 1250 may be operably coupled to the first antenna module ANT1 1100-1 and the second antenna module ANT2 1100-2. The transceiver circuit 1250 may be configured to transmit or receive a first signal through the first antenna module ANT1 1100-1 and a second signal through the second antenna module ANT2 1100-2. The baseband processor 1400 may be operatively coupled to the transceiver circuit 1250. The baseband processor 1400 may be configured to perform multi-input multi-output (MIMO) through the first signal and the second signal transmitted or received through the transceiver circuit 1250.

Meanwhile, the third antenna module ANT3 1100-3 may be spaced apart from the first antenna module ANT1 1100-1 or the second antenna module ANT2 1100-2 by a predetermined distance. The third antenna module ANT3 1100-3 may be configured to radiate a third signal through a rear surface of the electronic device. The baseband processor 1400 may control the transceiver circuit 1250 to perform multi-input multi-output (MIMO) through the second signal transmitted or received through the second antenna module ANT2 1100-2 and the third signal transmitted or received through the third antenna module ANT3 1100-3.

Meanwhile, the electronic device may maintain a dual connectivity state with an eNB and a gNB by using the plurality of antenna modules disclosed herein. Alternatively, MIMO may be performed with a first communication system or a second communication system by using a plurality of antenna modules. In this regard, one of a plurality of antennas performing MIMO with the first communication system or the second communication system may be referred to as a first antenna module, and another one may be referred to as a second antenna module.

In this regard, antennas disposed in the metal rim of FIG. 7 operating in an LTE/5G sub-6 band may be referred to as a first antenna module and a second antenna module, respectively. For another example, an antenna operating in the LTE/5G sub-6 band and an array antenna module operating in the mmWave band may be referred to as a first antenna module and a second antenna module, respectively. For still another example, different array antenna modules operating in the mmWave band may be referred to as a first antenna module and a second antenna module, respectively.

Referring to FIG. 19, the electronic device may further include a transceiver circuit 1250 and a baseband processor 1400. The transceiver circuit 1250 may be operably coupled to the first antenna module and the second antenna module. The transceiver circuit 1200 may be configured to control the first antenna module and the second antenna module. In this regard, the transceiver circuit 1200 may turn on/off signals applied to the first antenna module and the second antenna module, or control a signal magnitude.

The baseband processor 1400 corresponding to a modem may be operably coupled to the transceiver circuit 1250. The baseband processor 1400 may be configured to perform MIMO through a first antenna module and a second antenna module.

In this regard, the baseband processor 1400 may control the transceiver circuit 1250 to perform UL-MIMO by transmitting a first signal and a second signal. Also, the baseband processor 1400 may control the transceiver circuit 1250 to perform DL-MIMO by receiving the first signal and the second signal.

When the quality of a signal received through the first antenna module or the second antenna module is lower than or equal to a threshold value, the corresponding antenna module may be switched to another connectivity. For example, when the quality of a signal received through the first antenna module or the second antenna module is lower than or equal to a threshold value, the corresponding antenna module may be switched to another communication system, namely, switching between 4G and 5G communication systems may be performed.

In this regard, when the first signal received through the first antenna module is lower than or equal to the threshold value, the baseband processor 1400 may release a MIMO mode and switch to the dual connectivity state. The baseband processor 1400 may control the transceiver circuit 1250 to switch to the dual connectivity state through the first antenna module and the second antenna module.

In this regard, when 5G MIMO is performed through the first antenna module and the second antenna module, switching to the 4G communication system through the first antenna module may be made. Thus, the electronic device may switch to the EN-DC state. Meanwhile, when 4G MIMO is performed through the first antenna module and the second antenna module, switching to the 5G communication system through the first antenna module may be made. Thus, the electronic device may switch to the EN-DC state.

As another example, the baseband processor 1400 may release the MIMO mode and switch to a dual connectivity state when the second signal received through the second antenna module is lower than or equal to the threshold value. The baseband processor 1400 may control the transceiver circuit 1250 to switch to the dual connectivity state through the first antenna module and the second antenna module.

In this regard, when 5G MIMO is performed through the first antenna module and the second antenna module, switching to the 4G communication system through the second antenna module may be made. Thus, the electronic device may switch to the EN-DC state. Meanwhile, when 4G MIMO is performed through the first antenna module and the second antenna module, switching to the 5G communication system through the second antenna module may be made. Thus, the electronic device may switch to the EN-DC state.

As described above, the electronic device may operate in the EN-DC state of maintaining a connectivity state with both the 4G communication system and the 5G communication system. In this regard, the first antenna module and the second antenna module may be configured to operate in the first communication system and the second communication system, respectively. Here, the first and second communication systems may be a 4G communication system and a 5G communication system, but the present disclosure is not limited thereto.

On the other hand, when quality of a signal received through an antenna module in the EN-DC state is less than or equal to a threshold value, the baseband processor 1400 may control the transceiver circuit to receive a signal of another communication system through the antenna module. In this regard, the baseband processor 1400 may determine whether the quality of the first signal of the first communication system received through the first antenna module is lower than or equal to the threshold value. When the quality of the first signal is lower than or equal to the threshold value, the baseband processor 1400 may control the transceiver circuit 1250 to receive the second signal of the second communication system through the first antenna module.

In this regard, when the first communication system and the second communication system use the same band, an operating frequency of the transceiver circuit 1250 may be set to be the same, and only magnitude and phase of a signal may be controlled. On the other hand, when the first communication system and the second communication system use different bands, the magnitude and phase of the signal may be controlled while changing the operating frequency of the transceiver circuit 1250.

As another example, the baseband processor 1400 may determine whether the quality of the second signal of the second communication system received through the second antenna module is lower than or equal to the threshold value. When the quality of the second signal is lower than or equal to the threshold value, the baseband processor 1400 may control the transceiver circuit 1250 to receive the first signal of the first communication system through the second antenna module.

In this regard, when the first communication system and the second communication system use the same band, an operating frequency of the transceiver circuit 1250 may be set to be the same, and only magnitude and phase of a signal may be controlled. On the other hand, when the first communication system and the second communication system use different bands, the magnitude and phase of the signal may be controlled while changing the operating frequency of the transceiver circuit 1250.

Meanwhile, the electronic device may be allocated with time/frequency resources for MIMO or EN-DC from a base station. In this regard, the baseband processor 1400 may determine whether a resource including a specific time section and a frequency band is allocated as a DL-MIMO resource through blind decoding for a PDCCH region and a corresponding resource region. The baseband processor 1400 may control the transceiver circuit 1250 to receive the first signal through the first antenna module and the second signal through the second antenna module in the allocated specific resource.

In this regard, the first signal of the first communication system and the second signal of the second communication system may be received through the first antenna module and the second antenna module, respectively, thereby switching to the EN-DC state or maintaining the current state. Alternatively, 4G DL MIMO may be performed by receiving the first signal and the second signal of the 4G communication system through the first antenna module and the second antenna module. Alternatively, 5G DL MIMO may be performed by receiving the first signal and the second signal of the 5G communication system through the first antenna module and the second antenna module.

As another example, the first signal of the first communication system and the second signal of the second communication system may be transmitted through the first antenna module and the second antenna module, respectively, thereby switching to the EN-DC state or maintaining the current state. Alternatively, 4G UL MIMO may be performed by transmitting the first signal and the second signal of the 4G communication system through the first antenna module and the second antenna module. Alternatively, 5G UL MIMO may be performed by transmitting the first signal and the second signal of the 5G communication system through the first antenna module and the second antenna module.

A dual connectivity state may be specified such that the electronic device is operated in an EN-DC, NGEN-DC, or NR-DC configuration as illustrated in FIG. 1C. EN-DC or NGEN-DC band combinations may include at least one E-UTRA operating band. Specifically, operating bands for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

A UE channel bandwidth for EN-DC may be defined. In this regard, a UE channel bandwidth for intra-band EN-DC in FR1 may be defined. Channel arrangements for DC may be defined. In this regard, channel spacing for intra-band EN-DC carriers may be defined.

The configuration for EN-DC may be defined. Specifically, configurations for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

As an example, UL EN-DC configuration may be defined for 2, 3, 4, 5, or 6 bands in FR1. In this regard, the UL EN-DC configuration for 2, 3, 4, 5, or 6 bands in FR1 may be made of a combination of EUTRA and NR configurations. This EN-DC, NGEN-DC, or NR-DC configuration may also be defined for downlink (DL) as well as uplink (UL).

Transmitter power may be defined in relation to EN-DC. UE maximum output power and UE maximum output power reduction may be defined for each configuration of the above-described EN-DCs. UE additional maximum output power reduction may be defined in relation to EN-DC. Configured output power for EN-DC and configured output power for NR-DC may be defined.

The foregoing description has been given of the electronic device which is provided with a plurality of transceivers and antennas to perform MIMO and/or CA operations. In this regard, the electronic device performing the MIMO and/or CA operations may operate as a DC-EN configuration so as to be in the EN-DC state with the eNB and gNB. Hereinafter, description will be given of a wireless communication system including an electronic device and a base station performing such MIMO and/or CA operations. In this regard, FIG. 20 illustrates a block diagram of a wireless communication system that is applicable to methods proposed herein.

Figure 20:
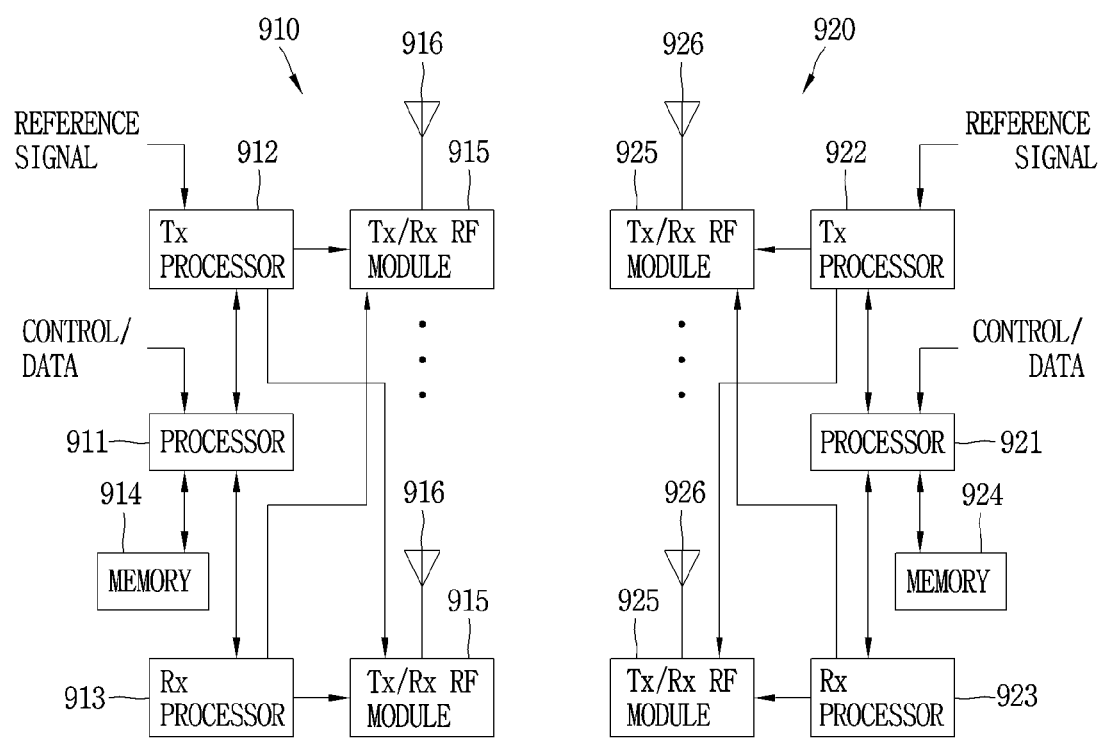
FIG. 20 illustrates a block diagram of a wireless communication system that is applicable to methods proposed herein.

Referring to FIG. 20, the wireless communication system includes a first communication device 910 and/or a second communication device 920. "A and/or B" may be interpreted to denote the same as "comprising at least one of A and B". The first communication device may represent a base station, and the second communication device may represent a terminal (or the first communication device may represent a terminal, and the second communication device may represent a base station).

The base station (BS) may be replaced with a term such as a fixed station, a Node B, an evolved-NodeB (eNB), a Next Generation NodeB (gNB), a base transceiver system (BTS), an access point (AP), or a general NB (gNB), a 5G system, a network, an AI system, a road side unit (RSU), robot or the like. In addition, a terminal may be fixed or mobile, and may include a user equipment (UE), a mobile station (MS), a user terminal (UT), a mobile subscriber station (MSS), a subscriber station (SS), and an advanced mobile (AMS), a wireless terminal (WT), a machine-type communication (MTC) device, a machine-to-machine (M2M) device, a device-to-device (D2D) device, a vehicle, a robot, an AI module or the like.

The first communication device and the second communication device include processors 911, 921, memories 914, 924, one or more Tx/Rx radio frequency modules 915, 925, Tx processors 912, 922, Rx processors 913, 923, and antennas 916, 926. The processor implements functions, processes, and/or methods described above. More specifically, in the DL (communication from a first communication device to a second communication device), an upper layer packet from the core network is provided to the processor 911. The processor implements functions of an L2 layer. In the DL, the processor provides multiplexing, radio resource allocation between a logical channel and a transport channel to the second communication device 920, and is responsible for signaling to the second communication device. A transmit (TX) processor 912 implements various signal processing functions for a L1 layer (i.e., physical layer). The signal processing functions facilitate forward error correction (FEC) in the second communication device, and include coding and interleaving. The encoded and modulated symbols are divided into parallel streams, and each stream is mapped to an OFDM subcarrier, and multiplexed with a reference signal (RS) in a time and/or frequency domain, and combined together using an Inverse Fast Fourier Transform (IFFT) to create a physical channel carrying a time-domain OFDMA symbol stream. An OFDM stream is spatially precoded to produce multiple spatial streams. Each spatial stream may be provided to different antennas 916 through individual Tx/Rx modules (or transceivers 915). Each Tx/Rx module may modulate an RF carrier with each spatial stream for transmission. In the second communication device, each Tx/Rx module (or transceiver) 925 receives a signal through each antenna 926 of each Tx/Rx module. The each Tx/Rx module recovers information modulated onto an RF carrier, and provides it to the receive (RX) processor 923. The RX processor implements various signal processing functions of layer 1. The RX processor may perform spatial processing on the information to recover any spatial streams destined for the second communication device. If multiple spatial streams are directed to the second communication device, they may be combined into a single OFDMA symbol stream by multiple RX processors. The RX processor converts the OFDMA symbol stream from a time domain to a frequency domain using fast Fourier transform (FFT). The frequency domain signal includes an individual OFDMA symbol stream for each subcarrier of the OFDM signal. The symbols and reference signal on each subcarrier are recovered and demodulated by determining the most likely signal placement points transmitted by the first communication device. Such soft decisions may be based on channel estimate values. The soft decisions are decoded and deinterleaved to recover data and control signals originally transmitted by the first communication device on the physical channel. The corresponding data and control signals are provided to the processor 921.

The UL (communication from the second communication device to the first communication device) is processed at the first communication device 910 in a similar manner to that described in connection with a receiver function at the second communication device 920. Each Tx/Rx module 925 receives a signal via each antenna 926. Each Tx/Rx module provides an RF carrier and information to the RX processor 923. The processor 921 may be associated with the memory 924 that stores program codes and data. The memory may be referred to as a computer readable medium.

Meanwhile, technical effects of an electronic device having a plurality of antennas operating according to the present disclosure will be described as follows.

According to the present disclosure, in an antenna structure disposed in a side surface (or side portion) of an electronic device, an antenna structure that minimizes changes in antenna characteristics even when the form factor of the electronic device is changed.

According to the present disclosure, by minimizing the changes in antenna characteristic due to frame rotation in a swivel structure, rotation wireless performance can be maintained at a predetermined level even when a display region is rotated.

According to the present disclosure, in an electronic device having various form factors, electromagnetic waves may be radiated through a side surface of the electronic device.

According to the present disclosure, a metal sheet may be attached to a cover to radiate electromagnetic waves through a side surface of an electronic device so as to radiate a signal to a side surface portion of the electronic device while disposing a mmWave antenna module at a low slant angle.

According to the present disclosure, a mmWave antenna module may be disposed at a low slant angle to avoid interference with a metal structure in a side surface portion of an electronic device while radiating electromagnetic waves through a side surface thereof.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

With regard to the present disclosure described above, the design of an antenna including processors 180, 1250, and 1400 and a controller for controlling the same in an electronic device 180 having a plurality of antennas, and a control method thereof may be implemented as codes readable by a computer on a medium written by a program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). The computer may include the processor 180 of the terminal. Therefore, it should also be understood that the above-described embodiments are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds are therefore intended to be embraced by the appended claims.

The invention claimed is:

1. A mobile terminal having a front surface, a rear surface and side surfaces, the mobile terminal comprising:
    a housing having a front side, a rear side and lateral sides, the housing including a metal rim formed of a metal material and at least one bending portion formed of a non-metal material, and the lateral side of the housing having two short sides and two long sides that are longer than the two short sides;
    a rear cover disposed on the rear side of the housing, the cover having a planar portion and at least one bending portion bent from the planar portion;
    a reflection sheet disposed on the cover and formed of a metal material; and
    an antenna module disposed between a rear side of the housing and a front cover, and configured to radiate a beamforming radio signal,
    wherein the antenna module comprises an insulating member, an electronic element disposed on a surface of the insulating member, and antenna patterns disposed on the other surface of the insulating member,
    wherein the antenna module is tilted from a portion of the rear side of the housing, and a side surface shape of the mobile terminal is defined by the bending portion of the cover and a lateral side of the housing,
    wherein the bending portion of the cover and the planar portion of the cover comprise a first region, a second region, and a third region,
    wherein the second region is disposed to face the antenna patterns, the third region is connected to a portion of the second region adjacent to a side surface portion of the housing, the first region is connected another region of the second region opposite to the third region, and the reflection sheet is disposed on the first region of the cover, and
    wherein the beamforming radio signal of the first region is reflected from the second region and the third region by the reflection sheet.

2. The mobile terminal of claim 1, wherein as the antenna module is tilted, a first edge of a front surface of the antenna module adjacent to the side surface is disposed closer to a rear case than a second edge thereof, and a third edge of a rear surface of the antenna module is configured to be farther from an inside of a front housing than a fourth edge thereof.

3. The mobile terminal of claim 1, wherein the antenna module further comprises a module mounting portion disposed to surround a rear surface and a side surface of the antenna module, and
    wherein the module mounting portion is formed of a metal material to transmit heat generated from the antenna module to the housing formed of a metal material.

4. The mobile terminal of claim 1, wherein an end portion of each antenna element of the antenna module is extended to form a first line and the other end portion of the antenna element is extended to form a second line,
wherein the rear cover comprises:
the first region disposed to correspond to the planar portion in a direction in which the planar portion is disposed from the first line;
the second region disposed to correspond to a region overlapping the antenna element of the antenna module between the first line and the second line; and
the third region corresponding to a side edge of the rear cover from the second line.

5. The mobile terminal of claim 4, wherein the reflection sheet is disposed to be spaced apart from the first line by a distance of 1.0 mm or less in the first region of the rear cover.

6. The mobile terminal of claim 5, wherein the beamforming radio signal radiated from the antenna module is radiated through a second region of the rear cover overlapping the antenna module, and blocked in a first region of the rear cover where the reflection sheet is disposed.

7. The mobile terminal of claim 1, wherein the reflection sheet is configured with a metal sheet formed of metal material, wherein the metal sheet comprises: a first metal sheet configured to have a first length and a first width to reflect beams emitted from a plurality of antenna elements; and
a second metal sheet configured to extend from the first metal sheet and extend into an inner region of the mobile terminal to operate as a heat dissipation sheet that absorbs heat inside the mobile terminal;
wherein the second metal sheet is configured to have a second length and a second width.

8. The mobile terminal of claim 7, wherein the first width and the position of an end portion of the first metal sheet are determined such that an extension line formed in a direction perpendicular to the antenna module from one end portion of the antenna element corresponds to the end portion of the first metal sheet or intersects the first metal sheet.

9. The mobile terminal of claim 7, wherein the first width and the position of an end portion of the first metal sheet are determined such that an extension line formed in a direction perpendicular to the antenna module from one end portion of the antenna element is spaced apart by a minimum separation distance or more from the end portion of the first metal sheet.

10. A mobile terminal having a front surface, a rear surface and side surfaces, the mobile terminal comprising:
a housing having a front side, a rear side and lateral sides, the housing including a metal rim formed of a metal material and at least one bending portion formed of a non-metal material, and the lateral side of the housing having two short sides and two long sides that are longer than the two short sides;
a rear cover disposed on the rear side of the housing, the cover having a planar portion and at least one bending portion bent from the planar portion;
a reflection sheet disposed on the cover and formed of a metal material;
an antenna module disposed between a rear side of the housing and a front cover, and configured to radiate a beamforming radio signal; and
an antenna frame configured to support the antenna module and formed of a metal material,
wherein the antenna module comprises an insulating member, an electronic element disposed on a surface of the insulating member, and antenna patterns disposed on the other surface of the insulating member,
wherein the antenna module is tilted from a portion of the rear side of the housing, and a side surface shape of the mobile terminal is defined by the bending portion of the cover and a lateral side of the housing,
wherein the bending portion of the cover and the planar portion of the cover comprise a first region, a second region, and a third region,
wherein the second region is disposed to face the antenna patterns, the third region is connected to a portion of the second region adjacent to a side surface portion of the housing, the first region is connected another region of the second region opposite to the third region, and the reflection sheet is disposed on the first region of the cover, and
wherein the beamforming radio signal of the first region is reflected from the second region and the third region by the reflection sheet.

11. The mobile terminal of claim 10, wherein as the antenna module is tilted, a first edge of a front surface of the antenna module adjacent to the side surface is disposed closer to a rear case than a second edge thereof, and a third edge of a rear surface of the antenna module is configured to be farther from an inside of a front housing than a fourth edge thereof.

12. The mobile terminal of claim 10, wherein the antenna frame is formed of a metal material to transmit heat generated from the antenna module to the housing formed of a metal material.

13. The mobile terminal of claim 10, wherein an end portion of each antenna element of the antenna module is extended to form a first line and the other end portion of the antenna element is extended to form a second line,
wherein the rear cover comprises:
the first region disposed to correspond to the planar portion in a direction in which the planar portion is disposed from the first line;
the second region disposed to correspond to a region overlapping the antenna element of the antenna module between the first line and the second line; and
the third region corresponding to a side edge of the rear cover from the second line.

14. A mobile terminal having a front surface, a rear surface and side surfaces, the mobile terminal comprising:
a housing having a front side, a rear side and lateral sides, the housing including a metal rim formed of a metal material and at least one bending portion formed of a non-metal material, and the lateral side of the housing having two short sides and two long sides that are longer than the two short sides;
a rear cover disposed on the rear side of the housing, the cover having a planar portion and at least one bending portion bent from the planar portion;
a first reflection sheet disposed on a first portion of the cover and formed of a metal material;
a second reflection sheet disposed on a second portion of the cover and formed of a metal material;
a first antenna module disposed between a rear side of the housing and a first side edge portion of the front cover;
a first antenna frame configured to support the first antenna module and formed of a metal material;
a second antenna module disposed between the rear side of the housing and a second side edge of the front cover; and
a second antenna frame configured to support the second antenna module and formed of a metal material, wherein the first antenna module and the second antenna module are configured to radiate beamforming radio signals, wherein each of the first and second antenna modules comprises an insulating member, an electronic element disposed on a surface of the insulating member, and antenna patterns disposed on the other surface of the insulating member, wherein the first antenna frame is configured to transmit heat from the first antenna module to the housing, and the second antenna frame is configured to transmit heat from the second antenna module to the housing, wherein the first antenna module is tilted at a portion of the rear side of the housing, the second antenna module is tilted at another portion at the rear side of the housing, the exterior of a first side of the mobile terminal is defined by a first bending portion of the cover and a first side surface portion of the housing, the exterior of a second side of the mobile terminal is defined by a second bending portion of the cover and a second side surface portion of the housing, and part of the first bending portion of the cover and part of the planar portion of the cover include a first region, a second region, and a third region, wherein the second region faces a first antenna pattern, and the third region is connected to a portion of the second region adjacent to the first side surface portion of the housing, wherein the first region is connected to another portion of the second region opposite to the third region, wherein the first reflection sheet is disposed on the first region of the cover, and a beamforming radio signal of the first region is reflected to the second and third regions by the first reflection sheet, wherein part of the second bending portion of the cover and part of the planar portion of the cover comprise a fourth region, a fifth region, and a sixth region, wherein the fifth region faces the second antenna pattern, the sixth region is connected to a portion of the fifth region adjacent to the second side surface portion of the housing, and the fourth region is connected to another portion of the fifth region opposite to the sixth region, wherein the second reflection sheet is disposed on the fourth region of the cover, and a beamforming radio signal of the fourth region is reflected to the fifth and sixth regions by the second reflection sheet, and wherein a tilting angle of the first antenna module is different from that of the second antenna module.

15. The mobile terminal of claim 14, wherein the tilting angle of the first antenna module is set to an angle smaller than the tilting angle of the second antenna module.

16. The mobile terminal of claim 14, wherein the tilting angle of the first antenna module is 18 degrees, and the tilting angle of the second antenna module is 55 degrees.

17. The mobile terminal of claim 14, further comprising:

a transceiver circuit operatively coupled to the first antenna module and the second antenna module, and configured to transmit or receive a first signal through the first antenna module and a second signal through the second antenna module; and a baseband processor operatively coupled to the transceiver circuit, and configured to perform multi-input multi-output (MIMO) through the first signal and the second signal transmitted or received through the transceiver circuit.

18. The mobile terminal of claim 17, further comprising:

a third antenna module disposed to be spaced apart from the first antenna module or the second antenna module by a predetermined distance, and configured to radiate a third signal through a rear surface of the mobile terminal, wherein the baseband processor controls the transceiver circuit to perform multi-input multi-output (MIMO) through the second signal transmitted or received through the second antenna module and the third signal transmitted or received through the third antenna module.

* * * * *